(12) United States Patent
Bessenecker et al.

(10) Patent No.: US 11,587,310 B2
(45) Date of Patent: Feb. 21, 2023

(54) SYSTEM AND METHOD FOR IDENTIFYING AND ASSESSING TOPOGRAPHICAL FEATURES USING SATELLITE DATA

(71) Applicant: PROJECT CONCERN INTERNATIONAL, San Diego, CA (US)

(72) Inventors: Christopher Bessenecker, San Diego, CA (US); Jennifer Waugaman, San Diego, CA (US); Peter Hoefsloote, Well (NL)

(73) Assignee: PROJECT CONCERN INTERNATIONAL, San Diego, CA (US)

( * ) Notice: Subject to any disclaimer, the term of this patent is extended or adjusted under 35 U.S.C. 154(b) by 325 days.

(21) Appl. No.: 16/646,525

(22) PCT Filed: Sep. 12, 2018

(86) PCT No.: PCT/US2018/050724
§ 371 (c)(1),
(2) Date: Mar. 11, 2020

(87) PCT Pub. No.: WO2019/055547
PCT Pub. Date: Mar. 21, 2019

(65) Prior Publication Data
US 2020/0279097 A1    Sep. 3, 2020

Related U.S. Application Data
(60) Provisional application No. 62/558,071, filed on Sep. 13, 2017.

(51) Int. Cl.
*G06K 9/00*    (2022.01)
*G01C 21/32*    (2006.01)
(Continued)

(52) U.S. Cl.
CPC .............. *G06V 20/13* (2022.01); *G01C 21/32* (2013.01); *G06F 16/29* (2019.01); *G09B 29/106* (2013.01);
(Continued)

(58) Field of Classification Search
CPC ....... G06F 16/29; G01C 21/32; G09B 29/106; G06T 2207/10032; G06T 2207/30181
(Continued)

(56) References Cited

U.S. PATENT DOCUMENTS 5,719,949 A  *  2/1998  Koeln ................. G06T 17/05
                                                   382/113
6,772,142 B1    8/2004  Kelling et al.
(Continued)

FOREIGN PATENT DOCUMENTS

JP    2003127998 A  *  5/2003  ............ G01C 23/00
JP    3461268 B2   *  10/2003
(Continued)

OTHER PUBLICATIONS

S. Scalise et al., "Air interfaces for satellite based digital TV broadcasting in the railway environment," 2006, vol. 52, Publisher: IEEE.*
(Continued)

*Primary Examiner* — Tuan C To
(74) *Attorney, Agent, or Firm* — Wilson Sonsini Goodrich & Rosati

(57) ABSTRACT

Disclosed herein are systems, media, and methods for identifying and assessing topographical features such as vegetation density and surface water using satellite data, comprising: a digital processing device; a database of digital maps, each indicative of grazing area(s); and a computer program to create an application comprising: a software module receiving a first set of satellite data indicative of a first
(Continued)

topographical feature of the land; a software module calculating a normalized index array of the first topographic feature for the time period using the first set of satellite data; a software module generating a custom map indicative of density of the first topographical feature; a software module combining the custom map with one of the digital maps to generate a combined map indicative of the density of the first topographical feature within the grazing areas; and a software module allowing a user to visualize or print the combined map.

17 Claims, 41 Drawing Sheets

(51) Int. Cl.
| | | |
|---|---|---|
| *G06V 20/13* | (2022.01) | |
| *G06F 16/29* | (2019.01) | |
| *G09B 29/10* | (2006.01) | |
| *G06V 20/10* | (2022.01) | |

(52) U.S. Cl.
CPC .............. *G06T 2207/10032* (2013.01); *G06T 2207/30181* (2013.01); *G06V 20/194* (2022.01)

(58) Field of Classification Search
USPC ........................................ 701/532
See application file for complete search history.

(56) References Cited

U.S. PATENT DOCUMENTS

| | | | | |
|---|---|---|---|---|
| 7,142,217 | B2 * | 11/2006 | Howard ................. | G06T 17/05 345/581 |
| 7,167,187 | B2 * | 1/2007 | Scott ...................... | G06T 17/05 345/629 |
| 7,356,201 | B2 * | 4/2008 | Gunther ................. | G01C 11/04 382/294 |
| 7,440,591 | B1 * | 10/2008 | McCusker ............. | G06T 17/05 434/150 |
| 8,001,115 | B2 * | 8/2011 | Davis .................... | G06F 16/5854 707/723 |
| 8,369,567 | B1 * | 2/2013 | Buck ...................... | G06V 20/13 382/165 |
| 2003/0081812 | A1 * | 5/2003 | Yamamoto ............. | G01C 5/005 382/103 |
| 2010/0063730 | A1 * | 3/2010 | Case ...................... | G01C 21/005 701/414 |
| 2013/0216103 | A1 * | 8/2013 | Asner .................... | G06V 20/188 382/110 |
| 2015/0099481 | A1 | 4/2015 | Maitre et al. | |
| 2015/0294155 | A1 * | 10/2015 | Sant ....................... | G06V 20/188 382/195 |
| 2017/0214836 | A1 * | 7/2017 | Tamegai ................ | H04N 9/735 |

FOREIGN PATENT DOCUMENTS

| | | |
|---|---|---|
| WO | WO-2008051207 A2 | 5/2008 |
| WO | WO-2019055547 A1 | 3/2019 |

OTHER PUBLICATIONS

M.O. Williams et al., "Optical signal distribution for a satellite phased array," 1990, Publisher: IET.*
PCT/US2018/050724 International Search Report and Written Opinion dated Dec. 6, 2018.
Bouzidi et al., An operational approach to monitor vegetation using remote sensing. IEEE International Conference on Acoustics, Speech and Signal Processing ICASSP 1998: 2697-2700 (1998).
EP18856128.6 Extended European Search Report dated May 6, 2021.
Townsend et al., Spatial pattern analysis for monitoring protected areas. Remote Sensing of Environment 113(7):1410-1420 (2009).

* cited by examiner

Fig. 11
Fig. 12
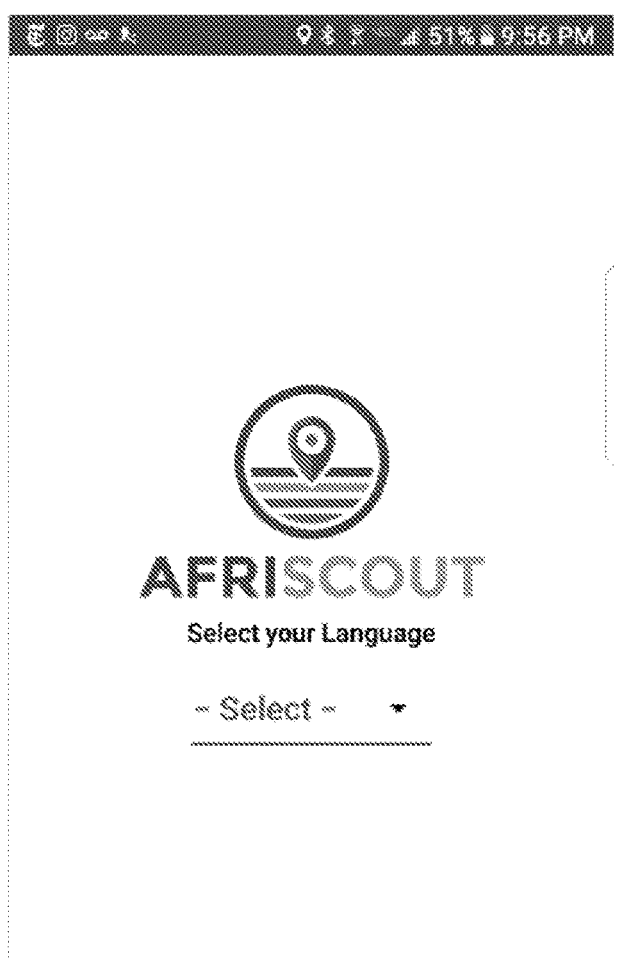
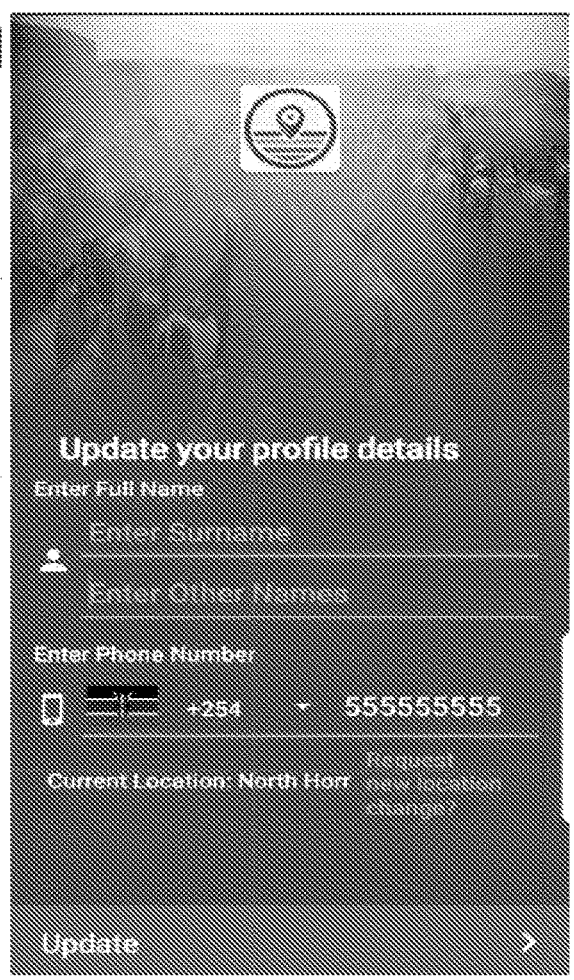

1505

1507

Fig. 20E
Fig. 21
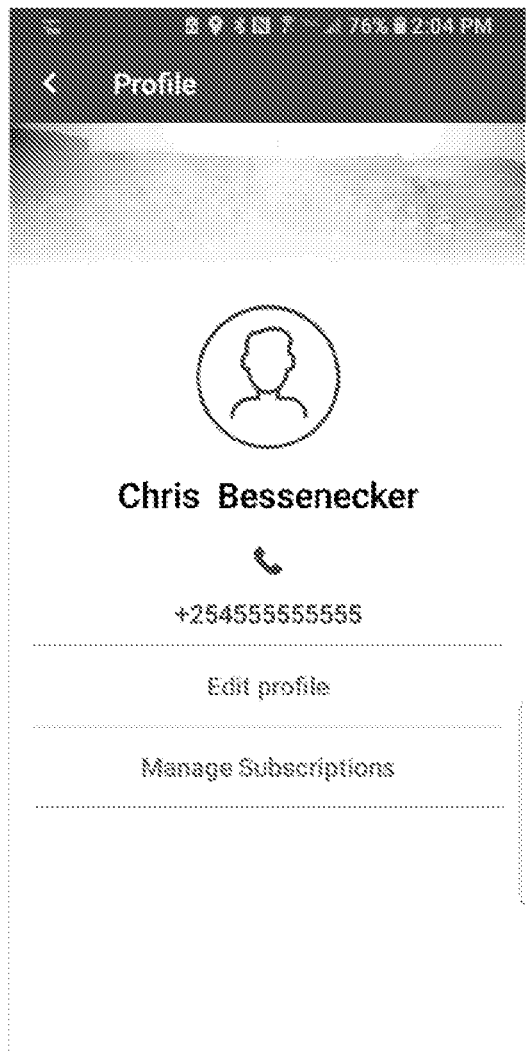
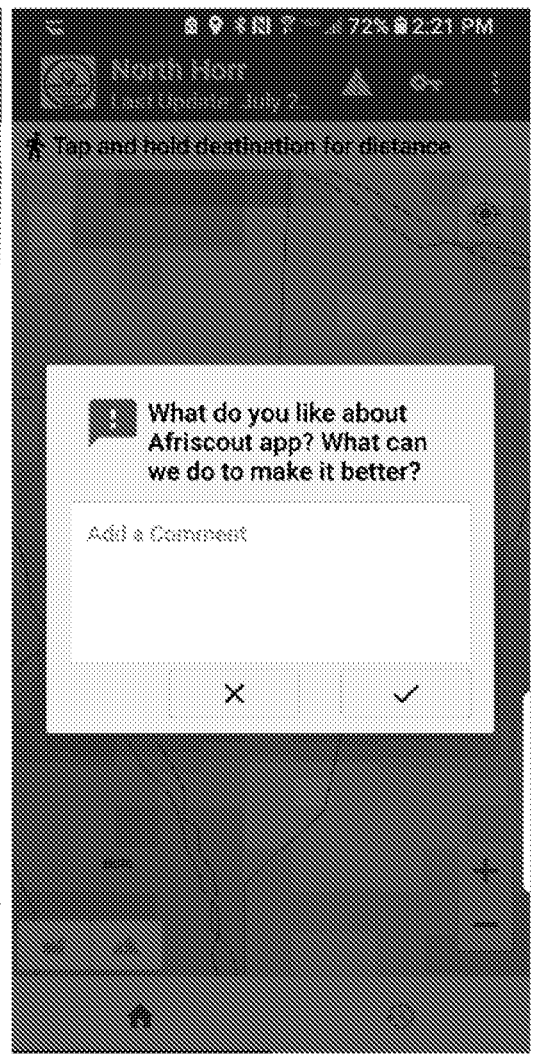

Fig. 24A
Fig. 24B
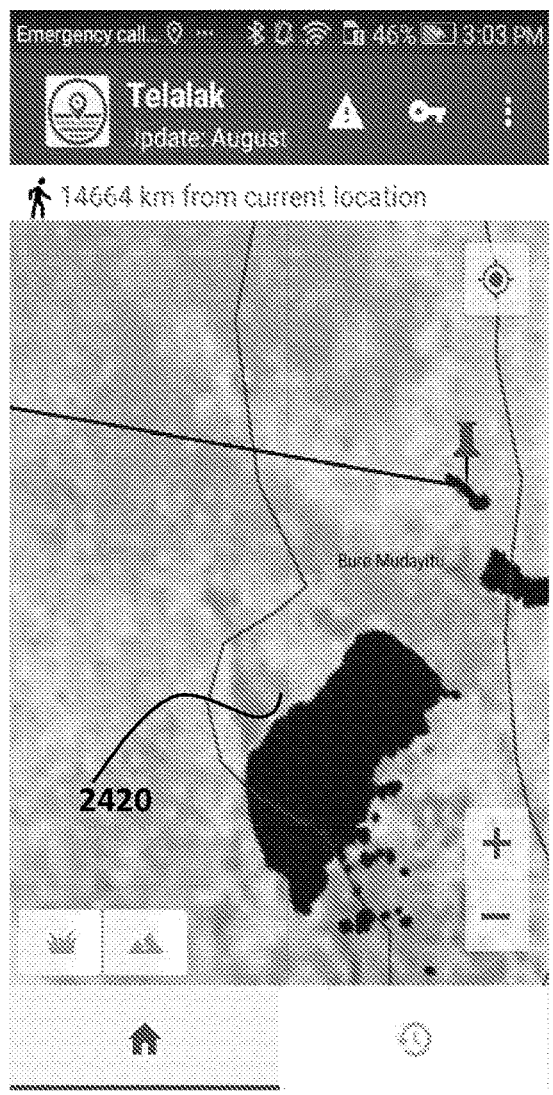
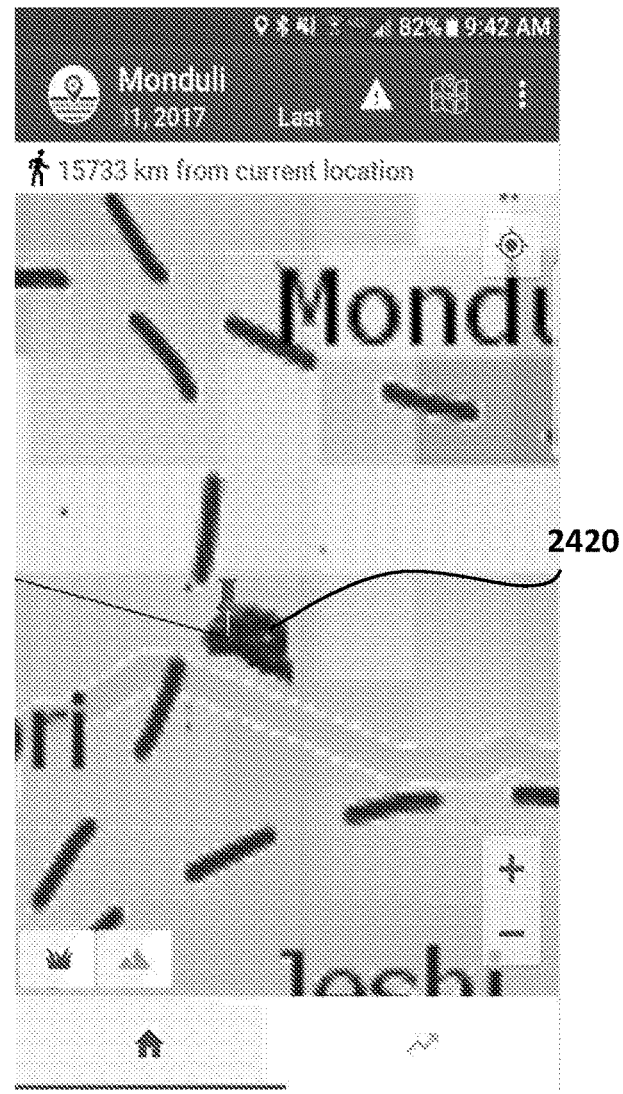

Fig. 26

AFRISCOUT

- Dashboard
- Mapped Alerts
- App Users
- Map Requests
- User Feedback

ADMINISTRATION
- Admin Users
- Mapped Districts
- Countries

WELCOME ADMIN   LOGOUT

Mapped Districts

Page 1 of 3

| ID | DISTRICT | COUNTRY | ACTIVE |
|----|----------|---------|--------|
| 1 | Monduli | Tanzania | |
| 2 | Longido | Tanzania | |
| 3 | Ngorongoro | Tanzania | |
| 4 | Narok | Kenya | |
| 5 | Dawe Kachen | Ethiopia | |
| 6 | Delo Mena | Ethiopia | |

Fig. 32

Map Requests

Page 1 of 12 >

| ID | DISTRICT | PHONE NUMBER | COUNTRY | DATE |
|---|---|---|---|---|
| 121 | Baragoi | +254725296947 | Kenya | Aug 15, 2017 |
| 120 | longido | +256851152015 | Tanzania | Aug 5, 2017 |
| 119 | Balozi testing | +254718121763 | Brazil | Aug 3, 2017 |
| 118 | +254718121763 | testing | Brazil | Aug 3, 2017 |
| 117 | ++254718121763 | balozi | Brazil | Aug 3, 2017 |
| 116 | +54718121763 | Balozi | Argentina | Aug 3, 2017 |
| 115 | +5741703939 | isioio | Brazil | Aug 2, 2017 |
| 114 | +557200000222 | Nairobi | Brazil | Jul 27, 2017 |

User Feedback

Page 1 of 2 >

| NAME | PHONE | MESSAGE | LOCATION | DATE | STATUS |
|---|---|---|---|---|---|
| | | | | | Download Feedback List (CSV) |
| Test Test | +251123456789 | Deghib | Telalak, Ethiopia | Jul 27, 2018 | Mark as Resolved |
| Test Test | +251123456789 | Qabnaa Afrisjaawutii | Telalak, Ethiopia | Jul 27, 2018 | Mark as Resolved |
| Test Test | +254712867954 | grey | North Horr, Kenya | Jul 10, 2018 | Mark as Resolved |
| Test Test | +254712867954 | slowly | North Horr, Kenya | Jul 10, 2018 | Mark as Resolved |
| Test Test | +254712867954 | withdrawals | North Horr, Kenya | Jul 10, 2018 | Mark as Unresolved |
| Test Test | +254712867954 | ground | North Horr, Kenya | Jul 10, 2018 | Mark as Unresolved |
| Test Test | +254712867954 | feed back | North Horr, Kenya | Jul 16, 2018 | Mark as Unresolved |
| Test Test | +254712867954 | Wheat flour | North Horr, Kenya | Jul 10, 2018 | Mark as Unresolved |

| ALERT DESCRIPTION | PICTURE | LOCATION | PHONE |
|---|---|---|---|
| Shumba Musa | | Raitu, Ethiopia | +251916929409 |
| Shumba Musa<br>Rammoo | | Raitu, Ethiopia | +251916929409 |
| Aliyi ahmad Aliyi ahmad | | Raitu, Ethiopia | +251915983884 |
| Aliyi ahmad Aliyi ahmad | | Raitu, Ethiopia | +251915983884 |
| Philip Lekipaika | | Samburu, Kenya | +254726200769 |

Mobile App Users

Page 1 of 6 >

Download User List

| ID | NAME | PHONE | REGISTERED ON | LOCATION | COUNTRY |
|---|---|---|---|---|---|
| 1981 | Girma Kiya | +251984849408 | Aug 8, 2018 | Amibara | Ethiopia |
| 1980 | Abdu Hussen | +251912781539 | Aug 8, 2018 | Aysaita | Ethiopia |
| 1979 | Harelmahes Humed | +251930918305 | Aug 8, 2018 | Elida ar | Ethiopia |
| 1978 | Hassan Mohammed | +251929514318 | Jul 25, 2018 | Dalifage | Ethiopia |
| 1977 | abdi mohammed | +251933806573 | Jul 23, 2018 | Amibara | Ethiopia |
| 1976 | Mohammed Fafi | +251910057172 | Jul 23, 2018 | Amibara | Ethiopia |
| 1975 | Yirga Nurye | +251913072010 | Jul 23, 2018 | Aysaita | Ethiopia |

Location Switch Requests

Page 1 of 4 >

| PHONE NUMBER | CURRENT LOCATION | DESIRED LOCATION | REQUEST DATE | REASON FOR SWITCHING | STATUS |
|---|---|---|---|---|---|
| +254722277422 | Kajiado | Samburu | Jul 17, 2018 | Moving | |
| +254722247684 | Moyale | Samburu | Jul 17, 2018 | For admin | approved |
| +254955555555 | North Horr | Moyale | Jul 16, 2018 | moved | approved |
| +254722247684 | Moyale | North Horr | Jul 16, 2018 | Again | approved |
| +254722247684 | Moyale | North Horr | Jul 16, 2018 | Testing | approved |
| +254722247684 | Moyale | North Horr | Jul 16, 2018 | Requesting a third time | approved |
| +254722247684 | Moyale | Laisamis | Jul 16, 2018 | Admin rights again | approved |

Fig. 34F

Mapped Areas

Page 1 of 4  >

| ID | LOCATION | COUNTRY | ACTIVE |
|----|----------|---------|--------|
| 19 | Yalo | Ethiopia | ⊙ |
| 28 | Telalak | Ethiopia | ⊙ |
| 12 | Seweyna | Ethiopia | ▨ |
| 35 | Samburu | Kenya | ⊙ |
| 11 | Raitu | Ethiopia | ▨ |
| 34 | North Horr | Kenya | ▨ |

Fig. 34G

Countries

Page 1 of 10 >

| COUNTRY | ACTIVE | CALLING CODE | ISO2 CODE | ISO3 CODE | CURRENCY |
|---|---|---|---|---|---|
| Zimbabwe | ◉ | +263 | ZW | ZWE | ZWL |
| Zambia | ◉ | +260 | ZM | ZMB | ZMK |
| Yemen | ◉ | +967 | YE | YEM | YER |
| Western Sahara | ◉ | +212 | EH | ESH | MAD |
| Wallis and Futuna | ◉ | +681 | WF | WLF | XPF |

SYSTEM AND METHOD FOR IDENTIFYING AND ASSESSING TOPOGRAPHICAL FEATURES USING SATELLITE DATA

CROSS-REFERENCE

The present application is a U.S. National Phase of International Application No. PCT/US2018/050724, filed Sep. 12, 2018, which claims the benefit of U.S. Provisional Application No. 62/558,071, filed Sep. 13, 2017, which is entirely incorporated herein by reference.

BACKGROUND OF THE INVENTION

Satellite images comprise digital images collected by imaging satellites operated by governments and businesses around the world. These digital images further comprise a plurality of pixels arranged in arrays of rows and columns.

Decisions on where to migrate with herds can mean the difference between survival and devastation for pastoralists. Each year in Africa, more than 200 million pastoralists seek available pasture for their herds, within their traditional grazing areas, using a combination of low technology methods such as indigenous knowledge, scouts, and oral communication.

SUMMARY OF THE INVENTION

With climate change over the recent years, seasonal and spatial climate patterns have altered, making traditional methods for locating pasture increasingly unreliable and resource intensive. As a consequence, pastoralists are experiencing significant rates of livestock mortality that can severely, and sometime entirely, deplete this crucial asset.

Currently, there is no user-friendly system, software, or device that is available to the pastoralists for locating available grazing areas based on satellite data. Existing platforms or models for analyzing Normalized Difference Vegetation Index (NDVI), indicative of "greenness" or vegetative densities of a land as well as surface water from satellite images, are designed for analysis at the policy level and are not localized or tailored for the pastoral audience. Further, traditional systems, methods, or devices do not combine community knowledge of traditional grazing grounds with satellite data to enable accurate, reliable, and easy to use grazing maps for specific groups of pastoralists, especially when such traditional grazing ground may vary for different pastoral villages. Furthermore, no existing system, software, or device enables map delivery and viewing through entry-level mobile devices, for example, a minimum version of android device. Other disadvantages of existing software, devices, or methods include that there is no digital maps available to pastoralists that additionally includes high resolution vegetation, surface water locations, geo-referenced, crowd-sourced hazards, migration distance, topographical information of specific migration routes, or other information, which are also critically important to help the pastoralists make their migration decisions in combination with the vegetation map. Thus, there is an urgent need for accurate, reliable, and easy-to-use methods and systems that can assist pastoralists locate available pasture and other resources for migration throughout the year within their traditional grazing grounds that can span thousands of square kilometers. Such methods and systems are critical for reducing herd mortality especially during drought, and ultimately for the long-term development and economic growth of many countries.

In some cases, the systems, methods, and media disclosed herein advantageously provide the capability for generating composite cloud-free vegetation maps and/or surface water maps with high resolution spatial (e.g., 10 meters by 10 meters) and/or temporal images (e.g., every 10 days), so that small changes in grazing areas may be detectable and perceivable to pastoral groups for deciding where to take their herds. Another advantage associated with the systems, methods, and media disclosed herein is the combination of community knowledge with digital vegetation and surface water maps. Such community knowledge can be obtained from a broad representation of pastoralists to accurately and reliably reflect the traditional grazing areas applicable to the group. In some cases, such information is further digitized to form a custom composite map with the topographical information derived from satellite data. The digitization of traditional grazing areas with high accuracy and reliability can ensure that the maps accurately cover those areas relevant to the group in question and excludes vegetative information for areas prohibited or outside of what is commonly understood as their traditional grazing area, or in other words, helps to ensure relevancy to the pastoral groups in question, so that the pastoralists are not misled by using the satellite data alone. Further, restricting different pastoral clans to their traditional grazing areas may help maintain and conserve grazing areas from over-grazing or undesired competitions and/or conflict. In some embodiments, the systems, methods, and media disclosed herein provide more affordable solution without the time and cost to print and distribute paper maps. In certain cases, the systems, methods, and media disclosed herein provide much faster access to the vegetation and surface water maps so that pastoralists no longer have to rely on regulatory or government agencies for hand delivery of paper maps to their communities which are slow, time-consuming, inconsistent, and unreliable. In addition to that, the invention disclosed herein can provide a platform to further crowdsource critical information related to pastoralists through real-time and georeferenced alerts in the digital maps to improve collaboration in their migrations. Furthermore, the systems, methods, and media disclosed herein may allow the pastoralists to geo-locate themselves and measure distance to their desired grazing area. Yet further, the systems, methods, and media disclosed herein advantageously provides the capability for a user to conveniently and easily switch views between vegetation maps and topographical/terrain viewing modes so that pastoralists may convenient assess the route condition, contour features, and migration difficulties for assessing migration decisions. More importantly, the systems, methods, and media disclosed herein can enable a high resolution surface water display with the ability to scale the map (for example, zoom to see small ponds/watering holes of less than 10 square meters) that often disappear in dry seasons and there is no way to know in advance. Such high resolution is also enabled by the invention disclosed herein to the vegetation map or NDVI map so that a high-resolution combination of surface water and vegetation information may be made available to the pastoralists.

The systems, and methods, and media herein improve the technical field of generating vegetation and surface water maps. Existing methods or tools are unable to generate high resolution, cloud-free images from satellite data that can accurately and reliably indicate vegetation density and surface water density in areas on the Earth. Existing high resolution images can suffer from poor signal to noise ratio and may be covered by cloud. Additionally, only a very limited number of images can be taken during a fixed time window that there may not be any cloud-free version of multiple pixels in the image(s). The composite cloud-free vegetation and surface water maps herein are advantageously generated using fusion of satellite images with different spatial and temporal resolution, e.g., pixel by pixel, using information from images with both resolutions. In some embodiments, the high temporal resolution low spatial resolution data (e.g., 200 images during 10 days and 3 km by 3 km) may help to provide a cloud-free version of the pixels with more reliable and accurate signal level indicative of water and/or vegetation that may not be available from the low temporal resolution high spatial resolution data (e.g., 10 images during 10 days and 10 m by 10 m). In some embodiments, the low temporal resolution high spatial resolution data may provide more spatial details to the distribution of water and vegetation which cannot be obtained with the low spatial resolution data. Thus, the systems, methods, and media herein advantageously combine information from such two different data set to generate cloud-free high spatial resolution information of vegetation and water for the user. Further, such composite cloud-free vegetation maps and/or surface water maps are compared to digitized or digital maps with one or more mask representing traditional gazing areas to generate vegetation and surface water information within the gazing areas. In some embodiments, the systems, methods and media herein advantageously allow computers to function more effectively because instead of having to process and store a large number (e.g., 100 or greater) of high spatial resolution satellite images to generate an accurate and reliable high resolution cloud-free image, only a very smaller number (e.g., less than 10) of high spatial resolution need to be processed with the information obtainable using low spatial resolution images. In some embodiments, the systems, methods and media herein advantageously allow computers to function more effectively because the total size of images that a computer has to process to generate an accurate and reliable high resolution cloud-free image is significantly reduced by using the combination low resolution and high resolution images instead of high resolution images only.

In one aspect, disclosed herein are computer-implemented systems for identifying and assessing topographical features using satellite data, the system comprising: a digital processing device comprising an operating system configured to perform executable instructions and a memory; a database of digital maps, each of the digital maps indicative of one or more areas of a land; and a computer program including instructions executable by the digital processing device to create a topographical feature identification and assessment application comprising: a software module receiving a first set of satellite data from first one or more satellites, the first set of satellite data indicative of a first topographical feature of the land for a time period; a software module calculating a normalized index array of the first topographic feature for the time period using the first set of satellite data; a software module generating a custom map, the custom map indicative of density of the first topographical feature of the land using the normalized index array; a software module combining the custom map with one of the digital maps to generate a combined map, the combined map indicative of the density of the first topographical feature within the one or more areas of the land for the time period; and a software module allowing a user to visualize the combined map on a digital display or print the combined map. In some embodiments, the first topographical feature is vegetation. In some embodiments the first topographical feature is during 1) a wet season, 2) a dry season, 3) an extreme dry season, 4) a severe drought season, or a combination thereof. In some embodiments the first one or more satellites include one or more of a geostationary satellite and a Meteosat Second Generation (MSG) satellite. In some embodiments the land is in Africa. In some embodiments one or more of the digital maps include an image resolution of about 3 kilometers by 3 kilometers. In some embodiments one or more of the digital maps include an image pixel size of about 3 kilometers by 3 kilometers. In some embodiments the one or more areas are delineated by at least two persons, each being a community representative. In some embodiments the one or more areas are drawn via interaction with one of the digital maps using an input device. In some embodiments the one or more areas are traditional grazing areas for at least one community. In some embodiments one of the digital maps is during 1) a wet season, 2) a dry season, 3) an extreme dry season, 4) a severe drought season, or a combination thereof. In some embodiments the system further comprises a software module combining at least one additional area with the one or more areas. In some embodiments the first set of satellite data comprises a satellite image taken with visible light, infrared (IR) light, near-infrared (NIR) light, short-wave infrared (SWIR) light, or a combination thereof. In some embodiments the first set of satellite data comprises more than one satellite image of an identical region at different time points. In some embodiments the first set of satellite data comprises more than one satellite image, at least one taken during day time. In some embodiments the first set of satellite data comprises a composite image generated from a plurality of satellite images taken at different time points. In some embodiments, the plurality of satellite images includes more than 100 images. In some embodiments the first set of satellite data comprises a cloud-free image generated from a plurality of satellite images taken at different time points. In some embodiments, the plurality of satellite images includes more than 100 images. In some embodiments, the cloud-free image is a composite image. In some embodiments, the system herein further comprises a software module performing atmospheric correction on the first set of satellite data. In some embodiments, the first set of satellite data includes at least one satellite image with an image resolution of about 3 kilometers by 3 kilometers. In some embodiments the first set of satellite data includes at least one satellite image with an image resolution of about 10 meters by 10 meters. In some embodiments the normalized index array is two dimensional and includes multiple values ranging between −1 and 1. In some embodiments the time period is about 1 to 14 days. In some embodiments the time period is during 1) a wet season, 2) a dry season, 3) an extreme dry season, 4) a severe drought season, or a combination thereof. In some embodiments, the system further comprises a software module receiving a second set of satellite data from second one or more satellites, the second set of satellite data indicative of a second topographical feature of the land for a time period. In some embodiments, the second topographical feature is surface water. In some embodiments, the second topographical feature is during 1) a wet season, 2) a dry season, 3) an extreme dry season, 4) a severe drought season, or a combination thereof. In some embodiments, the second one or more satellites include one or more SENTINEL satellites. In some embodiments, the second set of satellite data comprises a satellite image taken with visible, infrared, near infrared, short-wave infrared (SWIR) light, or a combination thereof. In some embodiments, the second set of satellite data comprises more than one satellite image of an identical region at different time points. In some embodiments, the second set of satellite data comprises more than one satellite image, at least one taken during day time. In some embodiments, the second set of satellite data comprises a composite image generated from a plurality of satellite images taken at different time points. In some embodiments, the second set of satellite data comprises a cloud-free image generated from a plurality of satellite images taken at different time points. In some embodiments, the cloud-free image is a composite image. In some embodiments, the second set of satellite data includes an image with an image resolution of about 10 meters by about 10 meters. In some embodiments, the second set of satellite data includes an image with an image pixel size of less than about 10 square meters. In some embodiments, the time period is about 1 to 14 days. In some embodiments, the time period is during 1) a wet season, 2) a dry season, 3) an extreme dry season, 4) a severe drought season, or a combination thereof. In some embodiments, the system further comprises a software module generating a second custom map, the second custom map indicative of distribution, permanence, or both of the second topographical feature of the land for the time period. In some embodiments, the second custom map is obtained by averaging data from the second set of satellite data obtained in the time period. In some embodiments, the system further comprises a software module combining the second custom map with the custom map and the one of the digital maps to generate a second combined map. In some embodiments, the second combined map indicates the first and second topographical features within the one or more areas of the land during the time period. In some embodiments, the combination of the second custom map with the custom map and the one of the digital maps is via superimposing. In some embodiments, the system further comprises a software module allowing the user to visualize the second combined map of the land on the digital display. In some embodiments, the system further comprises a software module allowing the user to visualize an alert on the second combined map. In some embodiments, the alert includes a geolocation and a time. In some embodiments, the system further comprises a software module allowing the user to visualize an alert on the combined map. In some embodiments, the alert includes a geolocation and a time. In some embodiments, the system further comprises a software module allowing the user to obtain a geolocation of the user and measure a distance to the one or more areas. In some embodiments, the system further comprises a software module allowing the user to interact with the custom map, the combined map, or both. In some embodiments, the software module allowing the user to interact with the custom map, the combined map, or both comprises allowing the user to zoom in or zoom out; switch among more than one viewing mode, wherein the more than one viewing mode includes a terrain viewing mode; and view one or more historical combined maps, said historical combined maps generated prior to the combined map in time. In some embodiments, allowing the user to switch among more than one viewing mode comprises switching between viewing the combined map and viewing a terrain map of a same region to assess migration route. In some embodiments, the one or more areas of the land are derived from information obtained from at least one pastoral community. In some embodiments, the information is indicative of one or more traditional grazing areas for the at least one pastoral community. In some embodiments, the combined map is generated about every 10 days continuously. In some embodiments, the digital processing device is a mobile device.

In another aspect, disclosed herein are non-transitory computer-readable storage media encoded with a computer program including instructions executable by a processor to create a topographical feature identification and assessment application using satellite data, the media comprising: a database of digital maps, each of the digital maps indicative of one or more areas of a land; a software module receiving a first set of satellite data from first one or more satellites, the first set of satellite data indicative of a first topographical feature of the land for a time period; a software module calculating a normalized index array of the first topographic feature for the time period using the first set of satellite data; a software module generating a custom map, the custom map indicative of density of the first topographical feature of the land using the normalized index array; a software module combining the custom map with one of the digital maps to generate a combined map, the combined map indicative of the density of the first topographical feature within the one or more areas of the land for the time period; and a software module allowing a user to visualize the combined map on a digital display or print the combined map. In some embodiments, the first topographical feature is vegetation. In some embodiments, the first topographical feature is during 1) a wet season, 2) a dry season, 3) an extreme dry season, 4) a severe drought season, or a combination thereof. In some embodiments, the first one or more satellites include one or more of a geostationary satellite and a Meteosat Second Generation (MSG) satellite. In some embodiments, the land is in Africa. In some embodiments, one or more of the digital maps include an image resolution of about 3 kilometers by 3 kilometers. In some embodiments, one or more of the digital maps include an image pixel size of about 3 kilometers by 3 kilometers. In some embodiments, the one or more areas are delineated by at least two persons, each being a community representative. In some embodiments, the at least one or more areas are drawn via interaction with one of the digital maps using an input device. In some embodiments, the one or more areas are traditional grazing areas for at least one community. In some embodiments, one of the digital maps is during 1) a wet season, 2) a dry season, 3) an extreme dry season, 4) a severe drought season, or a combination thereof. In some embodiments, the system further comprises a software module combining at least one additional area with the one or more areas. In some embodiments, the first set of satellite data comprises a satellite image taken with visible light, infrared (IR) light, near-infrared (NIR) light, short-wave infrared (SWIR) light, or a combination thereof. In some embodiments, the first set of satellite data comprises more than one satellite image of an identical region at different time points. In some embodiments, the first set of satellite data comprises more than one satellite image, at least one taken during day time. In some embodiments, the first set of satellite data comprises a composite image generated from a plurality of satellite images taken at different time points. In some embodiments, the plurality of satellite images includes more than 100 images. In some embodiments, the first set of satellite data comprises a cloud-free image generated from a plurality of satellite images taken at different time points. In some embodiments, the plurality of satellite images includes more than 100 images. In some embodiments, the cloud-free image is a composite image. In some embodiments, the media further comprises a software module performing atmospheric correction on the first set of satellite data. In some embodiments, the first set of satellite data includes at least one satellite image with an image resolution of about 3 kilometers by 3 kilometers. In some embodiments, the first set of satellite data includes at least one satellite image with an image resolution of about 10 meters by 10 meters. In some embodiments, the normalized index array is two dimensional and includes multiple values ranging between −1 and 1. In some embodiments, the time period is about 1 to 14 days. In some embodiments, the time period is during 1) a wet season, 2) a dry season, 3) an extreme dry season, 4) a severe drought season, or a combination thereof. In some embodiments, the media further comprises a software module receiving a second set of satellite data from second one or more satellites, the second set of satellite data indicative of a second topographical feature of the land for a time period. In some embodiments, the second topographical feature is surface water. In some embodiments, the second topographical feature is during 1) a wet season, 2) a dry season, 3) an extreme dry season, 4) a severe drought season, or a combination thereof. In some embodiments, the second one or more satellites include one or more SENTINEL satellites. In some embodiments, the second set of satellite data comprises a satellite image taken with visible, infrared, near infrared, short-wave infrared (SWIR) light, or a combination thereof. In some embodiments, the second set of satellite data comprises more than one satellite image of an identical region at different time points. In some embodiments, the second set of satellite data comprises more than one satellite image, at least one taken during day time. In some embodiments, the second set of satellite data comprises a composite image generated from a plurality of satellite images taken at different time points. In some embodiments, the second set of satellite data comprises a cloud-free image generated from a plurality of satellite images taken at different time points. In some embodiments, the cloud-free image is a composite image. In some embodiments, the second set of satellite data includes an image with an image resolution of about 10 meters by about 10 meters. In some embodiments, the second set of satellite data includes an image with an image pixel size of less than about 10 square meters. In some embodiments, the time period is about 1 to 14 days. In some embodiments, the time period is during 1) a wet season, 2) a dry season, 3) an extreme dry season, 4) a severe drought season, or a combination thereof. In some embodiments, the system further comprises a software module generating a second custom map, the second custom map indicative of distribution, permanence, or both of the second topographical feature of the land for the time period. In some embodiments, the second custom map is obtained by averaging data from the second set of satellite data obtained in the time period. In some embodiments, the system further comprises a software module combining the second custom map with the custom map and the one of the digital maps to generate a second combined map. In some embodiments, the second combined map indicates the first and second topographical features within the one or more areas of the land during the time period. In some embodiments, the combination of the second custom map with the custom map and the one of the digital maps is via superimposing. In some embodiments, the system further comprises a software module allowing the user to visualize the second combined map of the land on the digital display. In some embodiments, the system further comprises a software module allowing the user to visualize an alert on the second combined map. In some embodiments, the alert includes a geolocation and a time. In some embodiments, the media further comprises a software module allowing the user to visualize an alert on the combined map. In some embodiments, the alert includes a geolocation and a time. In some embodiments, the media further comprises a software module allowing the user to obtain a geolocation of the user and measure a distance to the one or more areas. In some embodiments, the media further comprises a software module allowing the user to interact with the custom map, the combined map, or both. In some embodiments, the software module allowing the user to interact with the custom map, the combined map, or both comprises allowing the user to zoom in or zoom out; switch among more than one viewing mode, wherein the more than one viewing mode includes a terrain viewing mode; and view one or more historical combined maps, said historical combined maps generated prior to the combined map in time. In some embodiments, allowing the user to switch among more than one viewing mode comprises switching between viewing the combined map and viewing a terrain map of a same region to assess migration route. In some embodiments, the one or more areas of the land are derived from information obtained from at least one pastoral community. In some embodiments, the information is indicative of one or more traditional grazing areas for the at least one pastoral community. In some embodiments, the combined map is generated about every 10 days continuously. In some embodiments, the digital processing device is a mobile device.

Disclosed herein, in another aspect, are computer-implemented methods for identifying and assessing topographical features using satellite data, the method comprising: generating, by a computer, one or more digital maps, each of the digital maps indicative of one or more areas of a land; receiving, by the computer, a first set of satellite data from first one or more satellites, the first set of satellite data indicative of a first topographical feature of the land for a time period; calculating, by the computer, a normalized index array of the first topographic feature for the time period using the first set of satellite data; generating, by the computer, a custom map, the custom map indicative of density of the first topographical feature of the land using the normalized index array; combining, by the computer, the custom map with one of the digital maps to generate a combined map, the combined map indicative of the density of the first topographical feature within the one or more areas of the land for the time period; and allowing a user to visualize the combined map on a digital display by the computer or print the combined map by a printer. In some embodiments, the first topographical feature is vegetation. In some embodiments, the first topographical feature is during 1) a wet season, 2) a dry season, 3) an extreme dry season, 4) a severe drought season, or a combination thereof. In some embodiments, the first one or more satellites include one or more of a geostationary satellite and a Meteosat Second Generation (MSG) satellite. In some embodiments, the land is in Africa. In some embodiments, one or more of the digital maps include an image resolution of about 3 kilometers by 3 kilometers. In some embodiments, one or more of the digital maps include one or more of the digital maps include an image pixel size of about 3 kilometers by 3 kilometers. In some embodiments, the one or more areas are delineated by at least two persons, each being a community representative. In some embodiments, the at least one or more areas are drawn via interaction with one of the digital maps using an input device. In some embodiments, the one or more areas are traditional grazing areas for at least one community. In some embodiments, one of the digital maps is during 1) a wet season, 2) a dry season, 3) an extreme dry season, 4) a severe drought season, or a combination thereof. In some embodiments, the system further comprises a software module combining at least one additional area with the one or more areas. In some embodiments, the first set of satellite data comprises a satellite image taken with visible light, infrared (IR) light, near-infrared (NIR) light, short-wave infrared (SWIR) light, or a combination thereof. In some embodiments, the first set of satellite data comprises more than one satellite images of an identical region at different time points. In some embodiments, the first set of satellite data comprises more than one satellite images, at least one taken during day time. In some embodiments, the first set of satellite data comprises a composite image generated from a plurality of satellite images taken at different time points. In some embodiments, the plurality of satellite images includes more than 100 images. In some embodiments, the first set of satellite data comprises a cloud-free image generated from a plurality of satellite images taken at different time points. In some embodiments, the plurality of satellite images includes more than 100 images. In some embodiments, the cloud-free image is a composite image. In some embodiments, the method further comprises performing atmospheric correction on the first set of satellite data. In some embodiments, the first set of satellite data includes at least one satellite image with an image resolution of about 3 kilometers by 3 kilometers. In some embodiments, the first set of satellite data includes at least one satellite image with an image resolution of about 10 meters by 10 meters. In some embodiments, the normalized index array is two dimensional and includes multiple values ranging between −1 and 1. In some embodiments, the time period is about 1 to 14 days. In some embodiments, the time period is during 1) a wet season, 2) a dry season, 3) an extreme dry season, 4) a severe drought season, or a combination thereof. In some embodiments, the method further comprises a software module receiving a second set of satellite data from second one or more satellites, the second set of satellite data indicative of a second topographical feature of the land for a time period. In some embodiments, the second topographical feature is surface water. In some embodiments, the second topographical feature is during 1) a wet season, 2) a dry season, 3) an extreme dry season, 4) a severe drought season, or a combination thereof. In some embodiments, the second one or more satellites include one or more SENTINEL satellites. In some embodiments, the second set of satellite data comprises a satellite image taken with visible, infrared, near infrared, short-wave infrared (SWIR) light, or a combination thereof. In some embodiments, the second set of satellite data comprises more than one satellite images of an identical region at different time points. In some embodiments, the second set of satellite data comprises more than one satellite images, at least one taken during day time. In some embodiments, the second set of satellite data comprises a composite image generated from a plurality of satellite images taken at different time points. In some embodiments, the second set of satellite data comprises a cloud-free image generated from a plurality of satellite images taken at different time points. In some embodiments, the cloud-free image is a composite image. In some embodiments, the second set of satellite data includes an image with an image resolution of about 10 meters by about 10 meters. In some embodiments, the second set of satellite data includes an image with an image pixel size of less than about 10 square meters. In some embodiments, the time period is about 1 to 14 days. In some embodiments, the time period is during 1) a wet season, 2) a dry season, 3) an extreme dry season, 4) a severe drought season, or a combination thereof. In some embodiments, the method further comprises a software module generating a second custom map, the second custom map indicative of distribution, permanence, or both of the second topographical feature of the land for the time period. In some embodiments, the second custom map is obtained by averaging data from the second set of satellite data obtained in the time period. In some embodiments, the method further comprises a software module combining the second custom map with the custom map and the one of the digital maps to generate a second combined map. In some embodiments, the second combined map indicates the first and second topographical features within the one or more areas of the land during the time period. In some embodiments, the combination of the second custom map with the custom map and the one of the digital maps is via superimposing. In some embodiments, the method further comprises allowing the user to visualize the second combined map of the land on the digital display. In some embodiments, the method further comprises allowing the user to visualize an alert on the second combined map. In some embodiments, the method further comprises a software module allowing the user to visualize an alert on the combined map. In some embodiments, the alert includes a geolocation and a time. In some embodiments, the method further comprises allowing the user to obtain a geolocation of the user and measure a distance to the one or more areas. In some embodiments, the method further comprises allowing the user to interact with the custom map, the combined map, or both. In some embodiments, allowing the user to interact with the custom map, the combined map, or both comprises allowing the user to zoom in or zoom out; switch among more than one viewing mode, wherein the more than one viewing mode includes a terrain viewing mode; and view one or more historical combined maps, said historical combined maps generated prior to the combined map in time. In some embodiments, allowing the user to switch among more than one viewing mode comprises switching between viewing the combined map and viewing a terrain map of a same region to assess migration route. In some embodiments, the one or more areas of the land are derived from information obtained from at least one pastoral community. In some embodiments, the information is indicative of one or more traditional grazing areas for the at least one pastoral community. In some embodiments, the combined map is generated about every 10 days continuously. In some embodiments, the digital processing device is a mobile device.

Disclosed herein, in yet another aspect are computer-implemented systems for identifying and assessing topographical features using satellite data, the system comprising: a digital processing device comprising an operating system configured to perform executable instructions and a memory; a database of digital maps, each of the digital maps generated based on community information of one or more areas of a land; and a computer program including instructions executable by the digital processing device to create a topographical feature identification and assessment application comprising: a software module receiving a first set of satellite data from first one or more satellites, the first set of satellite data indicative of a first topographical feature of the land for a time period; a software module receiving a second set of satellite data from second one or more satellites, the second set of satellite data indicative of a second topographical feature of the land for the time period; a software module calculating a normalized difference vegetation index array of the first topographic feature for the time period using the first set of satellite data; a software module generating a custom map, the custom map indicative of density of the first topographical feature of the land using the normalized index array; a software module generating a second custom map, the second custom map indicative of distribution, permanence, or both of surface water of the land for the time period; a software module combining the first and second custom maps with one of the digital maps to generate a combined map, the combined map indicative of the density of the first topographical feature and distribution, permanence, or both of the second topographical feature within the one or more areas of the land for the time period; and a software module allowing a user to visualize the combined map on a digital display or print the combined maps. In some embodiments, the first topographical feature is vegetation. In some embodiments the first topographical feature is during 1) a wet season, 2) a dry season, 3) an extreme dry season, 4) a severe drought season, or a combination thereof. In some embodiments the first one or more satellites include one or more of a geostationary satellite and a Meteosat Second Generation (MSG) satellite. In some embodiments the land is in Africa. In some embodiments one or more of the digital maps include an image resolution of about 3 kilometers by 3 kilometers. In some embodiments one or more of the digital maps include an image pixel size of about 3 kilometers by 3 kilometers. In some embodiments the one or more areas are delineated by at least two persons, each being a community representative. In some embodiments the one or more areas are drawn via interaction with one of the digital maps using an input device. In some embodiments the one or more areas are traditional grazing areas for at least one community. In some embodiments one of the digital maps is during 1) a wet season, 2) a dry season, 3) an extreme dry season, 4) a severe drought season, or a combination thereof. In some embodiments the system further comprises a software module combining at least one additional area with the one or more areas. In some embodiments the first set of satellite data comprises a satellite image taken with visible light, infrared (IR) light, near-infrared (NIR) light, short-wave infrared (SWIR) light, or a combination thereof. In some embodiments the first set of satellite data comprises more than one satellite image of an identical region at different time points. In some embodiments the first set of satellite data comprises more than one satellite image, at least one taken during day time. In some embodiments the first set of satellite data comprises a composite image generated from a plurality of satellite images taken at different time points. In some embodiments, the plurality of satellite images includes more than 100 images. In some embodiments the first set of satellite data comprises a cloud-free image generated from a plurality of satellite images taken at different time points. In some embodiments, the plurality of satellite images includes more than 100 images. In some embodiments, the cloud-free image is a composite image. In some embodiments, the system herein further comprises a software module performing atmospheric correction on the first set of satellite data. In some embodiments, the first set of satellite data includes at least one satellite image with an image resolution of about 3 kilometers by 3 kilometers. In some embodiments the first set of satellite data includes at least one satellite image with an image resolution of about 10 meters by 10 meters. In some embodiments the normalized index array is two dimensional and includes multiple values ranging between −1 and 1. In some embodiments the time period is about 1 to 14 days. In some embodiments the time period is during 1) a wet season, 2) a dry season, 3) an extreme dry season, 4) a severe drought season, or a combination thereof. In some embodiments, the system further comprises a software module receiving a second set of satellite data from second one or more satellites, the second set of satellite data indicative of a second topographical feature of the land for a time period. In some embodiments, the second topographical feature is surface water. In some embodiments, the second topographical feature is during 1) a wet season, 2) a dry season, 3) an extreme dry season, 4) a severe drought season, or a combination thereof. In some embodiments, the second one or more satellites include one or more SENTINEL satellites. In some embodiments, the second set of satellite data comprises a satellite image taken with visible, infrared, near infrared, short-wave infrared (SWIR) light, or a combination thereof. In some embodiments, the second set of satellite data comprises more than one satellite image of an identical region at different time points. In some embodiments, the second set of satellite data comprises more than one satellite image, at least one taken during day time. In some embodiments, the second set of satellite data comprises a composite image generated from a plurality of satellite images taken at different time points. In some embodiments, the second set of satellite data comprises a cloud-free image generated from a plurality of satellite images taken at different time points. In some embodiments, the cloud-free image is a composite image. In some embodiments, the second set of satellite data includes an image with an image resolution of about 10 meters by about 10 meters. In some embodiments, the second set of satellite data includes an image with an image pixel size of less than about 10 square meters. In some embodiments, the time period is about 1 to 14 days. In some embodiments, the time period is during 1) a wet season, 2) a dry season, 3) an extreme dry season, 4) a severe drought season, or a combination thereof. In some embodiments, the system further comprises a software module generating a second custom map, the second custom map indicative of distribution, permanence, or both of the second topographical feature of the land for the time period. In some embodiments, the second custom map is obtained by averaging data from the second set of satellite data obtained in the time period. In some embodiments, the system further comprises a software module combining the second custom map with the custom map and the one of the digital maps to generate a second combined map. In some embodiments, the second combined map indicates the first and second topographical features within the one or more areas of the land during the time period. In some embodiments, the combination of the second custom map with the custom map and the one of the digital maps is via superimposing. In some embodiments, the system further comprises a software module allowing the user to visualize the second combined map of the land on the digital display. In some embodiments, the system further comprises a software module allowing the user to visualize an alert on the second combined map. In some embodiments, the alert includes a geolocation and a time. In some embodiments, the system further comprises a software module allowing the user to visualize an alert on the combined map. In some embodiments, the alert includes a geolocation and a time. In some embodiments, the system further comprises a software module allowing the user to obtain a geolocation of the user and measure a distance to the one or more areas. In some embodiments, the system further comprises a software module allowing the user to interact with the custom map, the combined map, or both. In some embodiments, the software module allowing the user to interact with the custom map, the combined map, or both comprises allowing the user to zoom in or zoom out; switch among more than one viewing mode, wherein the more than one viewing mode includes a terrain viewing mode; and view one or more historical combined maps, said historical combined maps generated prior to the combined map in time. In some embodiments, allowing the user to switch among more than one viewing mode comprises switching between viewing the combined map and viewing a terrain map of a same region to assess migration route. In some embodiments the one or more areas of the land are derived from information obtained from at least one pastoral community. In some embodiments, the information is indicative of one or more traditional grazing areas for the at least one pastoral community. In some embodiments, the combined map is generated about every 10 days continuously. In some embodiments, the digital processing device is a mobile device.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 11 shows a non-limiting exemplary embodiment of the systems, methods, and media disclosed herein, in this case, a user interface that allow a user to launch a user application and select a preferred language;

FIG. 12 shows a non-limiting exemplary embodiment of the systems, methods, and media disclosed herein, in this case, a user interface that allows a user to enter login details, to register, log in, or update user profile;

FIGS. 20A-20E show a non-limiting exemplary embodiment of the systems, methods, and media disclosed herein, in this case, a user interface that allows a user to assess more options including managing profile (FIG. 20E), providing feedback (FIG. 20B), inviting others (FIG. 20C) and selecting language (FIG. 20D);

FIG. 21 shows a non-limiting exemplary embodiment of the systems, methods, and media disclosed herein, in this case, a user interface that allows a user to select user feedback and enter feedback information;

FIGS. 24A-24B show a non-limiting exemplary embodiment of the systems, methods, and media disclosed herein, in this case, a user interface that allows a user to zoom in to identify small surface water and measure distance from the user's location to the surface water;

FIG. 26 shows a non-limiting exemplary embodiment of the systems, methods, and media disclosed herein, in this case, a user interface of an administrative dashboard that allows a user to review and manage mapped districts or regions in the application for topographical feature identification and assessment;

FIG. 32 shows a non-limiting exemplary embodiment of the systems, methods, and media disclosed herein, in this case, a user interface of an administrative dashboard that allows a user to review and manage map requests;

FIG. 33 shows a non-limiting exemplary embodiment of the systems, methods, and media disclosed herein, in this case, a user interface of an administrative dashboard that allows a user to review and manage user feedbacks; and FIGS. 34A-34H show non-limiting exemplary embodiments of the systems, methods, and media disclosed herein, in this case, user interfaces of an administrative dashboard that allows a user to review and manage a list of alerts (FIG. 34A), users (FIG. 34B), administrative personnel (FIG. 34C), subscribers (FIG. 34D), requests for location switch (FIG. 34E), mapped areas (FIG. 34F), or countries (FIG. 34G).

INCORPORATION BY REFERENCE

Figure 1:
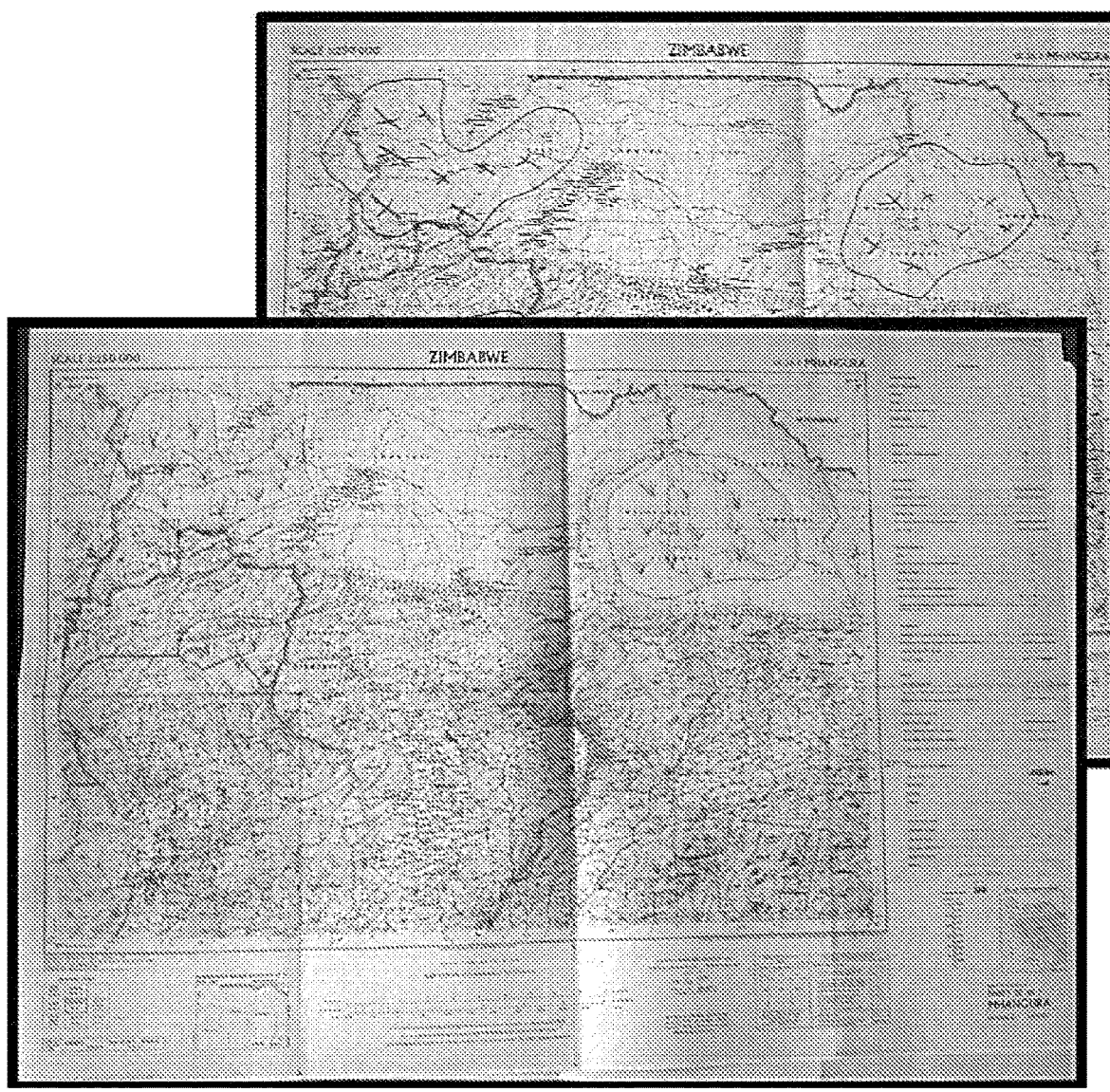
FIG. 1 shows a non-limiting exemplary embodiment of two different paper maps of the same land with hand-drawn areas as disclosed herein.

All publications, patents, and patent applications mentioned in this specification are herein incorporated by reference to the same extent as if each individual publication, patent, or patent application was specifically and individually indicated to be incorporated by reference.

DETAILED DESCRIPTION OF THE INVENTION

With climate change over the recent years, seasonal and spatial climate patterns have altered, making traditional methods for locating pasture increasingly unreliable and resource intensive. As a consequence, pastoralists are experiencing significant rates of herd mortality that can severely, and sometime entirely, deplete this crucial asset.

Currently, there is no user-friendly system, software, or device that is available to the pastoralists for locating available grazing areas and water based on satellite data. Existing platforms or models for analyzing Normalized Difference Vegetation Index (NDVI), indicative of "vegetative densities" of a land from satellite images, are designed for country-level analysis at the policy level and are not localized or tailored for the pastoral audience. Further, there are not current devices that combine community knowledge of all traditional grazing grounds with satellite data to enable accurate, reliable, and easy to use grazing maps for specific groups of pastoralists, especially when such traditional grazing ground may vary for different pastoral villages. Furthermore, no existing system, software, or device enable map delivery and viewing through entry-level smart phone devices. Other disadvantages of existing software, devices, or methods include that there is no digital maps available to pastoralists that additionally includes surface water locations, geo-referenced, crowd-sourced hazards, migration distance, topographical information of specific migration routes, historical data, or other information, which are also critically important to help the pastoralists make their migration decisions in combination with the vegetation map. Yet further, coloring or annotation of existing paper maps may be very limited and may cause misinterpretation for different pastoralist groups. Thus, there is an urgent need for accurate, reliable, and easy-to-use methods and systems that can assist pastoralists locate available pasture and other resources for migration throughout the year within their traditional grazing grounds that can span thousands of square kilometers. Such methods and systems are critical for reducing herd mortality especially during drought, and ultimately for the long-term development and economic growth of many countries.

In some cases, the systems, methods, and media disclosed herein advantageously provides the capability for generating composite cloud-free vegetation maps and/or surface water maps with high spatial and/or temporal resolution images, so that small changes in grazing areas may be detectable and perceivable to pastoral groups for deciding where to take their herds. Another advantage associated with the systems, methods, and media disclosed herein is the combination of community knowledge with digital vegetation and surface water maps. Such community knowledge is obtained from at least two representatives of different pastoral groups to accurately and reliably reflect the traditional grazing areas available for different pastoral groups. Such information is further digitized to form a custom composite map with the topographical information derived from satellite data. The digitization of traditional grazing areas with high accuracy and reliability helps to ensure relevancy to the pastoral groups in question. Further, restricting different pastoral clans to their traditional grazing areas can help maintain and conserve grazing areas from over-grazing or undesired competitions. In some embodiments, the systems, methods, and media disclosed herein provide more affordable solution without the time and cost to print and distribute paper maps. In certain cases, the systems, methods, and media disclosed herein provide much faster access to the vegetation and surface water maps so that pastoralists no longer have to rely on regulatory or government agencies for hand delivery of paper maps to their communities which are slow, time-consumer, inconsistent, and unreliable. In addition to that, the invention disclosed herein provides a platform to further crowdsource critical information related to pastoralists through real-time and georeferenced alerts in the digital maps to improve collaboration in their migrations. Furthermore, the systems, methods, and media disclosed herein may allow the pastoralists to geo-locate themselves and measure distance to their desired grazing area. Yet further, the systems, methods, and media disclosed herein advantageously provides the capability for a user to conveniently and easily switch views between vegetation maps and terrain modes so that pastoralists may conveniently assess the route condition, contour features, and migration difficulties for assessing migration decisions. More importantly, the systems, methods, and media disclosed herein enables a high resolution surface water display with the ability to scale the map (for example, zoom to see small ponds/watering holes of less than 10 square meters that often disappear in dry seasons and there is no way to know in advance. Such high resolution is also enabled by the invention disclosed herein to the vegetation map or NDVI map so that a high resolution combination of surface water and vegetation information may be made available to the pastoralists.

In one aspect, disclosed herein are computer-implemented systems for identifying and assessing topographical features using satellite data, the system comprising: a digital processing device comprising an operating system configured to perform executable instructions and a memory; a database of digital maps, each of the digital maps indicative of one or more areas of a land; and a computer program including instructions executable by the digital processing device to create a topographical feature identification and assessment application comprising: a software module receiving a first set of satellite data from first one or more satellites, the first set of satellite data indicative of a first topographical feature of the land for a time period; a software module calculating a normalized index array of the first topographic feature for the time period using the first set of satellite data; a software module generating a custom map, the custom map indicative of density of the first topographical feature of the land using the normalized index array; a software module combining the custom map with one of the digital maps to generate a combined map, the combined map indicative of the density of the first topographical feature within the one or more areas of the land for the time period; and a software module allowing a user to visualize the combined map on a digital display or print the combined map. In some embodiments, the first topographical feature is vegetation. In some embodiments the first topographical feature is during 1) a wet season, 2) a dry season, 3) an extreme dry season, 4) a severe drought season, or a combination thereof. In some embodiments the first one or more satellites include one or more of a geostationary satellite and a Meteosat Second Generation (MSG) satellite. In some embodiments the land is in Africa. In some embodiments one or more of the digital maps include an image resolution of about 3 kilometers by 3 kilometers. In some embodiments one or more of the digital maps include an image pixel size of about 3 kilometers by 3 kilometers. In some embodiments the one or more areas are delineated by at least two persons, each being a community representative. In some embodiments the one or more areas are drawn via interaction with one of the digital maps using an input device. In some embodiments the one or more areas are traditional grazing areas for at least one community. In some embodiments one of the digital maps is during 1) a wet season, 2) a dry season, 3) an extreme dry season, 4) a severe drought season, or a combination thereof. In some embodiments the system further comprises a software module combining at least one additional area with the one or more areas. In some embodiments the first set of satellite data comprises a satellite image taken with visible light, infrared (IR) light, near-infrared (NIR) light, short-wave infrared (SWIR) light, or a combination thereof. In some embodiments the first set of satellite data comprises more than one satellite image of an identical region at different time points. In some embodiments the first set of satellite data comprises more than one satellite image, at least one taken during day time. In some embodiments the first set of satellite data comprises a composite image generated from a plurality of satellite images taken at different time points. In some embodiments, the plurality of satellite images includes more than 100 images. In some embodiments the first set of satellite data comprises a cloud-free image generated from a plurality of satellite images taken at different time points. In some embodiments, the plurality of satellite images includes more than 100 images. In some embodiments, the cloud-free image is a composite image. In some embodiments, the system herein further comprises a software module performing atmospheric correction on the first set of satellite data. In some embodiments, the first set of satellite data includes at least one satellite image with an image resolution of about 3 kilometers by 3 kilometers. In some embodiments the first set of satellite data includes at least one satellite image with an image resolution of about 10 meters by 10 meters. In some embodiments the normalized index array is two dimensional and includes multiple values ranging between −1 and 1. In some embodiments the time period is about 1 to 14 days. In some embodiments the time period is during 1) a wet season, 2) a dry season, 3) an extreme dry season, 4) a severe drought season, or a combination thereof. In some embodiments, the system further comprises a software module receiving a second set of satellite data from second one or more satellites, the second set of satellite data indicative of a second topographical feature of the land for a time period. In some embodiments, the second topographical feature is surface water. In some embodiments, the second topographical feature is during 1) a wet season, 2) a dry season, 3) an extreme dry season, 4) a severe drought season, or a combination thereof. In some embodiments, the second one or more satellites include one or more SENTINEL satellites. In some embodiments, the second set of satellite data comprises a satellite image taken with visible, infrared, near infrared, short-wave infrared (SWIR) light, or a combination thereof. In some embodiments, the second set of satellite data comprises more than one satellite image of an identical region at different time points. In some embodiments, the second set of satellite data comprises more than one satellite image, at least one taken during day time. In some embodiments, the second set of satellite data comprises a composite image generated from a plurality of satellite images taken at different time points. In some embodiments, the second set of satellite data comprises a cloud-free image generated from a plurality of satellite images taken at different time points. In some embodiments, the cloud-free image is a composite image. In some embodiments, the second set of satellite data includes an image with an image resolution of about 10 meters by about 10 meters. In some embodiments, the second set of satellite data includes an image with an image pixel size of less than about 10 square meters. In some embodiments, the time period is about 1 to 14 days. In some embodiments, the time period is during 1) a wet season, 2) a dry season, 3) an extreme dry season, 4) a severe drought season, or a combination thereof. In some embodiments, the system further comprises a software module generating a second custom map, the second custom map indicative of distribution, permanence, or both of the second topographical feature of the land for the time period. In some embodiments, the second custom map is obtained by averaging data from the second set of satellite data obtained in the time period. In some embodiments, the system further comprises a software module combining the second custom map with the custom map and the one of the digital maps to generate a second combined map. In some embodiments, the second combined map indicates the first and second topographical features within the one or more areas of the land during the time period. In some embodiments, the combination of the second custom map with the custom map and the one of the digital maps is via superimposing. In some embodiments, the system further comprises a software module allowing the user to visualize the second combined map of the land on the digital display. In some embodiments, the system further comprises a software module allowing the user to visualize an alert on the second combined map. In some embodiments, the alert includes a geolocation and a time. In some embodiments, the system further comprises a software module allowing the user to visualize an alert on the combined map. In some embodiments, the alert includes a geolocation and a time. In some embodiments, the system further comprises a software module allowing the user to obtain a geolocation of the user and measure a distance to the one or more areas. In some embodiments, the system further comprises a software module allowing the user to interact with the custom map, the combined map, or both. In some embodiments, the software module allowing the user to interact with the custom map, the combined map, or both comprises allowing the user to zoom in or zoom out; switch among more than one viewing mode, wherein the more than one viewing mode includes a terrain viewing mode; and view one or more historical combined maps, said historical combined maps generated prior to the combined map in time. In some embodiments, allowing the user to switch among more than one viewing mode comprises switching between viewing the combined map and viewing a terrain map of a same region to assess migration route. In some embodiments the one or more areas of the land are derived from information obtained from at least one pastoral community. In some embodiments, the information is indicative of one or more traditional grazing areas for the at least one pastoral community. In some embodiments, the combined map is generated about every 10 days continuously. In some embodiments, the digital processing device is a mobile device.

In another aspect, disclosed herein are non-transitory computer-readable storage media encoded with a computer program including instructions executable by a processor to create a topographical feature identification and assessment application using satellite data, the media comprising: a database of digital maps, each of the digital maps indicative of one or more areas of a land; a software module receiving a first set of satellite data from first one or more satellites, the first set of satellite data indicative of a first topographical feature of the land for a time period; a software module calculating a normalized index array of the first topographic feature for the time period using the first set of satellite data; a software module generating a custom map, the custom map indicative of density of the first topographical feature of the land using the normalized index array; a software module combining the custom map with one of the digital maps to generate a combined map, the combined map indicative of the density of the first topographical feature within the one or more areas of the land for the time period; and a software module allowing a user to visualize the combined map on a digital display or print the combined map. In some embodiments, the first topographical feature is vegetation. In some embodiments, the first topographical feature is during 1) a wet season, 2) a dry season, 3) an extreme dry season, 4) a severe drought season, or a combination thereof. In some embodiments, the first one or more satellites include one or more of a geostationary satellite and a Meteosat Second Generation (MSG) satellite. In some embodiments, the land is in Africa. In some embodiments, one or more of the digital maps include an image resolution of about 3 kilometers by 3 kilometers. In some embodiments, one or more of the digital maps include an image pixel size of about 3 kilometers by 3 kilometers. In some embodiments, the one or more areas are delineated by at least two persons, each being a community representative. In some embodiments, the at least one or more areas are drawn via interaction with one of the digital maps using an input device. In some embodiments, the one or more areas are traditional grazing areas for at least one community. In some embodiments, one of the digital maps is during 1) a wet season, 2) a dry season, 3) an extreme dry season, 4) a severe drought season, or a combination thereof. In some embodiments, the system further comprises a software module combining at least one additional area with the one or more areas. In some embodiments, the first set of satellite data comprises a satellite image taken with visible light, infrared (IR) light, near-infrared (NIR) light, short-wave infrared (SWIR) light, or a combination thereof. In some embodiments, the first set of satellite data comprises more than one satellite image of an identical region at different time points. In some embodiments, the first set of satellite data comprises more than one satellite image, at least one taken during day time. In some embodiments, the first set of satellite data comprises a composite image generated from a plurality of satellite images taken at different time points. In some embodiments, the plurality of satellite images includes more than 100 images. In some embodiments, the first set of satellite data comprises a cloud-free image generated from a plurality of satellite images taken at different time points. In some embodiments, the plurality of satellite images includes more than 100 images. In some embodiments, the cloud-free image is a composite image. In some embodiments, the media further comprises a software module performing atmospheric correction on the first set of satellite data. In some embodiments, the first set of satellite data includes at least one satellite image with an image resolution of about 3 kilometers by 3 kilometers. In some embodiments, the first set of satellite data includes at least one satellite image with an image resolution of about 10 meters by 10 meters. In some embodiments, the normalized index array is two dimensional and includes multiple values ranging between −1 and 1. In some embodiments, the time period is about 1 to 14 days. In some embodiments, the time period is during 1) a wet season, 2) a dry season, 3) an extreme dry season, 4) a severe drought season, or a combination thereof. In some embodiments, the media further comprises a software module receiving a second set of satellite data from second one or more satellites, the second set of satellite data indicative of a second topographical feature of the land for a time period. In some embodiments, the second topographical feature is surface water. In some embodiments, the second topographical feature is during 1) a wet season, 2) a dry season, 3) an extreme dry season, 4) a severe drought season, or a combination thereof. In some embodiments, the second one or more satellites include one or more SENTINEL satellites. In some embodiments, the second set of satellite data comprises a satellite image taken with visible, infrared, near infrared, short-wave infrared (SWIR) light, or a combination thereof. In some embodiments, the second set of satellite data comprises more than one satellite image of an identical region at different time points. In some embodiments, the second set of satellite data comprises more than one satellite image, at least one taken during day time. In some embodiments, the second set of satellite data comprises a composite image generated from a plurality of satellite images taken at different time points. In some embodiments, the second set of satellite data comprises a cloud-free image generated from a plurality of satellite images taken at different time points. In some embodiments, the cloud-free image is a composite image. In some embodiments, the second set of satellite data includes an image with an image resolution of about 10 meters by about 10 meters. In some embodiments, the second set of satellite data includes an image with an image pixel size of less than about 10 square meters. In some embodiments, the time period is about 1 to 14 days. In some embodiments, the time period is during 1) a wet season, 2) a dry season, 3) an extreme dry season, 4) a severe drought season, or a combination thereof. In some embodiments, the system further comprises a software module generating a second custom map, the second custom map indicative of distribution, permanence, or both of the second topographical feature of the land for the time period. In some embodiments, the second custom map is obtained by averaging data from the second set of satellite data obtained in the time period. In some embodiments, the system further comprises a software module combining the second custom map with the custom map and the one of the digital maps to generate a second combined map. In some embodiments, the second combined map indicates the first and second topographical features within the one or more areas of the land during the time period. In some embodiments, the combination of the second custom map with the custom map and the one of the digital maps is via superimposing. In some embodiments, the system further comprises a software module allowing the user to visualize the second combined map of the land on the digital display. In some embodiments, the system further comprises a software module allowing the user to visualize an alert on the second combined map. In some embodiments, the alert includes a geolocation and a time. In some embodiments, the media further comprises a software module allowing the user to visualize an alert on the combined map. In some embodiments, the alert includes a geolocation and a time. In some embodiments, the media further comprises a software module allowing the user to obtain a geolocation of the user and measure a distance to the one or more areas. In some embodiments, the media further comprises a software module allowing the user to interact with the custom map, the combined map, or both. In some embodiments, the software module allowing the user to interact with the custom map, the combined map, or both comprises allowing the user to zoom in or zoom out; switch among more than one viewing mode, wherein the more than one viewing mode includes a terrain viewing mode; and view one or more historical combined maps, said historical combined maps generated prior to the combined map in time. In some embodiments, allowing the user to switch among more than one viewing mode comprises switching between viewing the combined map and viewing a terrain map of a same region to assess migration route. In some embodiments, the one or more areas of the land are derived from information obtained from at least one pastoral community. In some embodiments, the information is indicative of one or more traditional grazing areas for the at least one pastoral community. In some embodiments, the combined map is generated about every 10 days continuously. In some embodiments, the digital processing device is a mobile device.

Disclosed herein, in another aspect, are computer-implemented methods for identifying and assessing topographical features using satellite data, the method comprising: generating, by a computer, one or more digital maps, each of the digital maps indicative of one or more areas of a land; receiving, by the computer, a first set of satellite data from first one or more satellites, the first set of satellite data indicative of a first topographical feature of the land for a time period; calculating, by the computer, a normalized index array of the first topographic feature for the time period using the first set of satellite data; generating, by the computer, a custom map, the custom map indicative of density of the first topographical feature of the land using the normalized index array; combining, by the computer, the custom map with one of the digital maps to generate a combined map, the combined map indicative of the density of the first topographical feature within the one or more areas of the land for the time period; and allowing a user to visualize the combined map on a digital display by the computer or print the combined map by a printer. In some embodiments, the first topographical feature is vegetation. In some embodiments, the first topographical feature is during 1) a wet season, 2) a dry season, 3) an extreme dry season, 4) a severe drought season, or a combination thereof. In some embodiments, the first one or more satellites include one or more of a geostationary satellite and a Meteosat Second Generation (MSG) satellite. In some embodiments, the land is in Africa. In some embodiments, one or more of the digital maps include an image resolution of about 3 kilometers by 3 kilometers. In some embodiments, one or more of the digital maps include an image pixel size of about 3 kilometers by 3 kilometers. In some embodiments, the one or more areas are delineated by at least two persons, each being a community representative. In some embodiments, the at least one or more areas are drawn via interaction with one of the digital maps using an input device. In some embodiments, the one or more areas are traditional grazing areas for at least one community. In some embodiments, one of the digital maps is during 1) a wet season, 2) a dry season, 3) an extreme dry season, 4) a severe drought season, or a combination thereof. In some embodiments, the system further comprises a software module combining at least one additional area with the one or more areas. In some embodiments, the first set of satellite data comprises a satellite image taken with visible light, infrared (IR) light, near-infrared (NIR) light, short-wave infrared (SWIR) light, or a combination thereof. In some embodiments, the first set of satellite data comprises more than one satellite images of an identical region at different time points. In some embodiments, the first set of satellite data comprises more than one satellite images, at least one taken during day time. In some embodiments, the first set of satellite data comprises a composite image generated from a plurality of satellite images taken at different time points. In some embodiments, the plurality of satellite images includes more than 100 images. In some embodiments, the first set of satellite data comprises a cloud-free image generated from a plurality of satellite images taken at different time points. In some embodiments, the plurality of satellite images includes more than 100 images. In some embodiments, the cloud-free image is a composite image. In some embodiments, the method further comprises performing atmospheric correction on the first set of satellite data. In some embodiments, the first set of satellite data includes at least one satellite image with an image resolution of about 3 kilometers by 3 kilometers. In some embodiments, the first set of satellite data includes at least one satellite image with an image resolution of about 10 meters by 10 meters. In some embodiments, the normalized index array is two dimensional and includes multiple values ranging between −1 and 1. In some embodiments, the time period is about 1 to 14 days. In some embodiments, the time period is during 1) a wet season, 2) a dry season, 3) an extreme dry season, 4) a severe drought season, or a combination thereof. In some embodiments, the method further comprises a software module receiving a second set of satellite data from second one or more satellites, the second set of satellite data indicative of a second topographical feature of the land for a time period. In some embodiments, the second topographical feature is surface water. In some embodiments, the second topographical feature is during 1) a wet season, 2) a dry season, 3) an extreme dry season, 4) a severe drought season, or a combination thereof. In some embodiments, the second one or more satellites include one or more SENTINEL satellites. In some embodiments, the second set of satellite data comprises a satellite image taken with visible, infrared, near infrared, short-wave infrared (SWIR) light, or a combination thereof. In some embodiments, the second set of satellite data comprises more than one satellite images of an identical region at different time points. In some embodiments, the second set of satellite data comprises more than one satellite images, at least one taken during day time. In some embodiments, the second set of satellite data comprises a composite image generated from a plurality of satellite images taken at different time points. In some embodiments, the second set of satellite data comprises a cloud-free image generated from a plurality of satellite images taken at different time points. In some embodiments, the cloud-free image is a composite image. In some embodiments, the second set of satellite data includes an image with an image resolution of about 10 meters by about 10 meters. In some embodiments, the second set of satellite data includes an image with an image pixel size of less than about 10 square meters. In some embodiments, the time period is about 1 to 14 days. In some embodiments, the time period is during 1) a wet season, 2) a dry season, 3) an extreme dry season, 4) a severe drought season, or a combination thereof. In some embodiments, the method further comprises a software module generating a second custom map, the second custom map indicative of distribution, permanence, or both of the second topographical feature of the land for the time period. In some embodiments, the second custom map is obtained by averaging data from the second set of satellite data obtained in the time period. In some embodiments, the method further comprises a software module combining the second custom map with the custom map and the one of the digital maps to generate a second combined map. In some embodiments, the second combined map indicates the first and second topographical features within the one or more areas of the land during the time period. In some embodiments, the combination of the second custom map with the custom map and the one of the digital maps is via superimposing. In some embodiments, the method further comprises allowing the user to visualize the second combined map of the land on the digital display. In some embodiments, the method further comprises allowing the user to visualize an alert on the second combined map. In some embodiments, the method further comprises a software module allowing the user to visualize an alert on the combined map. In some embodiments, the alert includes a geolocation and a time. In some embodiments, the method further comprises allowing the user to obtain a geolocation of the user and measure a distance to the one or more areas. In some embodiments, the method further comprises allowing the user to interact with the custom map, the combined map, or both. In some embodiments, allowing the user to interact with the custom map, the combined map, or both comprises allowing the user to zoom in or zoom out; switch among more than one viewing mode, wherein the more than one viewing mode includes a terrain viewing mode; and view one or more historical combined maps, said historical combined maps generated prior to the combined map in time. In some embodiments, allowing the user to switch among more than one viewing mode comprises switching between viewing the combined map and viewing a terrain map of a same region to assess migration route. In some embodiments, the one or more areas of the land are derived from information obtained from at least one pastoral community. In some embodiments, the information is indicative of one or more traditional grazing areas for the at least one pastoral community. In some embodiments, the combined map is generated about every 10 days continuously. In some embodiments, the digital processing device is a mobile device.

Disclosed herein, in yet another aspect are computer-implemented systems for identifying and assessing topographical features using satellite data, the system comprising: a digital processing device comprising an operating system configured to perform executable instructions and a memory; a database of digital maps, each of the digital maps generated based on community information of one or more areas of a land; and a computer program including instructions executable by the digital processing device to create a topographical feature identification and assessment application comprising: a software module receiving a first set of satellite data from first one or more satellites, the first set of satellite data indicative of a first topographical feature of the land for a time period; a software module receiving a second set of satellite data from second one or more satellites, the second set of satellite data indicative of a second topographical feature of the land for the time period; a software module calculating a normalized difference vegetation index array of the first topographic feature for the time period using the first set of satellite data; a software module generating a custom map, the custom map indicative of density of the first topographical feature of the land using the normalized index array; a software module generating a second custom map, the second custom map indicative of distribution, permanence, or both of surface water of the land for the time period; a software module combining the first and second custom maps with one of the digital maps to generate a combined map, the combined map indicative of the density of the first topographical feature and distribution, permanence, or both of the second topographical feature within the one or more areas of the land for the time period; and a software module allowing a user to visualize the combined map on a digital display or print the combined maps. In some embodiments, the first topographical feature is vegetation. In some embodiments the first topographical feature is during 1) a wet season, 2) a dry season, 3) an extreme dry season, 4) a severe drought season, or a combination thereof. In some embodiments the first one or more satellites include one or more of a geostationary satellite and a Meteosat Second Generation (MSG) satellite. In some embodiments the land is in Africa. In some embodiments one or more of the digital maps include an image resolution of about 3 kilometers by 3 kilometers. In some embodiments one or more of the digital maps include an image pixel size of about 3 kilometers by 3 kilometers. In some embodiments the one or more areas are delineated by at least two persons, each being a community representative. In some embodiments the one or more areas are drawn via interaction with one of the digital maps using an input device. In some embodiments the one or more areas are traditional grazing areas for at least one community. In some embodiments one of the digital maps is during 1) a wet season, 2) a dry season, 3) an extreme dry season, 4) a severe drought season, or a combination thereof. In some embodiments the system further comprises a software module combining at least one additional area with the one or more areas. In some embodiments the first set of satellite data comprises a satellite image taken with visible light, infrared (IR) light, near-infrared (NIR) light, short-wave infrared (SWIR) light, or a combination thereof. In some embodiments the first set of satellite data comprises more than one satellite image of an identical region at different time points. In some embodiments the first set of satellite data comprises more than one satellite image, at least one taken during day time. In some embodiments the first set of satellite data comprises a composite image generated from a plurality of satellite images taken at different time points. In some embodiments, the plurality of satellite images includes more than 100 images. In some embodiments the first set of satellite data comprises a cloud-free image generated from a plurality of satellite images taken at different time points. In some embodiments, the plurality of satellite images includes more than 100 images. In some embodiments, the cloud-free image is a composite image. In some embodiments, the system herein further comprises a software module performing atmospheric correction on the first set of satellite data. In some embodiments, the first set of satellite data includes at least one satellite image with an image resolution of about 3 kilometers by 3 kilometers. In some embodiments the first set of satellite data includes at least one satellite image with an image resolution of about 10 meters by 10 meters. In some embodiments the normalized index array is two dimensional and includes multiple values ranging between −1 and 1. In some embodiments the time period is about 1 to 14 days. In some embodiments the time period is during 1) a wet season, 2) a dry season, 3) an extreme dry season, 4) a severe drought season, or a combination thereof. In some embodiments, the system further comprises a software module receiving a second set of satellite data from second one or more satellites, the second set of satellite data indicative of a second topographical feature of the land for a time period. In some embodiments, the second topographical feature is surface water. In some embodiments, the second topographical feature is during 1) a wet season, 2) a dry season, 3) an extreme dry season, 4) a severe drought season, or a combination thereof. In some embodiments, the second one or more satellites include one or more SENTINEL satellites. In some embodiments, the second set of satellite data comprises a satellite image taken with visible, infrared, near infrared, short-wave infrared (SWIR) light, or a combination thereof. In some embodiments, the second set of satellite data comprises more than one satellite image of an identical region at different time points. In some embodiments, the second set of satellite data comprises more than one satellite image, at least one taken during day time. In some embodiments, the second set of satellite data comprises a composite image generated from a plurality of satellite images taken at different time points. In some embodiments, the second set of satellite data comprises a cloud-free image generated from a plurality of satellite images taken at different time points. In some embodiments, the cloud-free image is a composite image. In some embodiments, the second set of satellite data includes an image with an image resolution of about 10 meters by about 10 meters. In some embodiments, the second set of satellite data includes an image with an image pixel size of less than about 10 square meters. In some embodiments, the time period is about 1 to 14 days. In some embodiments, the time period is during 1) a wet season, 2) a dry season, 3) an extreme dry season, 4) a severe drought season, or a combination thereof. In some embodiments, the system further comprises a software module generating a second custom map, the second custom map indicative of distribution, permanence, or both of the second topographical feature of the land for the time period. In some embodiments, the second custom map is obtained by averaging data from the second set of satellite data obtained in the time period. In some embodiments, the system further comprises a software module combining the second custom map with the custom map and the one of the digital maps to generate a second combined map. In some embodiments, the second combined map indicates the first and second topographical features within the one or more areas of the land during the time period. In some embodiments, the combination of the second custom map with the custom map and the one of the digital maps is via superimposing. In some embodiments, the system further comprises a software module allowing the user to visualize the second combined map of the land on the digital display. In some embodiments, the system further comprises a software module allowing the user to visualize an alert on the second combined map. In some embodiments, the alert includes a geolocation and a time. In some embodiments, the system further comprises a software module allowing the user to visualize an alert on the combined map. In some embodiments, the alert includes a geolocation and a time. In some embodiments, the system further comprises a software module allowing the user to obtain a geolocation of the user and measure a distance to the one or more areas. In some embodiments, the system further comprises a software module allowing the user to interact with the custom map, the combined map, or both. In some embodiments, the software module allowing the user to interact with the custom map, the combined map, or both comprises allowing the user to zoom in or zoom out; switch among more than one viewing mode, wherein the more than one viewing mode includes a terrain viewing mode; and view one or more historical combined maps, said historical combined maps generated prior to the combined map in time. In some embodiments, allowing the user to switch among more than one viewing mode comprises switching between viewing the combined map and viewing a terrain map of a same region to assess migration route. In some embodiments, the one or more areas of the land are derived from information obtained from at least one pastoral community. In some embodiments, the information is indicative of one or more traditional grazing areas for the at least one pastoral community. In some embodiments, the combined map is generated about every 10 days continuously. In some embodiments, the digital processing device is a mobile device.

In yet another aspect, disclosed herein is a computer-implemented method for identifying and assessing topographical features using satellite data, the method comprising: receiving, by the computer a first set of satellite data from first one or more satellites, the first set of satellite data indicative of a first topographical feature and a second topographical feature of the land for a time period at a first resolution; receiving a second set of satellite data from the first one or more satellites or second one or more satellites, the second set of satellite data indicative of the first topographical feature and the second topographical feature of the land for the time period at a second resolution higher than the first resolution; generating a normalized index array of the first topographic feature for the time period at the second resolution by fusing the first set of satellite data and the second set of satellite data; generating a custom map at the second resolution, the custom map indicative of density of the first topographical feature of the land using the normalized index array; generating a second custom map at the second resolution, the second custom map indicative of distribution, permanence, or both of the second topographical feature of the land for the time period; comparing the first and second custom maps with one or more of digital masks to generate a combined map at the second resolution, the combined map indicative of the density of the first topographical feature and distribution, permanence, or both of the second topographical feature within the one or more areas of the land for the time period; and rendering the combined map for displaying on a digital display or printing.

In yet another aspect, disclosed herein is a computer-implemented method for identifying and assessing topographical features using satellite data, the method comprising: receiving, by a computer, a first set of satellite data from first one or more satellites, the first set of satellite data indicative of a first topographical feature of the land for a time period at a first resolution; receiving, by the computer, a second set of satellite data at a second resolution from the first one or more satellites or second one or more satellites, the second set of satellite data indicative of a first topographical feature of the land for a time period at a second resolution; generating, by the computer, a normalized index array of the first topographic feature for the time period at the second resolution by fusing the first set of satellite data and the second set of satellite data; generating, by the computer, a custom map, the custom map indicative of density of the first topographical feature of the land using the normalized index array; and comparing, the computer, the custom map with one or more of the masks of digital maps to produce a combined map at the second resolution, the combined map indicative of the density of the first topographical feature within the one or more areas of the land for the time period at the second resolution. In some embodiments, the first topographical feature is vegetation. In some embodiments, the first topographical feature is during 1) a wet season, 2) a dry season, 3) an extreme dry season, 4) a severe drought season, or a combination thereof. In some embodiments, the first one or more satellites include one or more of a geostationary satellite and a Meteosat Second Generation (MSG) satellite. In some embodiments, the land is in Africa. In some embodiments, the digital maps include an image resolution of about 3 kilometers by 3 kilometers. In some embodiments, the digital maps include an image resolution of about 10 meters by 10 meters. In some embodiments, the one or more areas are delineated by at least two persons, each being a pastoral community representative. In some embodiments, the one or more areas are drawn via interaction with one of the digital maps using an input device. In some embodiments, the one or more areas are traditional grazing areas for at least one pastoral community. In some embodiments, one of the digital maps is during 1) a wet season, 2) a dry season, 3) an extreme dry season, 4) a severe drought season, or a combination thereof. The method may further comprise combining at least one additional area with the one or more areas, wherein the at least one additional area is an additional traditional gazing area. In some embodiments, the first set of satellite data comprises a satellite image taken with visible light, infrared (IR) light, near-infrared (NIR) light, short-wave infrared (SWIR) light, or a combination thereof. In some embodiments, the first set of satellite data comprises more than one satellite image of an identical region at different time points. In some embodiments, the first set of satellite data comprises more than one satellite image, at least one taken during day time. In some embodiments, the first set of satellite data comprises a composite image generated from a plurality of satellite images taken at different time points. In some embodiments, the plurality of satellite images includes more than 100 images. In some embodiments, the first set of satellite data comprises a cloud-free image generated from a plurality of satellite images taken at different time points. In some embodiments, the plurality of satellite images includes more than 100 images. In some embodiments, the cloud-free image is a composite image. The method may further comprise performing, by the computer, atmospheric correction on the first set of satellite data, the second set of satellite data, or both. In some embodiments, the first resolution is about 3 kilometers by 3 kilometers or greater. In some embodiments, the first resolution is about 2 kilometers by 2 kilometers or greater. In some embodiments, the normalized index array is two dimensional and includes multiple values ranging between −1 and 1. In some embodiments, the time period is about 1 to 14 days. In some embodiments, the time period is during 1) a wet season, 2) a dry season, 3) an extreme dry season, 4) a severe drought season, or a combination thereof. In some embodiments, the second set of satellite data comprises 1, 2, 4, 6, 8, 10, 12, 14, 16, 18, or 20 images. In some embodiments, the second topographical feature is during 1) a wet season, 2) a dry season, 3) an extreme dry season, 4) a severe drought season, or a combination thereof. In some embodiments, the second one or more satellites include one or more SENTINEL satellites. In some embodiments, the second set of satellite data comprises a satellite image taken with visible, infrared, near infrared, short-wave infrared (SWIR) light, or a combination thereof. In some embodiments, the second set of satellite data comprises more than one satellite image of an identical region at different time points. In some embodiments, the second set of satellite data comprises more than one satellite image, at least one taken during day time. In some embodiments, the second set of satellite data comprises a composite image generated from a plurality of satellite images taken at different time points. In some embodiments, the second set of satellite data comprises a cloud-free image generated from a plurality of satellite images taken at different time points. In some embodiments, the cloud-free image is a composite image. In some embodiments, the second resolution is about 10 meters by about 10 meters. In some embodiments, the second set of satellite data includes an image with an image pixel size of less than about 10 square meters. In some embodiments, the time period is about 1 to 14 days. In some embodiments, the time period is during 1) a wet season, 2) a dry season, 3) an extreme dry season, 4) a severe drought season, or a combination thereof. In some embodiments, the first set of satellite data is further indicative of a second topographical feature of the land for the time period at the first resolution, and the second set of satellite data is further indicative of the second topographical feature of the land for the time period at the second resolution. The method may further comprise generating, by the computer, a second custom map, the second custom map indicative of distribution, permanence, or both of the second topographical feature of the land for the time period at the second resolution by fusing the first set of satellite data at the first resolution and the second set of satellite data at the second resolution. In some embodiments, the second topographical feature is surface water. In some embodiments, the second custom map is obtained by averaging data from the second set of satellite data, the first set of satellite data, or both. The method may further comprise superimposing, by the computer, the second custom map on the custom map; and comparing, by the computer, the superimposed custom map with the one or more of the masks of the digital maps to produce a second combined map. In some embodiments, the second combined map indicates the first and second topographical features within the one or more areas of the land during the time period. The method may further comprise a software module allowing the user to visualize the second combined map of the land on the digital display. The method may further comprise a software module allowing the user to visualize an alert on the second combined map. In some embodiments, the alert includes a geolocation and a time. The method may further comprise a software module allowing the user to visualize an alert on the combined map. In some embodiments, the alert includes a geolocation and a time. The method may further comprise allowing the user to obtain a geolocation of the user and measure a distance to the one or more areas. The method of any one of the preceding claims further comprises allowing the user to interact with the custom map, the combined map, or both. In some embodiments, allowing the user to interact with the custom map, the combined map, or both comprises allowing the user to zoom in or zoom out; switch among more than one viewing mode, wherein the more than one viewing mode includes a terrain viewing mode; and view one or more historical combined maps, said historical combined maps generated prior to the combined map in time. In some embodiments, allowing the user to switch among more than one viewing mode comprises switching between viewing the combined map and viewing a terrain map of a same region to assess migration route. In some embodiments, the one or more areas of the land are derived from information obtained from at least one pastoral community. In some embodiments, the information is indicative of one or more traditional grazing areas for the at least one pastoral community. In some embodiments, the combined map or the second combined map is generated about every 10 days continuously.

In yet another aspect, disclosed herein is a computer-implemented system for identifying and assessing topographical features using satellite data, the system comprising: a digital processing device comprising an operating system configured to perform executable instructions and a memory; a database of digital maps, the digital maps comprising masks indicative of one or more areas of a land; and a computer program including instructions executable by the digital processing device to create a topographical feature identification and assessment application comprising: a software module receiving a first set of satellite data from first one or more satellites, the first set of satellite data indicative of a first topographical feature of the land for a time period at a first resolution; a software module receiving a second set of satellite data at a second resolution from first one or more satellites or second one or more satellites, the second set of satellite data indicative of a first topographical feature of the land for a time period at a second resolution; a software module generating a normalized index array of the first topographic feature for the time period at the second resolution by fusing the first set of satellite data at the first resolution and the second set of satellite data at the second resolution; a software module generating a custom map, the custom map indicative of density of the first topographical feature of the land using the normalized index array; a software module comparing the custom map with one or more of the masks of the digital maps to produce a combined map at the second resolution, the combined map indicative of the density of the first topographical feature within the one or more areas of the land for the time period; and a software module allowing a user to visualize the combined map on a digital display or print the combined map. In some embodiments, the first topographical feature is vegetation. In some embodiments, the first topographical feature is during 1) a wet season, 2) a dry season, 3) an extreme dry season, 4) a severe drought season, or a combination thereof. In some embodiments, the first one or more satellites include one or more of a geostationary satellite and a Meteosat Second Generation (MSG) satellite. In some embodiments, the land is in Africa. In some embodiments, one or more of the digital maps include an image resolution of about 3 kilometers by 3 kilometers. In some embodiments, one or more of the digital maps include an image resolution of about 10 meters by 10 meters. In some embodiments, the one or more areas are delineated by at least two persons, each being a pastoral community representative. In some embodiments, the one or more areas are drawn via interaction with one of the digital maps using an input device. In some embodiments, the one or more areas are traditional grazing areas for at least one pastoral community. In some embodiments, one of the digital maps is during 1) a wet season, 2) a dry season, 3) an extreme dry season, 4) a severe drought season, or a combination thereof. In some embodiments, the system further comprises a software module combining at least one additional area with the one or more areas, wherein the at least one additional area is an additional traditional gazing area. In some embodiments, the first set of satellite data comprises a satellite image taken with visible light, infrared (IR) light, near-infrared (NIR) light, short-wave infrared (SWIR) light, or a combination thereof. In some embodiments, the first set of satellite data comprises more than one satellite image of an identical region at different time points. In some embodiments, the first set of satellite data comprises more than one satellite image, at least one taken during day time. In some embodiments, the first set of satellite data comprises a composite image generated from a plurality of satellite images taken at different time points. In some embodiments, the plurality of satellite images includes more than 100 images. In some embodiments, the first set of satellite data comprises a cloud-free image generated from a plurality of satellite images taken at different time points. In some embodiments, the plurality of satellite images includes more than 100 images. In some embodiments, the cloud-free image is a composite image. The system may further comprise a software module performing atmospheric correction on the first set of satellite data. In some embodiments, the first resolution is about 3 kilometers by 3 kilometers or greater. In some embodiments, the first resolution is about 2 kilometers by 2 kilometers or greater. In some embodiments, the normalized index array is two dimensional and includes multiple values ranging between −1 and 1. In some embodiments, the time period is about 1 to 14 days. In some embodiments, the time period is during 1) a wet season, 2) a dry season, 3) an extreme dry season, 4) a severe drought season, or a combination thereof. In some embodiments, the second set of satellite data comprises 1, 2, 4, 6, 8, 10, 12, 14, 16, 18, or 20 images. In some embodiments, the second topographical feature is during 1) a wet season, 2) a dry season, 3) an extreme dry season, 4) a severe drought season, or a combination thereof. In some embodiments, the second one or more satellites include one or more SENTINEL satellites. In some embodiments, the second set of satellite data comprises a satellite image taken with visible, infrared, near infrared, short-wave infrared (SWIR) light, or a combination thereof. In some embodiments, the second set of satellite data comprises more than one satellite image of an identical region at different time points. In some embodiments, the second set of satellite data comprises more than one satellite image, at least one taken during day time. In some embodiments, the second set of satellite data comprises a composite image generated from a plurality of satellite images taken at different time points. In some embodiments, the second set of satellite data comprises a cloud-free image generated from a plurality of satellite images taken at different time points. In some embodiments, the cloud-free image is a composite image. In some embodiments, the second resolution is about 10 meters by about 10 meters. In some embodiments, the second set of satellite data includes an image with an image pixel size of less than about 10 square meters. In some embodiments, the time period is about 1 to 14 days. In some embodiments, the time period is during 1) a wet season, 2) a dry season, 3) an extreme dry season, 4) a severe drought season, or a combination thereof. In some embodiments, the first set of satellite data is further indicative of a second topographical feature of the land for the time period at the first resolution, and the second set of satellite data is further indicative of a second topographical feature of the land for the time period at the second resolution. The system may further comprise a software module generating a second custom map, the second custom map indicative of distribution, permanence, or both of the second topographical feature of the land for the time period at the second resolution by fusing the first set of satellite data and the second set of satellite data. In some embodiments, the second topographical feature is surface water. In some embodiments, the second custom map is obtained by averaging data from the first set of satellite data, the second set of satellite data, or both obtained in the time period. The system may further comprise a software module superimposing the second custom map on the custom map; and comparing the superimposed custom map with the one or more of the masks of the digital maps to produce a second combined map. In some embodiments, the second combined map indicates the first and second topographical features within the one or more areas of the land during the time period. The system may further comprise a software module allowing the user to visualize the second combined map of the land on the digital display. The system may further comprise a software module allowing the user to visualize an alert on the second combined map. In some embodiments, the alert includes a geolocation and a time. The system may further comprise a software module allowing the user to visualize an alert on the combined map. In some embodiments, the alert includes a geolocation and a time. The system may further comprise a software module allowing the user to obtain a geolocation of the user and measure a distance to the one or more areas. The system may further comprise a software module allowing the user to interact with the custom map, the combined map, or both. In some embodiments, the software module allowing the user to interact with the custom map, the combined map, or both comprises allowing the user to zoom in or zoom out; switch among more than one viewing mode, wherein the more than one viewing mode includes a terrain viewing mode; and view one or more historical combined maps, said historical combined maps generated prior to the combined map in time. In some embodiments, the software allowing the user to switch among more than one viewing mode comprises switching between viewing the combined map and viewing a terrain map of a same region to assess migration route. In some embodiments, the one or more areas of the land are derived from information obtained from at least one pastoral community. In some embodiments, the information is indicative of one or more traditional grazing areas for the at least one pastoral community. In some embodiments, the combined map is generated about every 10 days continuously. In some embodiments, the digital processing device is a mobile device.

In yet another aspect, disclosed herein is non-transitory computer-readable storage media encoded with a computer program including instructions executable by a processor to create a topographical feature identification and assessment application using satellite data, the media comprising: a database of digital maps, each of the digital maps indicative of one or more areas of a land; a software module receiving a first set of satellite data from first one or more satellites, the first set of satellite data indicative of a first topographical feature of the land for a time period; a software module calculating a normalized index array of the first topographic feature for the time period using the first set of satellite data; a software module generating a custom map, the custom map indicative of density of the first topographical feature of the land using the normalized index array; a software module combining the custom map with one of the digital maps to generate a combined map, the combined map indicative of the density of the first topographical feature within the one or more areas of the land for the time period; and a software module allowing a user to visualize the combined map on a digital display or print the combined map. In some embodiments, the first topographical feature is vegetation. In some embodiments, the first topographical feature is during 1) a wet season, 2) a dry season, 3) an extreme dry season, 4) a severe drought season, or a combination thereof. In some embodiments, the first one or more satellites include one or more of a geostationary satellite and a Meteosat Second Generation (MSG) satellite. In some embodiments, the land is in Africa. In some embodiments, one or more of the digital maps include an image resolution of about 3 kilometers by 3 kilometers. In some embodiments, one or more of the digital maps include an image resolution of about 10 meters by 10 meters. In some embodiments, the one or more areas are delineated by at least two persons, each being a pastoral community representative. In some embodiments, the one or more areas are drawn via interaction with one of the digital maps using an input device. In some embodiments, the one or more areas are traditional grazing areas for at least one pastoral community. In some embodiments, one of the digital maps is during 1) a wet season, 2) a dry season, 3) an extreme dry season, 4) a severe drought season, or a combination thereof. In some embodiments, the system further comprises a software module combining at least one additional area with the one or more areas, wherein the at least one additional area is an additional traditional gazing area. In some embodiments, the first set of satellite data comprises a satellite image taken with visible light, infrared (IR) light, near-infrared (NIR) light, short-wave infrared (SWIR) light, or a combination thereof. In some embodiments, the first set of satellite data comprises more than one satellite images of an identical region at different time points. In some embodiments, the first set of satellite data comprises more than one satellite images, at least one taken during day time. In some embodiments, the first set of satellite data comprises a composite image generated from a plurality of satellite images taken at different time points. In some embodiments, the plurality of satellite images includes more than 100 images. In some embodiments, the first set of satellite data comprises a cloud-free image generated from a plurality of satellite images taken at different time points. In some embodiments, the plurality of satellite images includes more than 100 images. In some embodiments, the cloud-free image is a composite image. The media may further comprise a software module performing atmospheric correction on the first set of satellite data. In some embodiments, the first resolution is of about 3 kilometers by 3 kilometers or greater. In some embodiments, the first resolution is about 2 kilometers by 2 kilometers. In some embodiments, the normalized index array is two dimensional and includes multiple values ranging between −1 and 1. In some embodiments, the time period is about 1 to 14 days. In some embodiments, the time period is during 1) a wet season, 2) a dry season, 3) an extreme dry season, 4) a severe drought season, or a combination thereof. In some embodiments, the second set of satellite data comprised, 2, 4, 6, 8, 10, 12, 14, 16, 18, or 20 images. In some embodiments, the second topographical feature is surface water. In some embodiments, the second topographical feature is during 1) a wet season, 2) a dry season, 3) an extreme dry season, 4) a severe drought season, or a combination thereof. In some embodiments, the second one or more satellites include one or more SENTINEL satellites. In some embodiments, the second set of satellite data comprises a satellite image taken with visible, infrared, near infrared, short-wave infrared (SWIR) light, or a combination thereof. In some embodiments, the second set of satellite data comprises more than one satellite images of an identical region at different time points. In some embodiments, the second set of satellite data comprises more than one satellite images, at least one taken during day time. In some embodiments, the second set of satellite data comprises a composite image generated from a plurality of satellite images taken at different time points. In some embodiments, the second set of satellite data comprises a cloud-free image generated from a plurality of satellite images taken at different time points. In some embodiments, the cloud-free image is a composite image. In some embodiments, the second set of satellite data includes an image with an image resolution of about 10 meters by about 10 meters. In some embodiments, the second set of satellite data includes an image with an image pixel size of less than about 10 square meters. In some embodiments, the time period is about 1 to 14 days. In some embodiments, the time period is during 1) a wet season, 2) a dry season, 3) an extreme dry season, 4) a severe drought season, or a combination thereof. In some embodiments, the first set of satellite data is further indicative of a second topographical feature of the land for the time period at the first resolution, and the second set of satellite data is further indicative of a second topographical feature of the land for the time period at the second resolution. The media may further comprise a software module generating a second custom map, the second custom map indicative of distribution, permanence, or both of the second topographical feature of the land for the time period at the second resolution by fusing the first set of satellite data and the second set of satellite data. In some embodiments, the second topographical feature is surface water. In some embodiments, the second custom map is obtained by averaging data from the first set of satellite data, the second set of satellite data, or both obtained in the time period. The media may further comprise a software module superimposing the second custom map on the custom map; and comparing the superimposed custom map with the one or more of the masks of the digital maps to produce a second combined map. In some embodiments, the second combined map indicates the first and second topographical features within the one or more areas of the land during the time period. The media may further comprise a software module allowing the user to visualize the second combined map of the land on the digital display. The media may further comprise a software module allowing the user to visualize an alert on the second combined map. In some embodiments, the alert includes a geolocation and a time. The media may further comprise a software module allowing the user to visualize an alert on the combined map. In some embodiments, the alert includes a geolocation and a time. The media may further comprise a software module allowing the user to obtain a geolocation of the user and measure a distance to the one or more areas. The media may further comprise a software module allowing the user to interact with the custom map, the combined map, or both. In some embodiments, the software module allowing the user to interact with the custom map, the combined map, or both comprises allowing the user to zoom in or zoom out; switch among more than one viewing mode, wherein the more than one viewing mode includes a terrain viewing mode; and view one or more historical combined maps, said historical combined maps generated prior to the combined map in time. In some embodiments, the software allowing the user to switch among more than one viewing mode comprises switching between viewing the combined map and viewing a terrain map of a same region to assess migration route. In some embodiments, the one or more areas of the land are derived from information obtained from at least one pastoral community. In some embodiments, the information is indicative of one or more traditional grazing areas for the at least one pastoral community. In some embodiments, the combined map is generated about every 10 days continuously.

Overview

In some embodiments, the systems, methods, and devices disclosed herein enable the pastoralists to see how suitable the grounds in a selected area are for grazing, without having to visit them all. This means that they do not have to walk for days or weeks to a pasture only to see that there is no grass to feed their animals. Pastoralists no longer have to waste energy to find good grazing areas for their cattle and are able to protect the lives of their animals and their own income.

In some embodiments, the systems, methods, and devices disclosed herein combines satellite data with local knowledge to create custom maps indicating vegetation, water, other topographical features, or other useful information that is/are critical to pastoralists. For example, vegetation maps indicative of "greenness" or vegetative density in traditional grazing areas are updated and delivered electronically to the digital devices of pastoralists on a regular basis, for example, every 10 days. This may greatly help the pastoralists to continuous monitor and make better and more timely decisions on where and when to move their herds throughout the year.

For instance, the systems, methods and devices disclosed herein include one or more steps selected from but are not limited to: mapping traditional grazing areas using paper maps and hand-drawn areas by one or more communities; digitization of the paper maps with hand-drawn grazing areas; store digitized maps with grazing areas in a database; mapping traditional grazing areas using digital maps; store traditional grazing area data in a database; overlay of NDVI within the grazing areas and optionally along the corridors; overlay of surface water availability; geolocating an alert on the overlaid map; automated electronic distribution every 10 days; and community training on use and interpretation of the maps. In some embodiments, the steps disclosed herein are carried out in different orders as disclosed herein.

Figure 10:
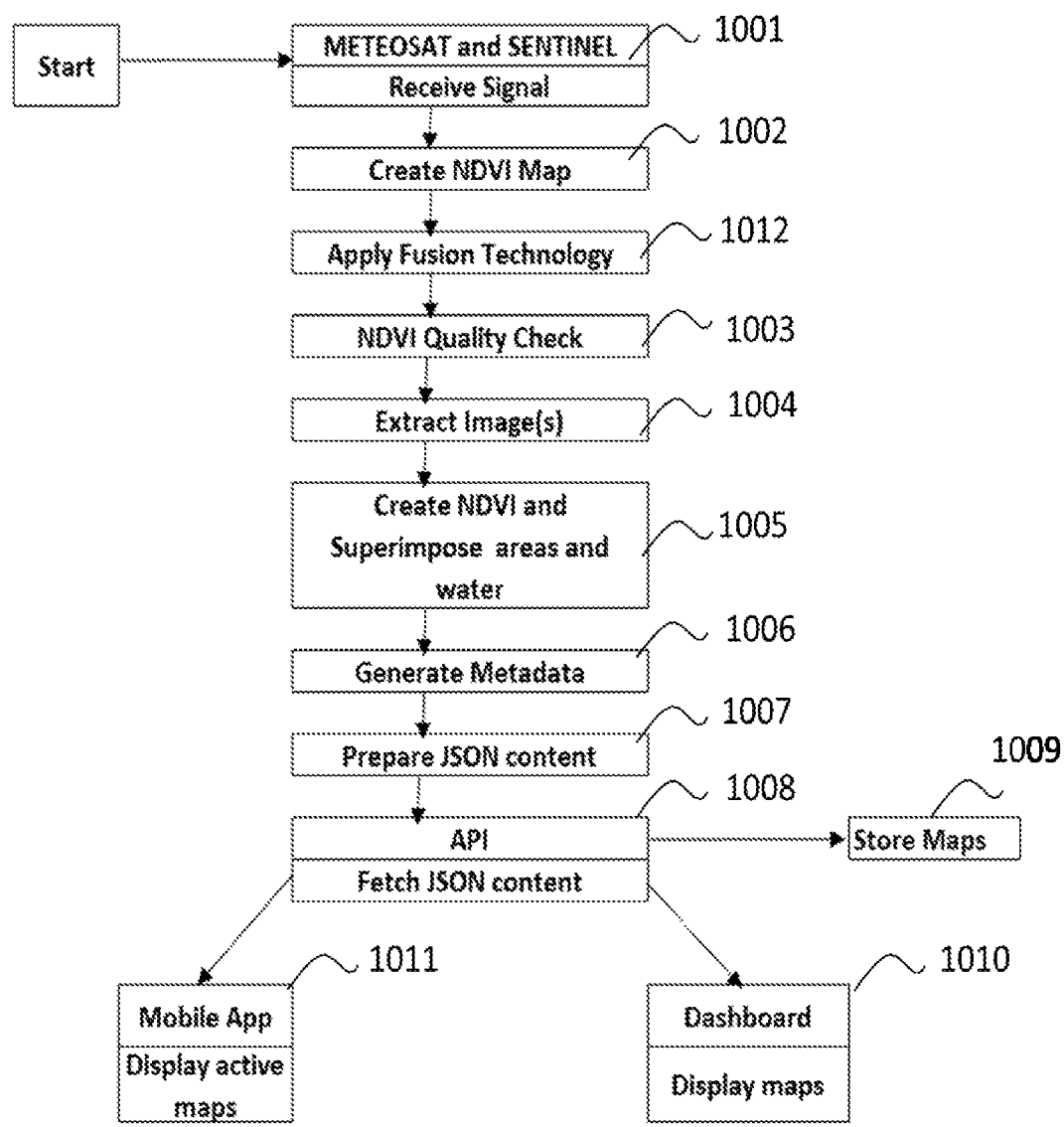
FIG. 10 shows a non-limiting flow chart for generating a vegetation density and surface water distribution map in traditional grazing areas using the systems, methods, and media disclosed herein.

Referring to FIG. 10, in a particular embodiment, the systems, methods, and media disclosed herein receives satellite signal 1001, for examples, from METEOSAT, alone or in combination with data from other satellite(s) such as Sentinel, after predetermined time intervals, for example, every hour, through the EUMETCAST reception station. The received satellite data in a selected time period, in this case, all the METEOSAT images and SENTINEL images covering Africa which are gathered during a 10-day period, are used to create NDVI (basis for grazing conditions) 1002. In some embodiments, such images are from two different set of satellites with different characteristics in satellite images generated (e.g., different spatial resolution and different temporal resolution). In some embodiments, such images include both vegetation and water information. Fusion technology such as what has been disclosed herein is used to fuse information related to vegetation and/or water from images from different characteristics 1012. In the same embodiment, a quality check of NDVI is performed 1003, optionally, to select substantially or completely cloud-free pixels or images for further processing. In some embodiments, a same pixel corresponding to the specific geolocation is examined in more than one satellite images in order to generate one or more cloud-free version of that pixel. In some embodiments, when vegetation and surface water are included in different images, the same selection process for vegetation and surface water images is performed in order to obtain cloud-free pixels for both vegetation and water. In some embodiments, the same cloud-free pixel selection process is performed using low spatial resolution image, e.g., from METEOSAT, high spatial resolution image, e.g., from Sentinel, or both. Afterwards, images for the areas of interest are selected 1004. In this particular embodiment, a custom map with NDVI is created and superimposed with grazing areas and map(s) of water resources to generate a combined map 1005. The combined map is optionally copied or stored for usage 1009. The Metadata and JSON data of the combined maps are generated 1006, 1007 and data for application programmable interface (API), browser, and/or server are generated. In the same embodiment, Metadata and/or JSON data are received at the API 1008 for storing maps 1009, displaying the combined map to the user in a mobile application 1011 or an online dashboard 1010.

Certain Terms

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "about" or "substantially" refers to an amount that is near the stated amount by ±10%, ±8%, ±5%, ±2%, or ±1%, including increments therein.

Topographical Features

In some embodiments, the systems, methods, and devices disclosed herein include one or more topographical features of a land or one or more areas of a land. For example, the land may be one or more selected from: a continent, a country, a region spanning over more than one continent or country. In some cases, a land includes one or more grazing areas. In some cases, a land includes at least one grazing area.

In some embodiments, the topographical features include natural formations and/or manmade formations. In some embodiments, the topographical features include features of various elevations.

In some cases, the topographical features vegetation of various kinds, different types of surface water, mountains, rivers, lakes, valleys, glaciers, waterfalls, flats, ponds, marshes, or the like. In some embodiments, the topographical features include vegetation density. In some embodiments, the topographical features include the "greenness" of a land. For examples, a living pasture or a dying pasture. In some cases, the topographical features include surface water of different conditions, for example, ice, dry lake, salt marsh, rapids, waterfalls, or the like. In some cases, the topographical features include differentiation of various vegetation, for example, flat meadows, pastures, forests, bushes, mountain with grassland, farmlands, gardens, or the like. In some cases, the topographical features include grazing area and non-grazing areas. As an example, although the greenness of a man-made farmland or garden and a wild meadow may be similar, the former is non-grazing area but the later may be grazing area. In some cases, the topographical features include elevation, flatness, depth, the steepness or gentleness of slopes, contour lines, or the like.

In some cases, a topographical feature is during 1) a wet season, 2) a dry season, 3) an extreme dry season, 4) a severe drought season, or a combination thereof. In some cases, a topographical feature is during a time period ranging from 1 to about 30 days.

In some cases, a topographical feature is vegetation, vegetation distribution, vegetation density, surface water, surface water distribution, surface water depth, or a combination thereof.

Satellite Data

In some embodiments, the systems, methods, and devices disclosed herein utilizes data obtain from one or more pre-selected satellites. In some embodiments, the satellite may include geostationary meteorological satellites, Meteosat series of satellites, Meteosat Second Generation (MSG), Meteosat Third Generation (MTG), SENTINEL, or any other satellite that is currently available or will be available in the future. In some embodiments, the systems, methods, and devices disclosed herein utilizes data obtain from at least two satellites. In some embodiments, the systems, methods, and devices disclosed herein utilizes data obtain from a Meteosat satellite and SENTINEL.

In some embodiments, data collected using different bands from the satellite may be used herein. Non-limiting examples of the bands includes visible light spectral band (VIS), infrared (IR), near-infrared (NIR), short-wave infrared (SWIR), a portion or a combination thereof. In some cases, a spectrum band with wavelengths of about 0.5 microns to about 15 microns is used for collecting satellite data. In some embodiments, two or more spectrum sub-bands within the wavelength range of about 0.5 microns to about 15 microns are used. For example, NIR and infrared bands, or red and NIR bands may be used for collecting satellite data.

In some cases, the satellite data include raw images collected by the satellite(s) using one or more different spectral bands. In other cases, the satellite data includes processed images. In some cases, the satellite data includes other information associated with the raw or processed images. In some cases, the satellite data include processing information of the raw data. In some cases, the satellite data includes metadata of images. As a non-limiting example, the satellite data includes two images taken with different spectral bands at the same or different time point. As another non-limiting example, the satellite data includes a digital filter that is used on the raw data in order to generate the processed data. As another non-limiting example, the satellite data includes image size, resolution, or field of view of each satellite image taken within a specific time period. As yet another non-limiting example, the satellite data includes the spectral bands and other camera parameters used for obtaining the images such that different images can be properly registered or georeferenced with each other using these parameters.

In some cases, atmospheric correction is performed on satellite data using various spectrum bands. In some cases, the correction transforms top of atmosphere (TOA) reflectance into surface values. In some cases, different algorithms may be used for the correction. A non-limiting exemplary algorithm is the simplified method for the atmospheric correction of satellite measurements in the solar spectrum by Rahman & Dedieu, 1994, which is incorporated herein entirely by reference.

In some cases, data processing may include mathematical operation, statistical operation, stochastic operation, machine learning, or empirical handling of the data. Non-limiting example of methods for data processing includes: filtering, segmentation, spatial or frequency truncation, compression, superimposing, normalization, transformation, subtraction, multiplication, encoding, normalization, registration, sampling, modeling or the like.

In some cases, the satellite data include the sleeper slope angles so that the images are not distorted. For example, the slope angles are in between about −40 degrees to about 40 degrees. In some cases, the satellite data includes images taken with satisfactory visible light, for example, during a time period from about 9:00 A.M. to 17:00 P.M. In some cases, the satellite data includes images taken with satisfactory IR, NIR, SWIR, or other sources.

In some cases, the satellite data are received and stored in a database disclosed herein.

In some embodiments, the satellite data includes satellite images with an image resolution of about 3 kilometers by 3 kilometers. In some embodiments, the satellite data includes satellite images with an image resolution greater than about 3 kilometers by 3 kilometers. In some embodiments, the satellite data includes satellite images with an image resolution greater than about 0.1 kilometers by 0.1 kilometer, about 0.5 kilometers by 0.5 kilometers, about 1 kilometer by 1 kilometer, about 1.5 kilometers by 1.5 kilometers, about 2 kilometers by 2 kilometers, or about 2.5 kilometers by 2.5 kilometers. In some embodiments, the satellite data includes satellite images with an image resolution of about 10 meters by 10 meters. In some embodiments, the satellite data includes satellite images with an image resolution greater than about 10 meters by 10 meters. In some embodiments, the satellite data includes satellite images with an image resolution greater than about 8 meters by 8 meters, 6 meters by 6 meters, 5 meters by 5 meters, 4 meters by 4 meters, or 3 meters by 3 meters.

In some embodiments, the systems and methods herein include a first set of satellite data from first one or more satellites. The first set of satellite data can be indicative of a first topographical feature (vegetation) and a second topographical feature (surface) of the land for a time period at a first spatial resolution. In some embodiments, the information regarding the topographical features can be within same or different images of the same set of satellite data. In some embodiments, the systems and methods herein include a second set of satellite data from second one or more satellites. The second set of satellite data can be indicative of a first topographical feature (vegetation) and a second topographical feature (surface) of the land for a same time period at a second spatial resolution that is higher than the first spatial resolution. In some embodiments, the information regarding the topographical features can be within same or different images of the same set of satellite data. In some embodiments, the first set of satellite data includes a much greater number of images than that from the second one or more satellites. In some embodiments, the first set of satellite data includes images with a higher temporal resolution (more than 100 images v.s. about 10 images during 10 days) than that of the second set of satellite data.

Normalized Indexes

In some embodiments, the systems, methods, and devices disclosed herein use satellite data to calculate a normalized index array indicative of one or more topographical features of a land. In some cases, each normalized index array is a two-dimensional image with a number of pixels along each dimension.

For examples, the normalized index array may be the NDVI of the areas that the pastoralists use as grazing grounds. The satellite orbits around the earth and takes pictures of Africa and its land repeatedly, optionally with a constant time gap between pictures. In some cases, different types of images are taken from the satellite. These images can include but not limited to: that of the visible light and that of infrared light. Green plants capture a large part of the visible light and a part of the infrared light. Brown plants absorb only a small part of the visible light but a larger part of the infrared light. This means the images produced of green areas on the Earth differ from areas where the land is dry in certain type of images. Thus, the images produced by the satellite may show exactly which areas have the highest vegetation density and are best for pastoralists to migrate to. In some cases, from these images the NVDI is calculated. In some cases, the NDVI is a measure of the amount and vigor of vegetation on the land surface and NDVI spatial composite images are developed to more easily distinguish green vegetation from bare soils. In some cases, the NDVI is rendered into a custom map so that the vegetation density map may be easily perceivable by pastoralists. In some cases, NDVI values range from −1.0 to 1.0, with negative values indicating clouds and water, positive values near zero indicating bare soil, and higher positive values of NDVI ranging from sparse vegetation (0.1-0.5) to dense green vegetation (0.6 and above). In some cases, indirectly, NDVI has been used to estimate the quality of the environment as habitat for various animals, pests and diseases.

In some cases, composite NDVI images are created to ensure cloud-free images. In some cases, the composite image may include a number of images from within time window, for example about 10-day. In some cases, the composite image may be generated based on information of more than about 50, 80, 100, 200, or even a larger number of images. In yet further cases, the composite image may exclude images taken with cloud or other features that may obstruct topographical features on surface of a land. In some cases, the composite image include a large number of images taken at different time points (with a majority of cloud-free images) so that the composite image may be weighted more by could-free images. In some embodiments, the cloud-free image herein is at least substantially cloud free. In some embodiments, the cloud-free image herein includes at least about 80%, 90%, 95% or even more pixels that is without cloud or detectable cloud.

In some cases, a normalized index array is obtained from a single satellite image at a specific time point. In some cases, a normalized index array is obtained from multiple satellite images at different time points. In some cases, such different time points are within the same period of time, for example, within a 1 to 30 days period of time. In some cases, a normalized index array is obtained from a composite image, and the composite image is generated using a plurality of images at different time points. In some cases, an average of multiple normalized index arrays may be obtained.

In some cases, the NDVI is a two dimensional matrix with numerical values. In some cases, the NDVI is transformed into a custom map so that the color, contrast, or other visually perceptible features of the custom map is indicative of vegetation density. For examples, the NDVI may be rendered into a color image and a specific numerical value is uniquely transformed into a color, and each different color represents a different numerical value, thus a different vegetation density level.

In some cases, NDVI is calculated from satellite imagery whereby the satellite spectrometer or radiometric sensor measures and stores reflectance values for both red and NIR bands on two separate channels or images. An example of calculating NDVI is disclosed in Kriegler, et al. 1969, which is incorporated herein entirely by reference. In some embodiments, the NDVI is calculated by subtracting the red channel from the near-infrared (NIR) channel and dividing their difference by the sum of the two channels, or: NDVI= (NIR−RED)/(NIR+RED), where, in some embodiments, RED=the red portion of the electromagnetic spectrum (0.6-0.7 μm) and NIR=the near infrared portion of the electromagnetic spectrum (0.75-1.5 μm).

In addition, for vegetation condition monitoring, clouds are partially screened from NDVI images by producing Maximum Value Composites (MVC) over a period of time, for example, 10-day, 16-day, or 1-month periods, where the highest NDVI pixel value within the time period is retained under the assumption it represents the maximum vegetation "greenness" during the period.

Traditionally, with polar orbiting satellites, only a much smaller number of images can be obtained, for example, 2 or 3, per 10 days. That may result in many clouded pixels and partially clouded pixels, thus much lower quality NDVI are generated using traditional polar orbiting satellites and images obtained therefrom. In some cases, the signal quality of METEOSAT dekadal NDVI is high as over 100 images per 10 days are used to create a composite image for the dekad. In some cases, only the substantially or completely cloud-free pixels from a large number of images during the 10 day period are selected for NDVI generation.

In some embodiments, the normalized index array is indicative of the vegetation, the surface water, or both. In some embodiments, the normalized index array is generated using image data from at least two different frequency bands. In some embodiments, the normalized index array is generated using image data from two sets of satellites, i.e., METEOSAT satellite(s) and SENTINEL satellite(s). In some embodiments, the normalized index array is generated using one set of satellite data that is of a low spatial resolution (e.g., 3 km by 3 km) and a high temporal resolution (e.g., greater than 100 images within a given time period, for example, 10 days), and another set of satellite data that is of a high spatial resolution (e.g., 10 meters by 10 meters) and a low temporal resolution (e.g., less than 20 images within the same given time period). In some embodiments, the normalized index array is generated pixel by pixel with the high spatial resolution (e.g., 10 meters by 10 meters or greater).

In some embodiments, for a certain pixel of the normalized index array or a custom map, fusion of data, e.g., image data, collected from different satellite(s) is performed, for the corresponding pixels. In some embodiments, a low spatial resolution and high temporal resolution pixel is selected from the first set of satellite data, for the general magnitude of the value for vegetation; and high spatial resolution pixel(s) corresponding to the selected low spatial resolution pixel in the second set of satellite data can represent the finer spatial distribution of the general magnitude. In some embodiments, the low spatial resolution and high temporal resolution images from the first set of satellite data has the advantages of providing more reliable and accurate magnitude of vegetation and/or water (e.g., higher signal to noise ratio, cloud-free). In some embodiments, the high spatial resolution and low temporal resolution images from the second set of satellite data has the advantages of providing detailed spatial distribution of water and/or vegetation. The systems and methods herein combine the advantages of both sets of satellite data by fusing image data collected using different satellites to provide accurate and reliable high spatial resolution water and/or vegetation distribution that is cloud-free.

As a non-limiting example of the fusion method disclosed herein, one pixel from the low spatial resolution satellite image may indicate a very high vegetation density by its magnitude. The pixel corresponds to nine pixels in the high resolution images with lower signal to noise ratio. A thresholding method may be applied to determine if any of the nine pixels are vegetation pixels, e.g., based on the signal to noise ratio and/or the magnitude of signal of that pixel. If yes, the magnitude of that pixel is substituted using a new magnitude derive from that of the higher signal to noise ratio pixel in the low spatial resolution image. Such new magnitude derived from that of the low spatial resolution pixel is more reliable and accurate. By combining information from the two different image(s), the spatial distribution of vegetation density is high resolution, and the new magnitude provides a more accurate and reliable representation of vegetation density than that of the high resolution images.

Surface Water Distributions

In some cases, the surface water data is collected from SENTINEL satellite(s), or other satellites. In some cases, the satellite for obtaining surface data is capable of providing an image resolution of about 10 meters by 10 meters or higher. In some cases, the satellite for obtaining surface data is capable of providing an image resolution of greater than about 5 meters by 5 meters, about 6 meters by 6 meters, about 7 meters by 7 meters, about 8 meters by 8 meters, or about 9 meters by 9 meters. In some cases, the satellite for obtaining surface data is capable of providing an image for the entire land that is of interest, for example, Africa. In some cases, the water detection is done with one or more bands, for example, bands B11 and B02 of SENTINEL 2A and 2B. In some cases, satellite data from one or multiple bands are processed. In some cases, post-processing may include filtering; sampling, mathematical manipulation, statistical manipulation, segmentation, contouring, clustering, pattern recognition, registration, thresholding, masking, decoding, encoding, or a combination thereof. As an example, satellite data from bands B11 and B02 can be processed using a formula of B02/B11, followed by correction with certain threshold values that differ geographically. In some cases, the post-processing may include cloud detection. In some cases, areas covered by cloud(s) or dust can be detected using image processing masks, such as cloud masks provided by European Space Agency (ESA). In some cases, the post-processing may include atmospheric correction using algorithms such as the Sentinel application platform (SNAP).

In some cases, the surface water distribution is indicated by different color, different gray scale, or other visual effects that's perceivable to the user at a digital user interface. In some embodiments, such different visual effects may indicate a surface area or a depth of the surface water. In some embodiments, each pixel of the map can include two different values or colors, e.g., water and no water. In some embodiments, the each pixel of the map indicates the presence of water in that pixel or absence of water within that pixel. In some embodiments, a threshold may be used to determine if there is presence of water within a pixel. For example, the threshold may be between a value when the pixel is substantially full of water and another value when the pixel is no water. In some cases, the surface water distribution map may be provided and/or viewed at different resolutions. In some cases, the surface water maps may present additional information in a higher resolution view which cannot be rendered in a lower resolution view. As a non-limiting example, in a dry season, it is hard to find any surface water using a low resolution surface water map, such as a map showing surface water of an entire grazing area on a mobile device. However, if the user zooms in to a much higher resolution at the user interface, the pastoralist may be able to detect small ponds, such as a pond of about 15 meters in diameter, that disappear when the user zooms out. Further, the systems, methods, and devices disclosed herein may automatically label such small surface water areas so that the user may be aware of possible smaller areas of surface water even when the user zooms out to a resolution lower than needed for the manual detection. As a non-limiting example, the systems, methods, and devices disclosed herein may automatically place a tag in an area with small pond(s) in grazing areas so that the user can zoom in at specific regions to look for exact location of the ponds. In some embodiments, the satellite image data indicative of surface water distribution includes an image resolution of no less than about 20 meters by 20 meters, about 18 meters by 18 meters, about 15 meters by 15 meters, or about 12 meters by 12 meters. In some embodiments, the satellite image data indicative of surface water distribution includes an image resolution of no less than about 10 meters by 10 meters, about 8 meters by 8 meters, about 6 meters by 6 meters, about 5 meters by 5 meters, about 4 meters by 4 meters, about 2 meters by 2 meters, or about 1 meter by 1 meter.

In some cases, the surface water information provided herein allows the user to obtain water information of the grazing areas in addition to the vegetation density map provided. Such surface water information are highly important when the pastoralist needs to select among more than one grazing areas. In addition, such water information may become critically important during dry seasons when surface water becomes very rare and hard to find.

In some cases, the surface water information provided herein includes how permanent or temporary the surface water is. In some embodiments, such information regarding the permanence of water can be determined by comparing historical data of surface water to estimate a trend of surface water changes.

In some embodiments, a different array or a custom map is indicative of the surface water information of the mapped area(s) that may work similar as the NDVI for vegetation. In some embodiments, the array or map is generated using image data from at least two different frequency bands. In some embodiments, the array or map is generated using image data from two satellites, i.e., a METEOSAT satellite and a SENTINEL satellite. In some embodiments, the array or map is generated using one set of satellite data that is of a low spatial resolution (e.g., 3 km by 3 km) and a high temporal resolution (e.g., greater than 100 images within a given time period, for example, 10 days), and another set of satellite data that is of a high spatial resolution (e.g., 10 meters by 10 meters) and a low temporal resolution (e.g., less than 20 images within the same given time period). In some embodiments, the array or map is generated pixel by pixel with the high spatial resolution (e.g., 10 meters by 10 meters or greater).

In some embodiments, for a certain pixel of the index array or map for surface water, a low spatial resolution and high temporal resolution pixel is selected from the first set of satellite data, for the general magnitude of the value for water, and one or more high spatial resolution pixels corresponding to the low spatial resolution pixel is selected from the second set of satellite data for the finer spatial distribution of the general magnitude.

In some embodiments, water is first detected at pixel level and then artificially enlarged so as to include more surrounding pixels so that users can more easily see it on the mobile screen. In some embodiments, such artificial enlargement of water pixels is similar to how roads are enlarged on digital maps. In some embodiments, the weight of the lines is not representative of the size of the water, but for indicating the shape and/or location of the water so that a user can tell there is surface water there and understand its shape.

Custom Maps and Combined Maps

In some cases, the systems, methods, and media disclosed herein include a custom map. In some cases, the custom map is two dimensional. In some cases, each pixel of the custom map has a color, a grayscale, a contrast, and/or saturation that is indicative of the NDVI value within that pixel. In some cases, each pixel of the custom maps is indicative of other topographical features, such as surface water. In some cases, the custom map includes a map of vegetation density. In some cases, the custom map includes a map of surface water distribution. In some cases, the custom map is a map of NDVI. In some case, the custom map is a map of normalized index array.

Figure 13:
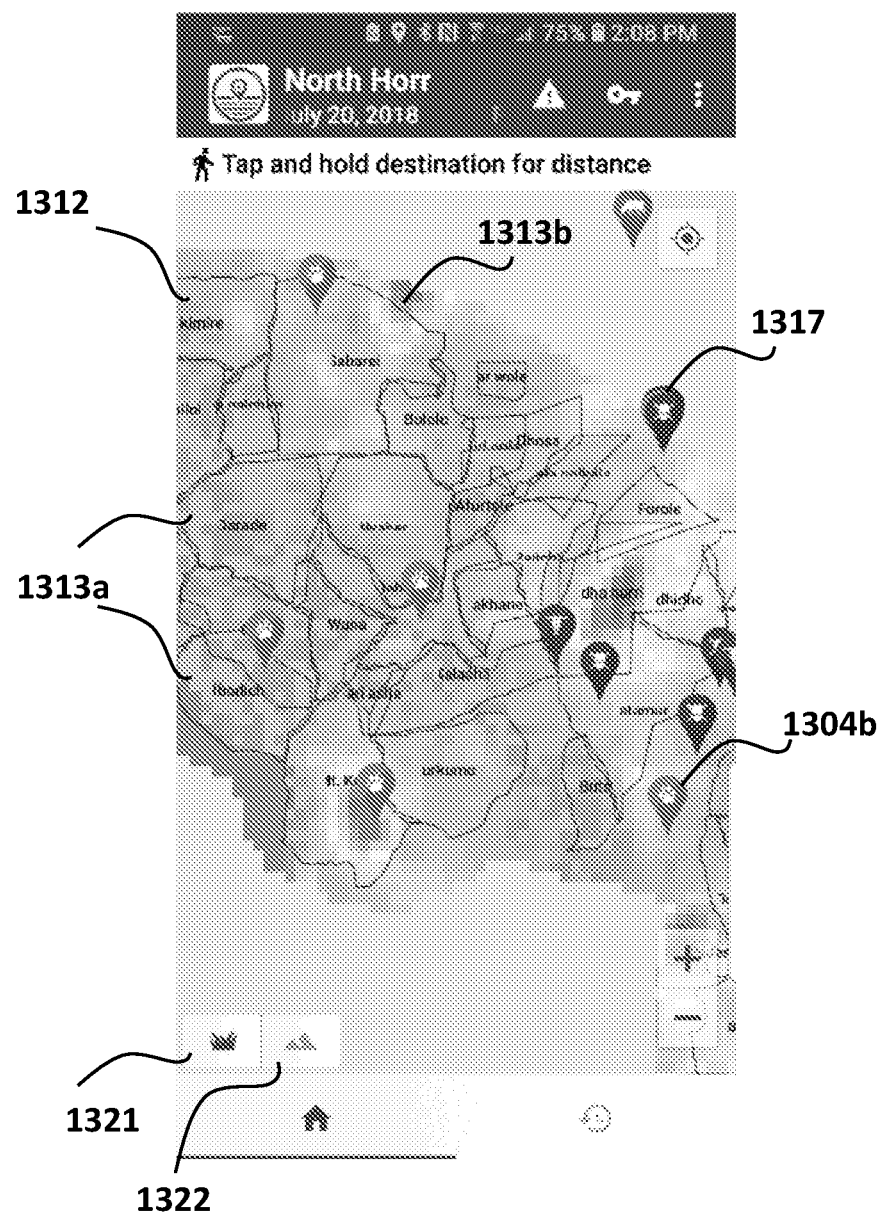
FIG. 13 shows a non-limiting exemplary embodiment of the systems, methods, and media disclosed herein, in this case, a user interface allowing a user to view a combined map showing vegetation density in a grazing area with georeferenced alerts.

In some cases, the systems, methods, and media disclosed herein include a combined map 1312, as shown in FIG. 13. In some cases, the custom map and the digitized map(s) or the custom map and the equivalent digital map(s) are combined, optionally via image registration or proper georeferencing to yield a combined map. As a result, the combined map may be indicative of the distribution and density of one or more topographical features, for example, vegetation density or surface water, within one or more grazing areas. In some cases, the grazing areas are traditionally used for at least one pastoralist clan or community. Referring to FIG. 13, in this particular embodiment, the vegetation density is shown as different color wherein different shades of yellow indicate sparse or dense vegetation 1313*a* while different shades of green show more dense vegetation 1313*b*.

In some cases, the custom maps or combined maps herein includes Metadata, JSON, and/or other data that can be derived or generated for the systems, methods, or media disclosed herein.

Figures 19A, 19B:
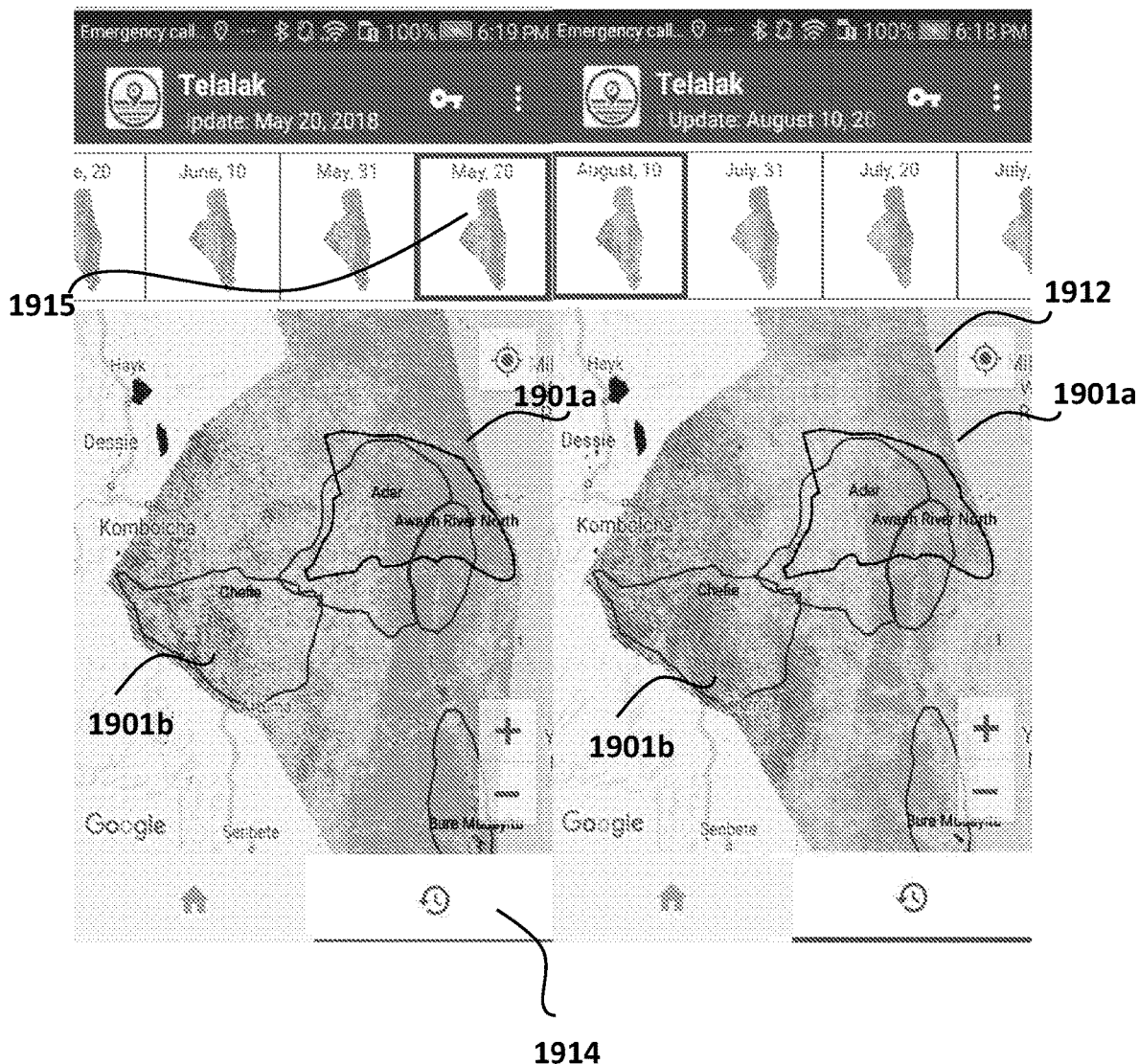
FIGS. 19A-19B show a non-limiting exemplary embodiment of the systems, methods, and media disclosed herein, in this case, a user interface that allows a user to select and view the historical combined maps.
Figure 29:
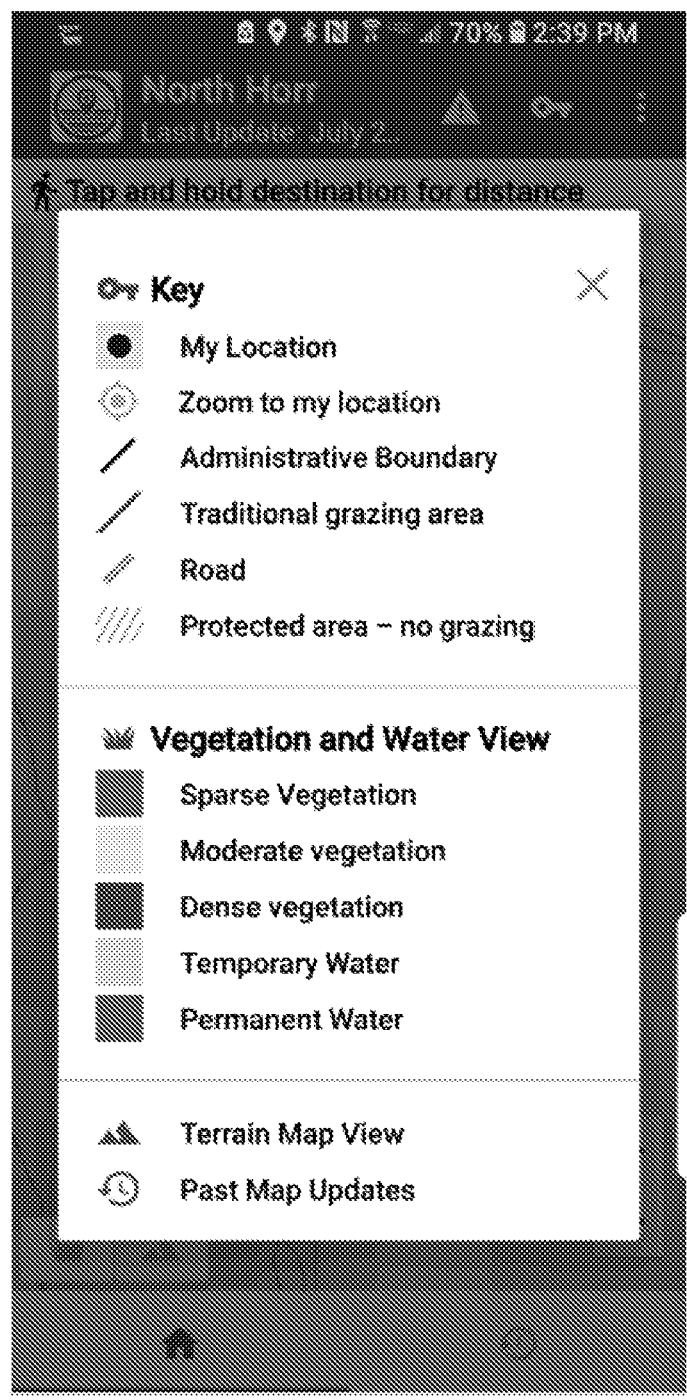
FIG. 29 shows a non-limiting exemplary embodiment of the systems, methods, and media disclosed herein, in this case, a user interface that allows a user to view the key to a combined maps, a custom map, or any other map disclosed herein.

In some cases, the systems, methods, and media disclosed herein include multiple post-dated maps or historical maps, either custom maps or combined maps. Referring to FIGS. 19A-19B, in a particular embodiment, a user may click on the historical button 1914 at the bottom right of home screen to view post-dated combined maps 1912 optionally by swiping and clicking the individual map icons 1915 of a certain date. In some cases, the historical maps over a time period, for example, a year, may be viewed by the user. In some cases, such historical maps may be viewed for comparison to the most current maps in order to identify and predict a trend in vegetation or surface water changes, as shown in FIGS. 19A-19B. Referring to FIG. 19B, in this particular embodiment, a user optionally views one of the most recent versions of the vegetation density map superimposed with traditional grazing areas to identify grazing areas with viable and green pasture. The traditional grazing areas 1716, 2216 are marked with contours, such as dotted contours in FIGS. 17 and 22. The key to the map is shown in FIG. 29. The user may also optionally compare the current vegetation density map to an earlier version to view vegetation density trend over time. In this case, the vegetation density decreases over time in general and in certain grazing areas, e.g., 1913a and 1913b, as the greenness in these areas fades to yellow colors. Such historical information may be used alone or in combination with other information for the user to make a comprehensive and informative migration decision. As an example, a user may detect two grazing areas that are of similar distance to his current location. In order to select one from the two for taking his herd, the user compare the historical maps of the two grazing areas and select the one grazing area with steadily increasing vegetation over time.

In some embodiments, the systems and methods disclosed herein renders the combined map for displaying on a digital display, such as a screen of the user's mobile phone. In some embodiments, such rendering includes reducing the resolution and/or the field of view of the combined map so that it takes up less memory of the mobile device. Such reduced resolution may also help alleviate the burden for data communication to the user's phone and/or saving the map on the user's mobile device.

In some embodiments, the custom map or combined map includes a spatial resolution of no less than about 20 meters by 20 meters, about 18 meters by 18 meters, about 15 meters by 15 meters, or about 12 meters by 12 meters. In some embodiments, the satellite image data indicative of surface water distribution includes an image resolution of no less than about 10 meters by 10 meters, about 8 meters by 8 meters, about 6 meters by 6 meters, about 5 meters by 5 meters, about 4 meters by 4 meters, about 2 meters by 2 meters, or about 1 meter by 1 meter.

In some embodiments, the custom map or combined map includes a spatial resolution of no less than about 3 kilometers by 3 kilometers or greater than about 0.1 kilometers by 0.1 kilometer, about 0.5 kilometers by 0.5 kilometers, about 1 kilometer by 1 kilometer, about 1.5 kilometers by 1.5 kilometers, about 2 kilometers by 2 kilometers, or about 2.5 kilometers by 2.5 kilometers.

Alerts

Figure 17:
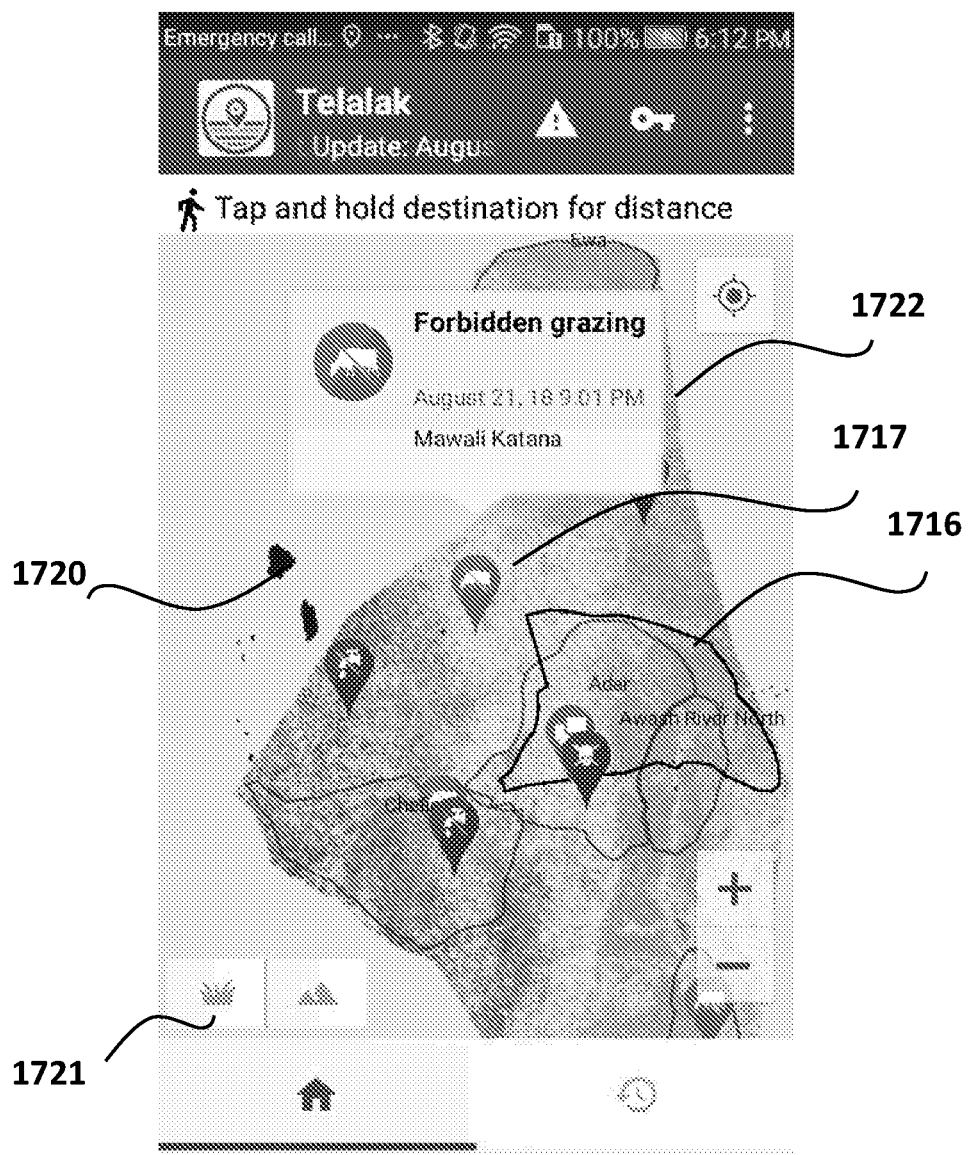
FIG. 17 shows a non-limiting exemplary embodiment of the systems, methods, and media disclosed herein, in this case, a user interface that allows a user to view an alert on the combined map.

In some cases, the systems, methods, and media disclosed herein include one or more alerts that has a geolocation and time associated with it. In some cases, the alert 1317, 1717, is superimposed on one or more of a custom map, a combined map, a digitized map, a digital map, or a combination thereof, as shown in FIGS. 13 and 17. In some cases, the alert may be submitted by a user of the systems, methods, and/or media. In some cases, the alert may be provided by a third-party agent. In some cases, a location of an alert is within one or more grazing areas. In some cases, an alert have an effective duration of time. In some cases, an alert may be related to predators, weather conditions, hazards, or any other conditions that may pose threats on pastoralists and their animals. Non-limiting examples of alerts include: earth-quake, swamp, land-slide, rattle snake, mountain like, fire, chemical spill, curfew, illegal hunting, or any information that may pose a threat to pastoralists and their herds. In some embodiments, the alerts herein can include other types of notices or messages such as an animal vaccination campaign, supplementary feed distribution, etc.

In some cases, the systems, methods, and media disclosed herein allow the user to crowdsource information through alerts and have information available (optionally georeferenced) in the map in real-time. In some cases, the systems, methods, and media disclosed herein allow a user to add an alert, edit a property of an alert, remove an alert, add a description of an alert, or change any other property of an alert. In some cases, property of an alert includes but is not limited to a geolocation, a time, a severity level, or the like.

Figure 15A:
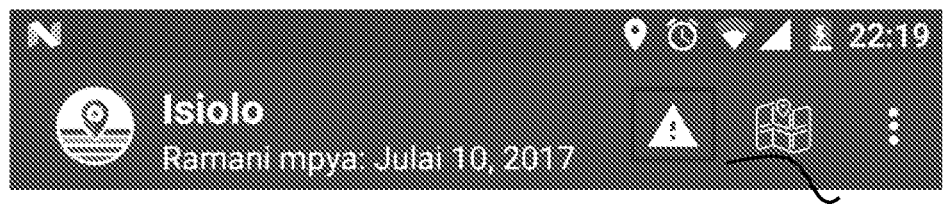
FIGS. 15A-15B show a non-limiting exemplary embodiment of the systems, methods, and media disclosed herein, in this case, a user interface that allows a user to post an alert, select an alert type, and/or enter more details about the alert.
Figure 15B:
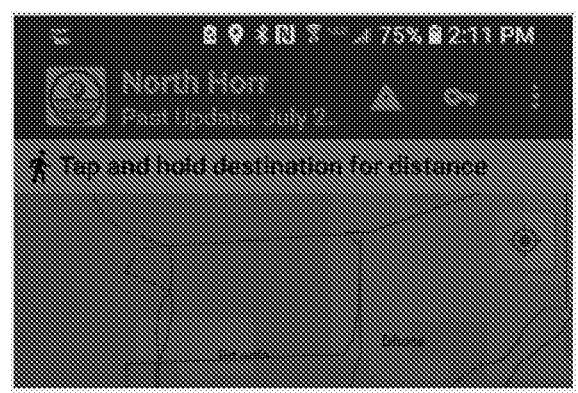
Figure 16:
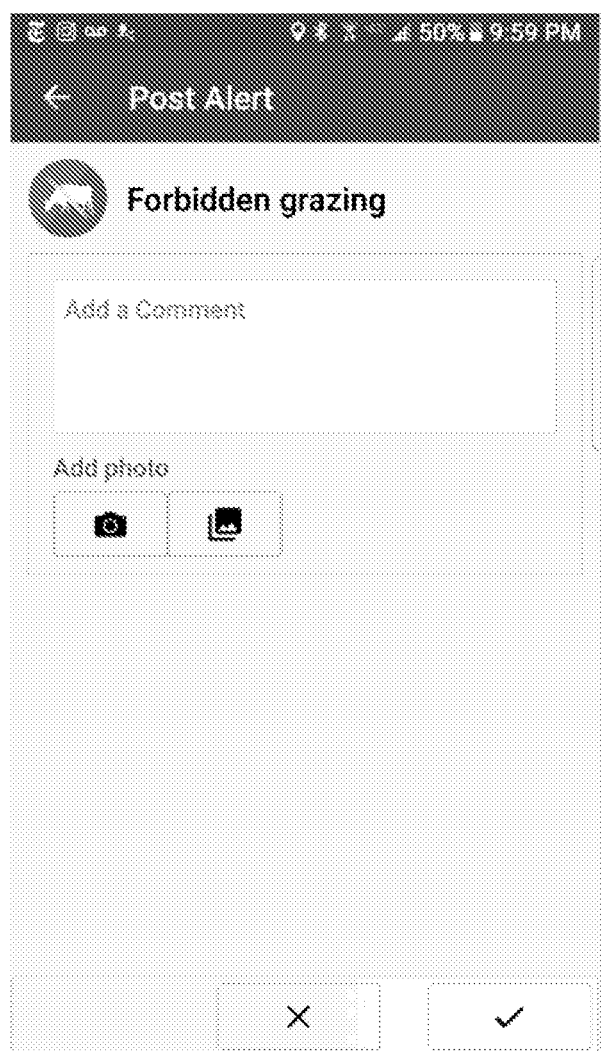
FIG. 16 shows a non-limiting exemplary embodiment of the systems, methods, and media disclosed herein, in this case, a user interface that allows a user to post an alert and/or enter more details about the alert.
Figure 18:
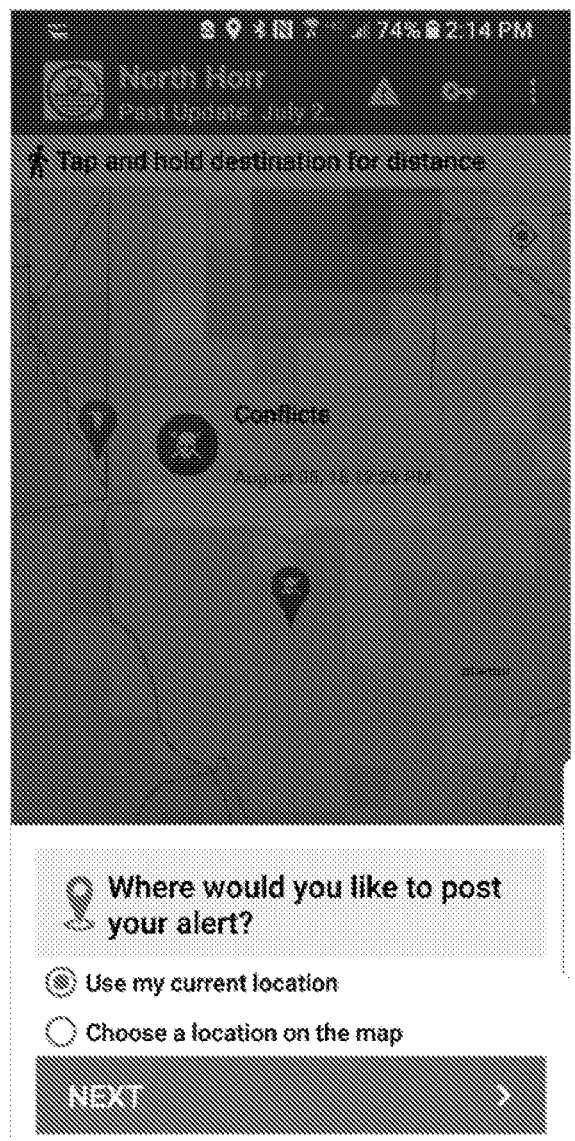
FIG. 18 shows a non-limiting exemplary embodiment of the systems, methods, and media disclosed herein, in this case, a user interface that allows a user to select a location or a region for the alert.

Referring to FIGS. 15A-15B, in a particular embodiment, a user may prompt to add an alert after the user selects the icon with the exclamation mark 1518. Optionally, the user can select a type of alert from the alert list screen 1519 or enter a type of alert manually. Afterwards, the user may select to enter more details about the alert as shown in FIG. 16. Referring to FIG. 16, in this embodiment, the user may add a comment and/or a photo and submit the alert details. Referring to FIG. 18, the user can add a location to the alert by using his/her current location or any other location of their selection.

Referring to FIG. 17, in a particular embodiment, an added alert 1717 is displayed on the combined map, optionally in the vegetation viewing mode 1721, based on the user's current location. Alternatively, the user may select a location or region for the alert as shown in FIG. 17.

In some cases, a user may have a quick view of an alert, via interaction at the user interface. Optionally, the user may click on any alert on the combined map, and an information window 1722 of an alert is displayed as shown in FIG. 17. The user may close the alert by tapping on the map or clicking the back button of a mobile device. Alternatively, the user may click on the alert or on the alert information window displayed to view detailed information, which includes but is not limited to a description of alert, a date, and/or interactive comments from more than one user.

In some embodiments, one feature associated with alerts is that by using the dashboard, an administrative user can create mobile user roles that enable permissions for mobile users to change or switch maps as many times as they want and/or delete comments. Users can also edit their own comments.

Viewing Modes

Figure 22:
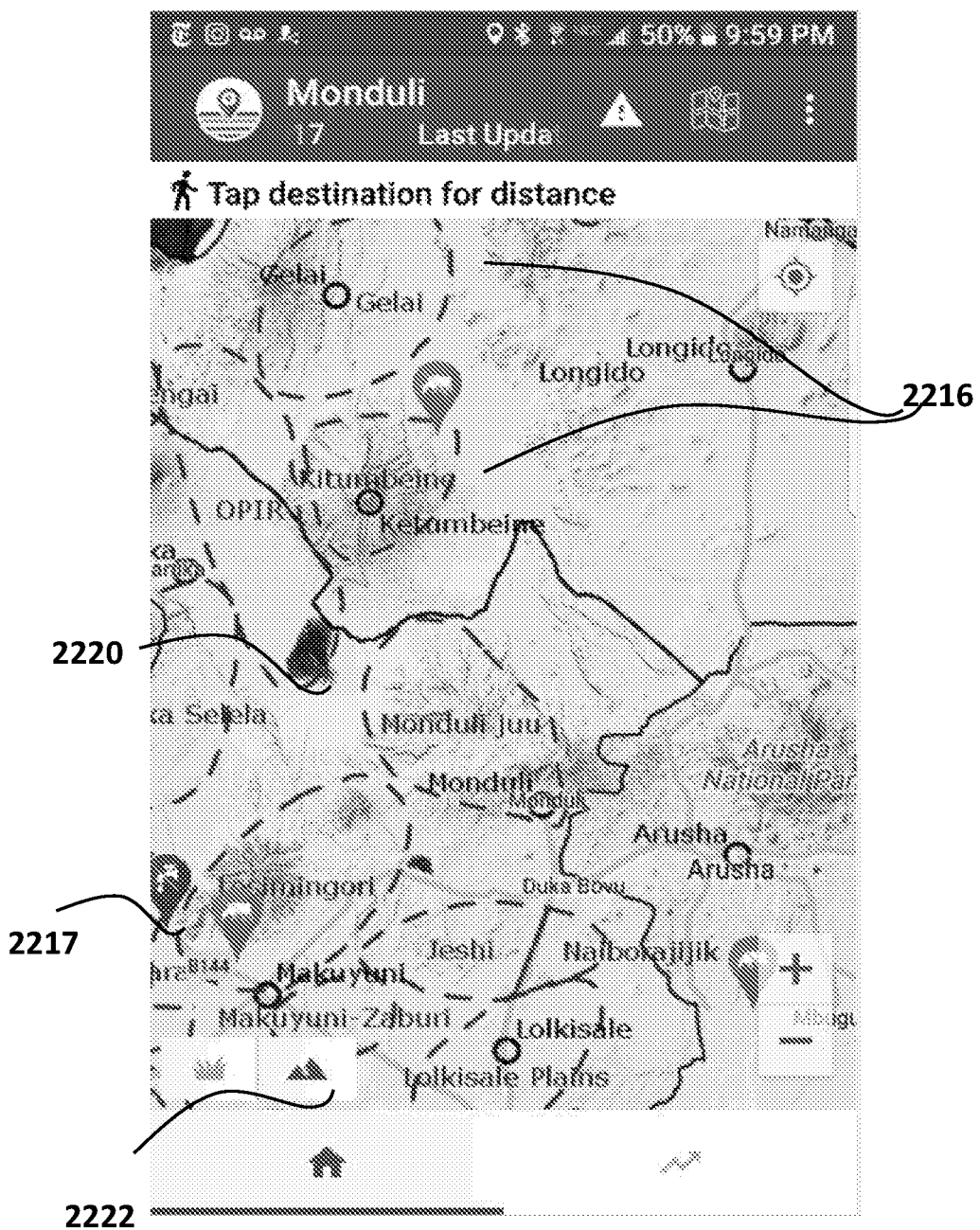
FIG. 22 shows a non-limiting exemplary embodiment of the systems, methods, and media disclosed herein, in this case, a user interface that allows a user to switch from a vegetation density viewing mode to a terrain viewing mode, in which topographical features other than vegetation density in a grazing area with georeferenced alerts and surface water are shown.
Figure 23:
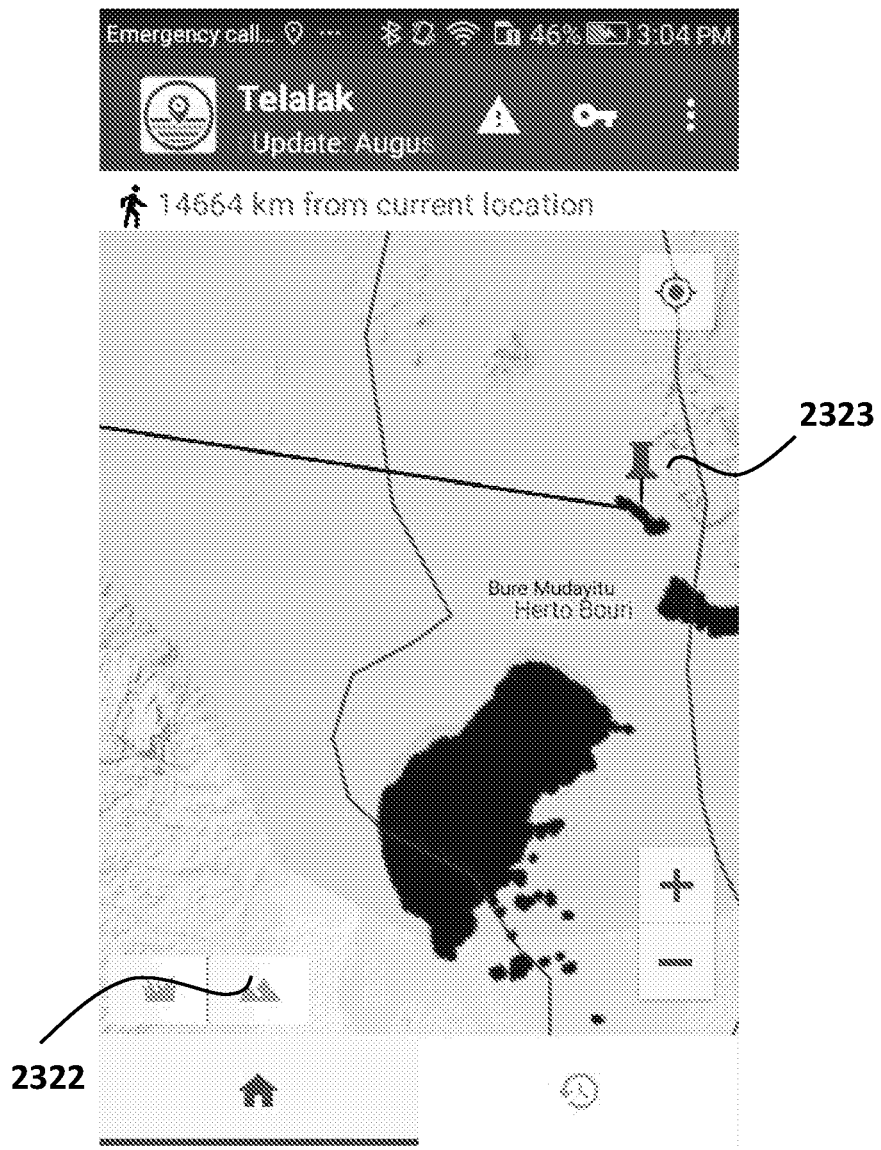
FIG. 23 shows a non-limiting exemplary embodiment of the systems, methods, and media disclosed herein, in this case, a user interface that allows a user to identify surface water and measure distance from the user's location to the surface water.

In some cases, the systems, methods, and devices disclosed herein include one or more viewing modes 1321, 1322, 1721, 2222, 2322 as shown in FIGS. 13, 17, and 22. In some cases, a software module herein allows the user to switch between different viewing modes. In some cases, a software module herein allows a user to view one or more specific topographical features herein in one viewing mode. Referring to FIG. 13, in a particular embodiment, vegetation density can be viewed in one viewing mode by selecting a corresponding icon at the user interface 1321. In some cases, more than one feature may be combined in one viewing mode. In yet further cases, the multiple features are georeferenced with each other or with a digital map that is commonly available. In some cases, a user interface may be provided to the user to allow switching from a first viewing mode to a second viewing mode via interaction with an input device at the user interface. Referring to FIG. 13, the user may switch between a vegetation viewing mode 1321 and a terrain viewing mode 1322 by selecting corresponding icons at the bottom of the user interface. After switching to the terrain viewing mode 2222, 2322 the user may view a topographical or terrain map of the same areas, as shown in FIGS. 22-23. In this mode, the user optionally views elevation information of certain grazing areas, such as flatness, depth, the steepness or gentleness of slopes on candidate migration routes to specific grazing areas. In this embodiment, the surface water 2220 and alert information 2217 are also combined and georeferenced to be shown in the terrain viewing mode. In this embodiment, the gazing areas 2216 are also shown in the terrain viewing mode. Referring to FIG. 23, in a specific embodiment, a user may measure distance to a location with desired surface water optionally by dropping a pin 2323 in the terrain viewing mode or vegetation mode with or without zooming. Referring to FIGS. 24A-24B, in another embodiment, a user may measure distance to surface water 2420 or any other point of interest, optionally in the vegetation density viewing mode, and optionally with zooming in order to identify surface water that is really small in size, for example, a size comparable or smaller than a pixel of the vegetation density map.

Figure 14:
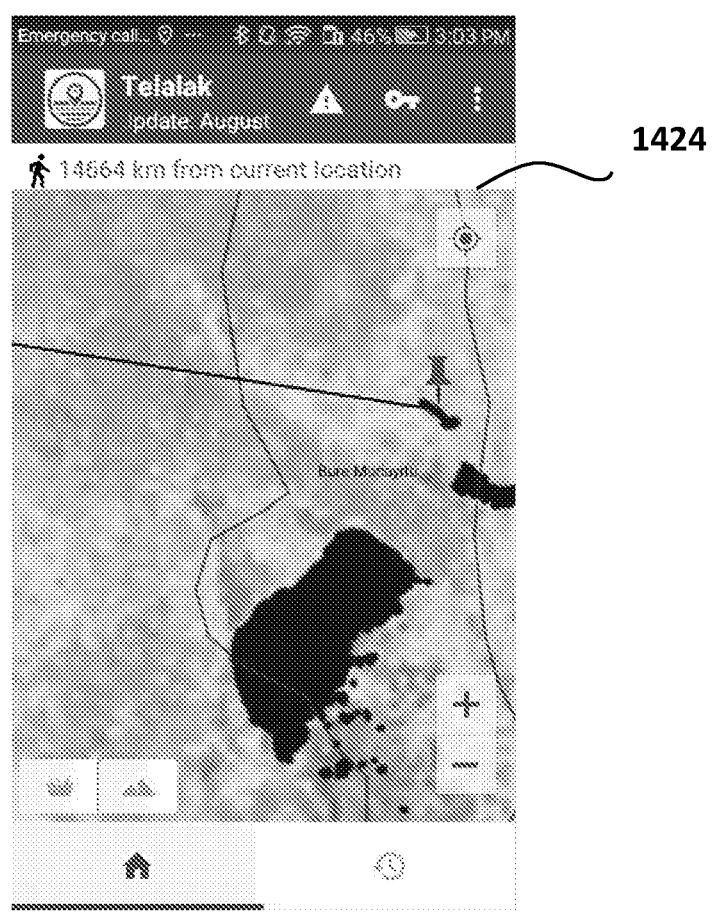
FIG. 14 shows a non-limiting exemplary embodiment of the systems, methods, and media disclosed herein, in this case, a user interface allowing a user to measure a distance from the user's location to a desired grazing location.

As a non-limiting example, vegetation map and surface water map may be combined to be viewed in one viewing mode. The user may further combine alert(s) in this viewing mode. In this particular case, the user may switch to a different viewing mode to view a topographical or terrain map of the same region. The topographical map may include elevation contours on or near the possible migration route to a grazing area. As another example, the user can first view vegetation density in one mode to select a couple of grazing areas as migration candidates and then switch to another mode to view surface water distribution within or close to these candidate areas in order to select a grazing area with relatively abundant surface water. As another non-limiting example, a pastoralist finds the vegetation information of two closest grazing areas. The vegetation density and the distances from his current location to both grazing areas are measured to be similar and a decision to select one from the two grazing areas is difficult without additional information. The pastoralist may switch from the vegetation map mode to a topographical or terrain mode to further examine the topographical features on his route to both grazing areas and select the one with relatively flat and easy to manage migration route. Alternatively, as shown in FIG. 14, the pastoralist may measure the distance from his/her current location to a desired grazing location in the vegetation map viewing mode or the terrain viewing mode. The measured distance 1424 is optionally displayed at the user interface.

Figure 20A:
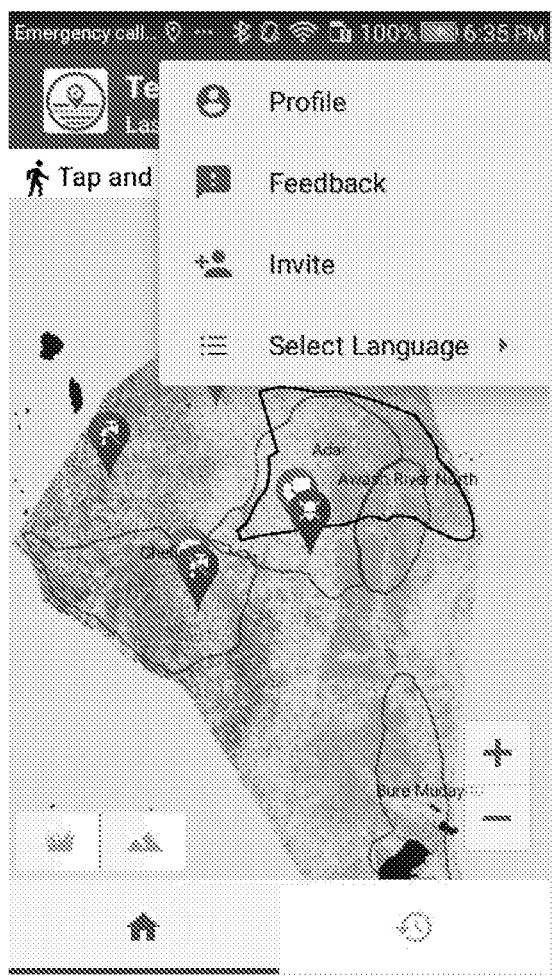
Figure 20B:
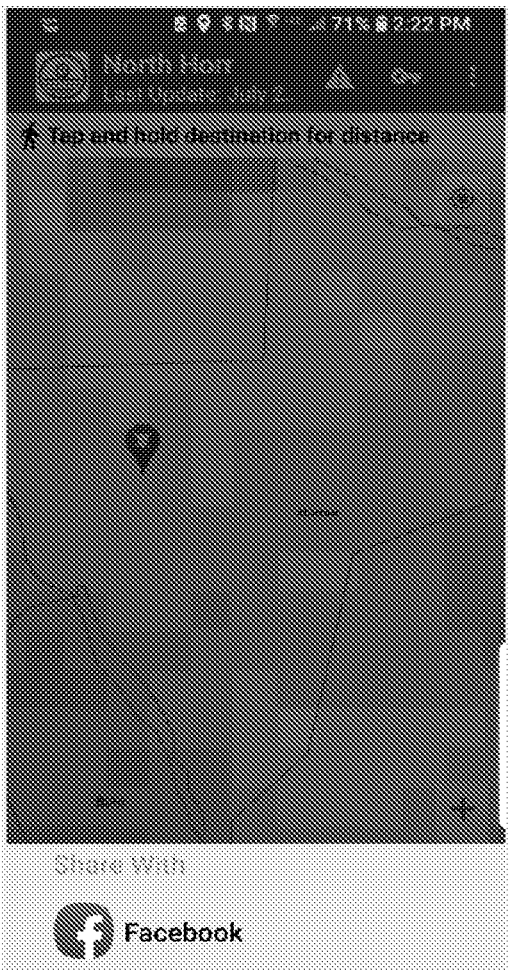
Figure 20C:
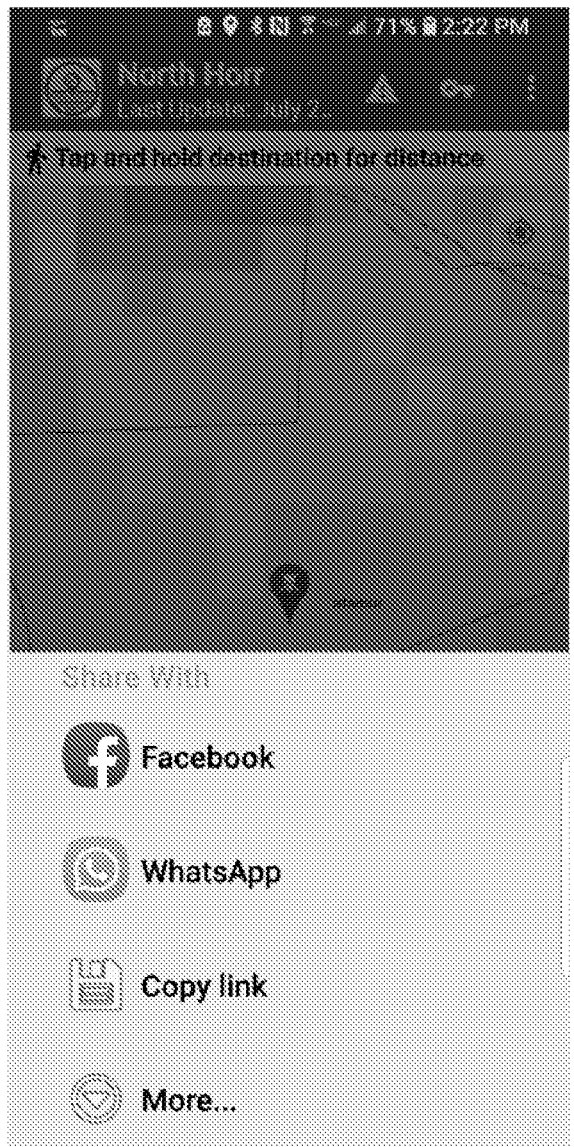
Figure 20D:
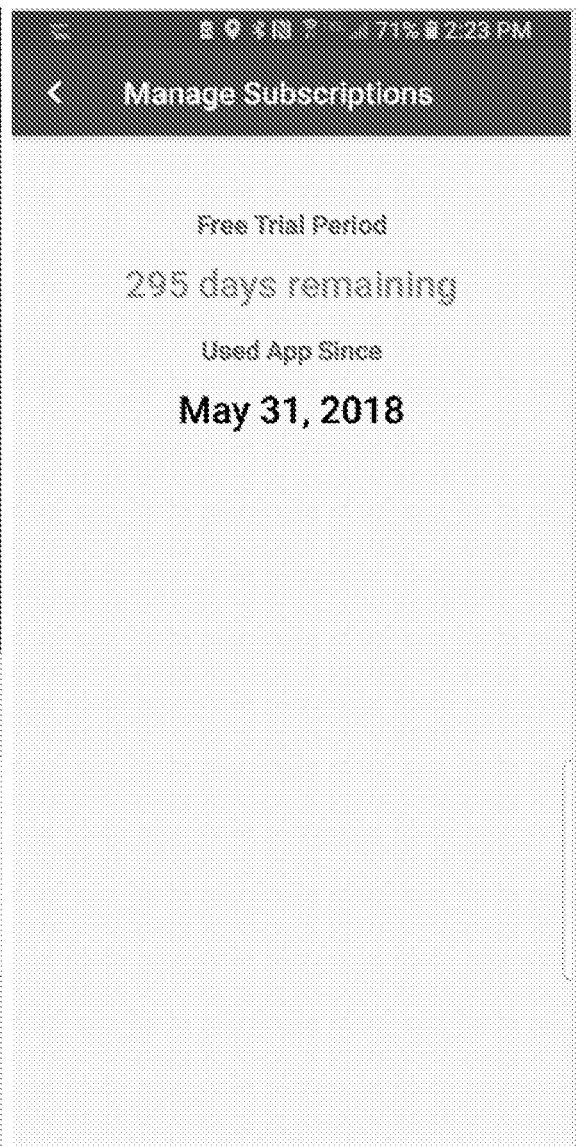

In some cases, the systems, methods, and media disclosed herein allow the user to crowdsource and geotag alerts and provide additional information and photos and information through the application disclosed herein. In some embodiments, users, e.g., in the same mapped areas can view and comment back and forth on these alerts as well. The application can also notify them when an alert is posted in their area or someone has commented on an alert that they posted User Options Referring to FIGS. 20A-20E, the systems, methods, and media disclosed herein allow the user to access more options using the topographical feature identification and assessment application herein. In this particular embodiment, the options are provided at a user interface of the mobile application, and the options include managing the user's profile (FIG. 20E), providing user feedbacks (FIG. 21), sharing the application using social media (FIG. 20B), inviting others to use the mobile application (FIG. 20C) selecting language(s), and manage subscription (FIG. 20D). In this particular embodiment, the options are accessible to the user when the user interacts with corresponding icons (FIG. 20A) of a drop-down list in the mobile application.

In some embodiments, the topographical feature identification and assessment application herein is a mobile application and/or a web application. In some embodiments, the topographical feature identification and assessment application electronically communicate with a server or console, which is a digital processing device, for communication of data such as updated maps, gazing areas, alerts, etc.

Referring to FIG. 11, in a particular embodiment, the topographical feature identification and assessment application herein includes a user interface that allow a user to launch the application, e.g., a mobile application on a hand-held smartphone, and select a preferred language.

Referring to FIG. 12, in a particular embodiment, the topographical feature identification and assessment application herein includes a user interface that allows a user to enter login details, to register, log in, or update user profile within the application, e.g., a mobile application. In some embodiments, the application allows a user to change the map their profile is associated with.

Referring to FIG. 21, in a particular embodiment, the topographical feature identification and assessment application herein includes a user interface that allows a user to select user feedback and enter feedback information regarding the application.

Community Mapping

In some embodiments, the systems, methods, and media herein include a community mapping process. In order to produce clear and easy to use maps for the pastoralists, it can be necessary to have reliable information on where the pastoralists usually go with their herd to graze. Therefore, in some embodiments, communities are engaged in a mapping process that may delineate traditional grazing grounds for digitization and may derive consensus among village representatives of those areas. The mapping may be done over three separate steps. An initial step is to identify the farthest limits of the communities' traditional grazing areas, optionally by consulting with a small group of key informants and using a small administrative map of the region, e.g., FIG. 1 for delineation. In some embodiments, the administrative map or otherwise map that serves the same purpose in the initial step may be physical maps or digital maps. For example, consulting with a small group of key informants may be performed using a digital or digitized map on a digital display. This information then may be used to acquire larger topographic map that encompasses the identified territory. In the second step, using the scaled maps obtained from the first step, participants may delineate grazing areas in the scaled maps, indicating whether the location was for 1) wet season, 2) the dry season, 3) extreme dry seasons, and/or 4) severe drought conditions. In some embodiments, at one or more steps of the mapping process, the participants answer particular questions regarding gazing areas such as: "is this a grazing area that the host communities would affirm that grazing by you is permitted at points throughout the year or under specific conditions;" "if there are conditions for where and when you can graze there, what are they;" "who from the host community has the authority to permit grazing there? Can you provide the name/phone number so that we might validate;" and/or "are there groups, government entities, or individuals that dispute your right to graze in that area? If so, who are they and what is their rational?" In some embodiments, at one or more steps of the mapping process, the participants answer particular questions regarding gazing areas such as if the gazing area is seasonal, private or leased, or restricted. The second mapping step may be more inclusive and may ensure a pastoral representative from each of the sub-administrative units is present. The third step is to validate the grazing areas that are outside the communities' administrative boundaries with host communities in the designated grazing area. In some embodiments, at least part of the community mapping process is performed with digital maps or digitized maps presented on a digital display. In some embodiments, the digital maps or digitized maps are generated from paper maps, for example, digital scan of physical maps. In some embodiments, at least part of the community mapping process is performed with paper maps.

In some cases, paper maps may be distributed to different pastoralists in the same community or various pastoral communities to collect hand-drawn information of traditional grazing areas. Referring to FIG. 1, in a particular embodiment, two identical paper maps with different hand-drawn contours indicating the same grazing area are collected. Difference may exist in the hand-drawn features even if they are trying to depict the same grazing area(s).

Digitized Maps or Digital Maps

In some embodiments, the systems, methods, and media disclosed herein include one or more digital maps, digitized maps, or use of the same. In some embodiments, it is very important that the digitized maps are a good representation of the real grazing areas. This is why representative from most or all sub-units (sub-districts, wards, etc) and involved in the two different pastoral groups or representatives from two different clans, draw the same areas on different maps, as combined knowledge may give a higher accuracy of the produced maps.

In order to digitize the paper maps, a software module herein may be used to process the images in such a way that the maps and the grazing areas are located relative to other known maps/spatial features on the Earth. In some cases, a software module includes a Geographical Information System (GIS), which can capture, store, analyze, manage, and present all types of spatial or geographical information.

In some cases, two different types of representation of data: raster data and vector data are disclosed herein. A raster file can be made up of pixels. Each pixel can have a typical value that represents a particular feature. For example, each pixel that is blue may represent water. As another example, the contrast or shade of blue represent the depth of the water. A vector file can be made up of points, lines and areas (polygons). The vector data may be geometrically and mathematically associated. Points may be stored using the coordinates of the coordinate system, a location of a point may be for example (x, y). Lines are stored as a series of points pairs, where each pair represents a straight line segment, for example (x1, y1) and (x2, y2) indicating a line from point (x1, y1) to point (x2, y2). In some cases, the paper maps with hand-drawn features by the pastoralists may include raster data. In some cases, vector polygons can be add on top of this raster data, the polygons may be based on vector data.

In some cases, the system, media, methods disclosed herein include georeferencing paper maps. In some embodiments, georeferencing is the process of assigning real-world coordinates to one or more pixels of the raster, a digital map, or a digitized map. In some embodiments, georeferencing is the process of assigning real-world coordinates to one or more features in the digital map, e.g., an intersection of two rivers or two roads, an alert, or a hazard. In some cases, georeferencing includes one or more of scaling, rotating, translating and deskewing the image, such as a paper map with hand-drawn area(s), in order to match a particular size and position in a commonly available digital map. In some cases, georeferencing includes associating a paper map or hand-drawn features on a paper map with locations in physical space. In some cases, georeferencing includes associating a paper map or raster image of a map with spatial locations.

Georeferencing may be applied to any kind of object or structure that can be related to a geographical location (roads, places, buildings, rivers). In some cases, the paper maps may be scanned into images. And images may be components of a whole paper map. Points of interest on these maps can be used as reference points on the map in GIS.

Figure 2:
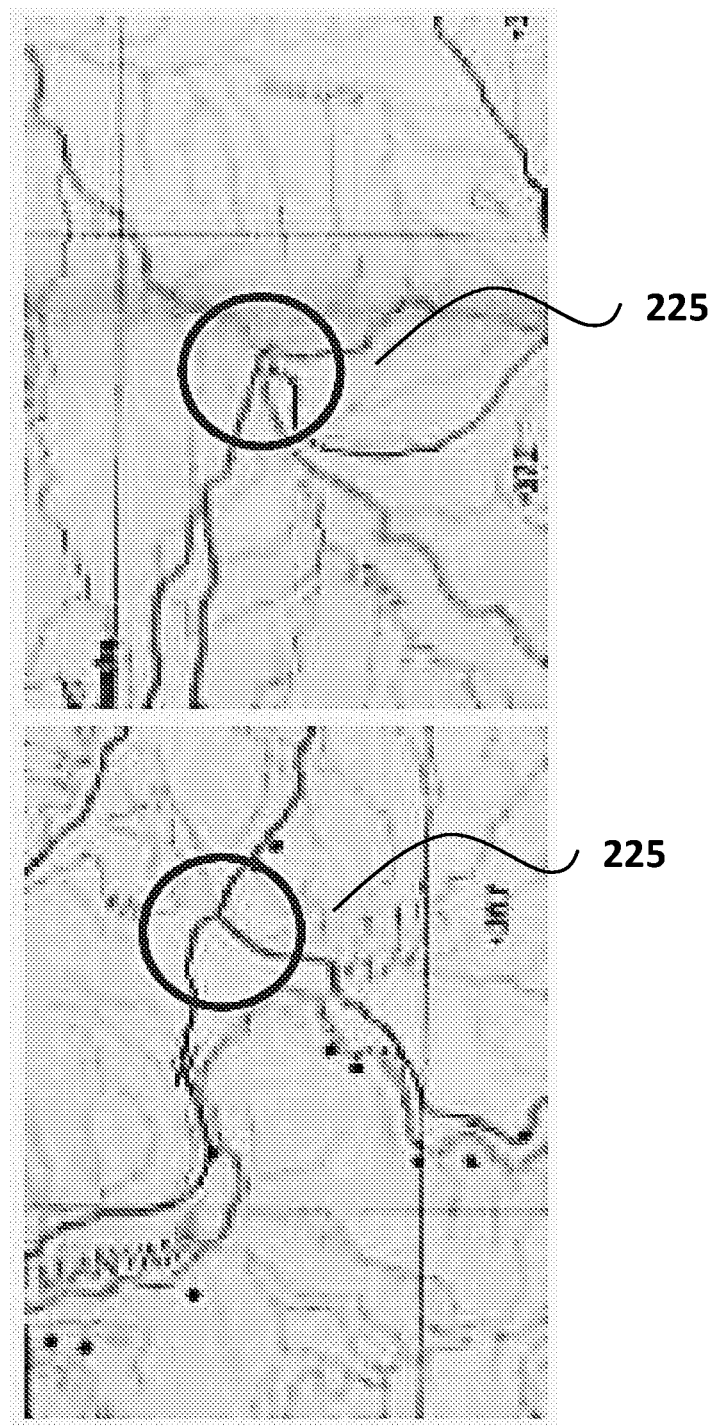
FIG. 2 shows a non-limiting exemplary embodiment of reference points that are used in georeferencing paper maps as disclosed herein.

In some cases, elements from the whole area of the scanned maps can be used as clear interest/reference points. An example of reference points 225 are shown in FIG. 2. As an example, a road that crosses a river, two roads that cross each other or a road that crosses a district boundary in a map may be used to select reference points. Such crossings are reference-points that are usually easy to find in commercially or non-commercially available maps, such as Google Maps or Bing Maps. In some cases, it is preferred to spread the reference points relatively over the scanned map but not restrict the reference points to a single region of the maps. In some cases, more than one reference points of different geographical features on map is selected to ensure accurate geo-referencing.

Figures 3A, 3B:
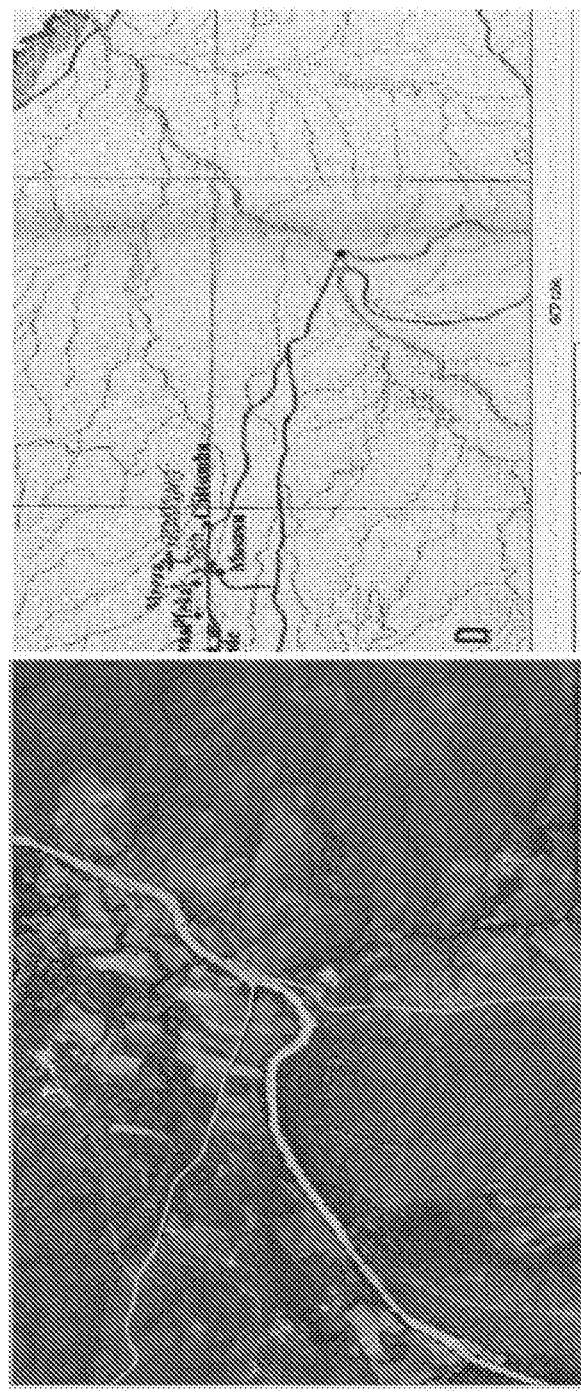
FIGS. 3A-3B show a non-limiting exemplary embodiment of marking of the selected reference point on the paper map (FIG. 3A) to the digital map (FIG. 3B) as disclosed herein.
Figure 4:
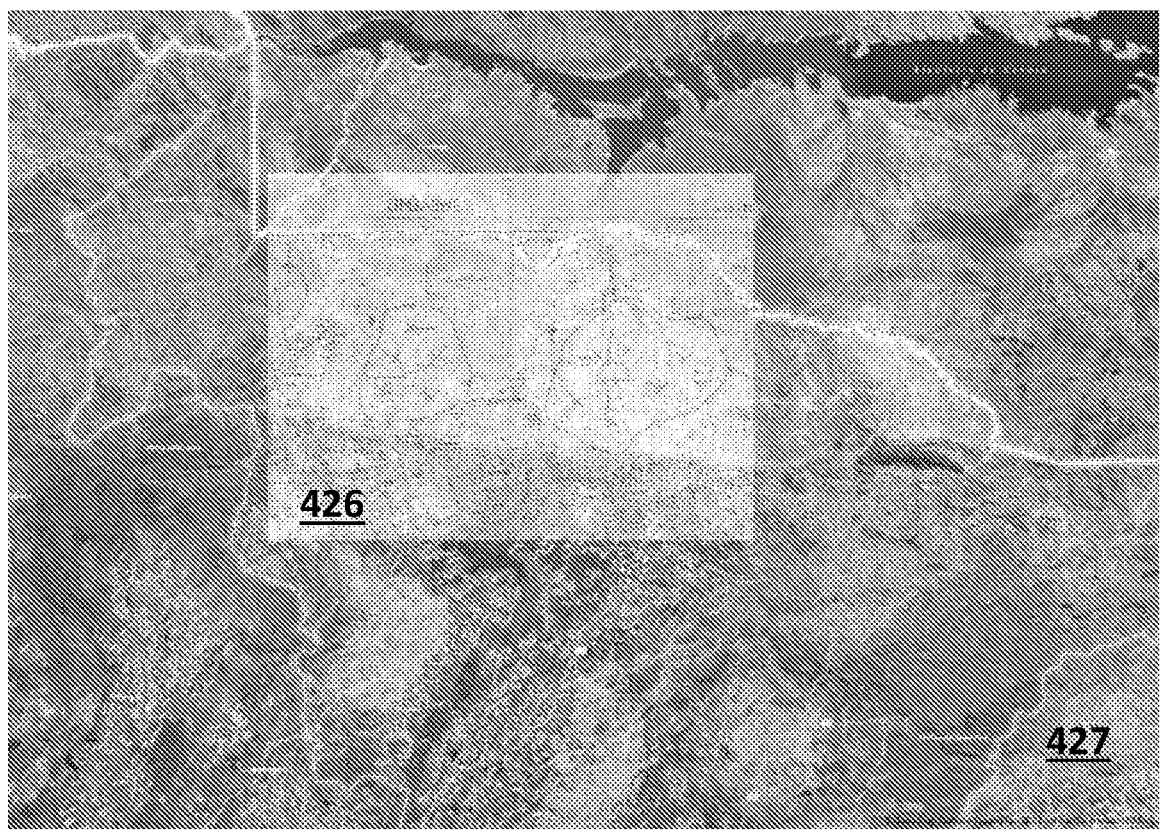
FIG. 4 shows a non-limiting exemplary embodiment of a paper map superimposed on a satellite image after georeferencing as disclosed herein.

By geographically referencing some points on a commonly available digital map (Google, Bind, etc) with a coordinate system, the images can overlap with each other, optionally overlap with the digital map as well. In some cases, a satellite image is used as the digital maps with a coordinate system, as shown in FIG. 3A. Manual or automatic marking of the selected reference point on the paper map (FIG. 3B) and/or on the digital map (FIG. 3A) help geo-referencing the paper map to a digital map. Referring to FIG. 4, a paper map 426 is optionally superimposed on a satellite image 427 after geo-reference. Similar features of the two maps overlaps in the superimposed image indicating an accurate georeferencing result.

Figure 5:
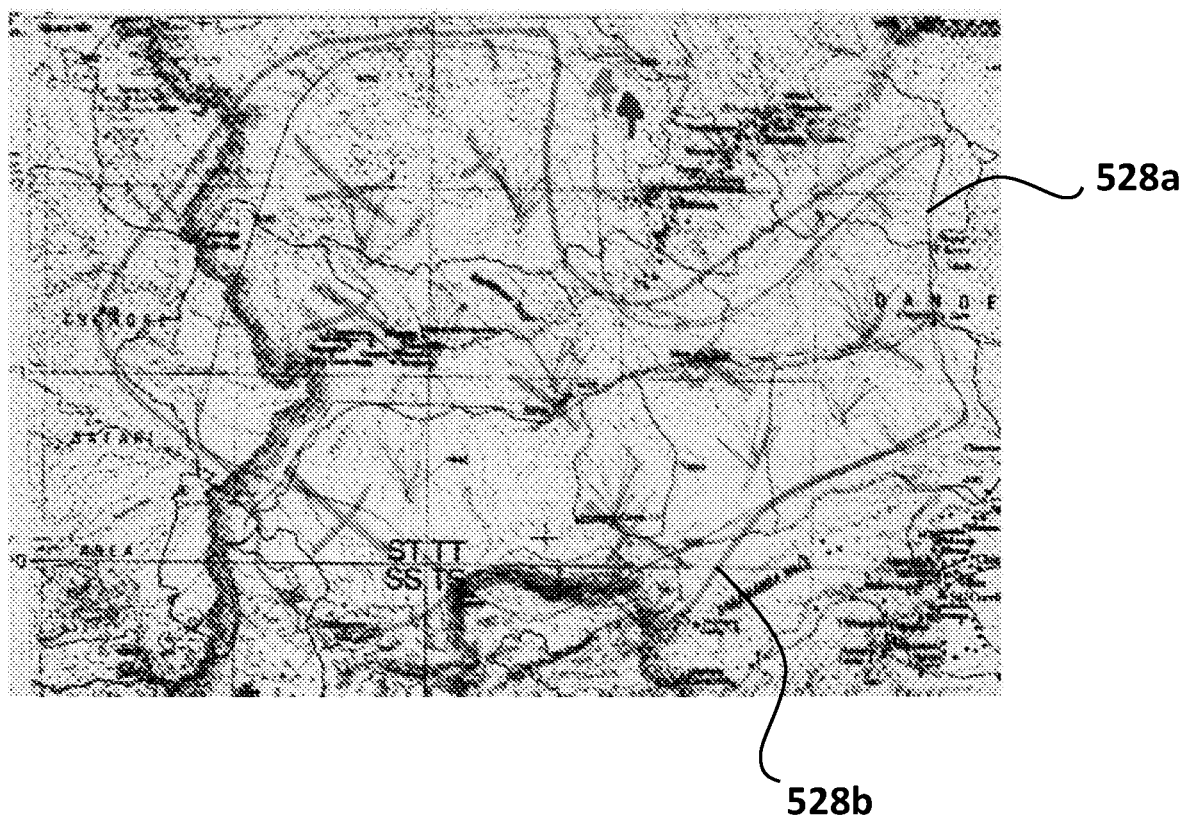
FIG. 5 shows a non-limiting exemplary embodiment of combined different hand-drawn areas of a same grazing area from different paper maps as disclosed herein.
Figure 6:
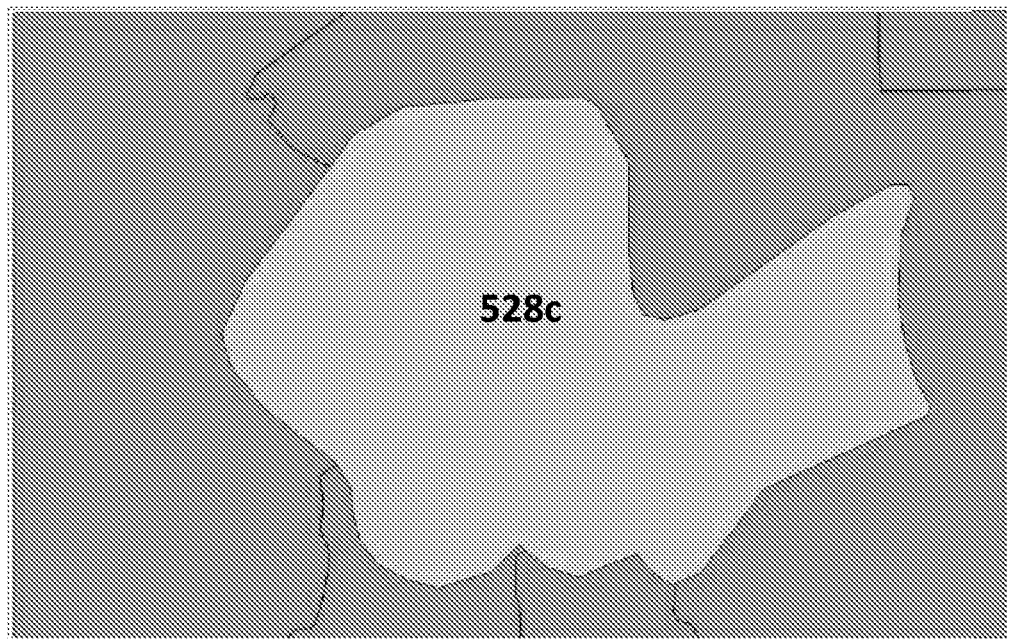
FIG. 6 shows a non-limiting exemplary embodiment of a digitized grazing area generated by obtaining an outer shape of two different hand-drawn grazing areas as disclosed herein.

Referring to FIG. 5, in a particular embodiment, hand-drawn areas 528a, 528b, such as grazing areas, from different paper maps in FIG. 1 are combined. The hand-drawn grazing areas may not fully overlap with each other although the grazing areas are located on approximately the same place. Some differences may exist as different groups of pastoralists may have different perceptions on the exact location of the areas. In some cases, the outer shape of multiple hand-drawn areas may be used as the grazing area. In some cases, vector data/layer in which polygons that indicate the outer shape of the grazing areas are generated. An exemplary vector layer derived based on the outer shape of two different hand-drawn grazing areas is shown in FIG. 6. In some cases, the hand-drawn arrow may indicate north, south, east, west, or any other directions.

In some embodiments, the one or more traditional gazing areas are delineated by at least two persons. In some embodiments, the two persons can be pastoral community representatives. In some embodiments, the one or more traditional gazing areas are delineated by hand-drawing on paper maps. The paper maps and the hand-drawn areas can then be digitized and georeferenced to other maps. In some embodiments, the hand-drawn areas can be georeferenced to digital maps. In some embodiments, the one or more traditional gazing areas are delineated by drawing on digital or digitized maps via an input device. In some embodiments, the one or more areas are drawn via interaction with one of the digital maps using an input device.

Digital Maps

In some cases, the systems, methods and media herein include digital maps. In some cases, the digital map herein includes a commonly available digital map (Google, Bind, Baidu, Yahoo, etc). In some cases, the digital maps herein include features superimposed on commonly available digital maps. In some cases, the digital maps may be used to serve the same purpose as the digitized maps disclosed herein. For example, hand-drawn features may be directly added to a digital map via interaction with the digital map using an input device. Such hand-drawn features from at least two different experts may be combined by a software in order to accurately indicate a same grazing area. In some cases, the hand-drawn features include an outer contour of one or more grazing areas. In yet further cases, such outer contour may be for one or more time points during a year.

In some cases, the digital maps or digitized map disclosed herein may include at least part of a land. In some cases, the hand-drawn features, a combination of the hand-drawn features, the digitized paper maps with hand-drawn elements, or information associated therewith are stored in a database. In some cases, digital maps are stored in a database.

In some embodiments, the digital maps herein include an image resolution of about 3 kilometers by 3 kilometers. In some embodiments, the digital maps herein include an image resolution greater than about 3 kilometers by 3 kilometers. In some embodiments, the digital maps herein include an image resolution greater than about 0.1 kilometers by 0.1 kilometer, 0.5 kilometers by 0.5 kilometers, 1 kilometer by 1 kilometer, 1.5 kilometers by 1.5 kilometers, 2 kilometers by 2 kilometers, or 2.5 kilometers by 2.5 kilometers.

Dashboards

Figure 25:
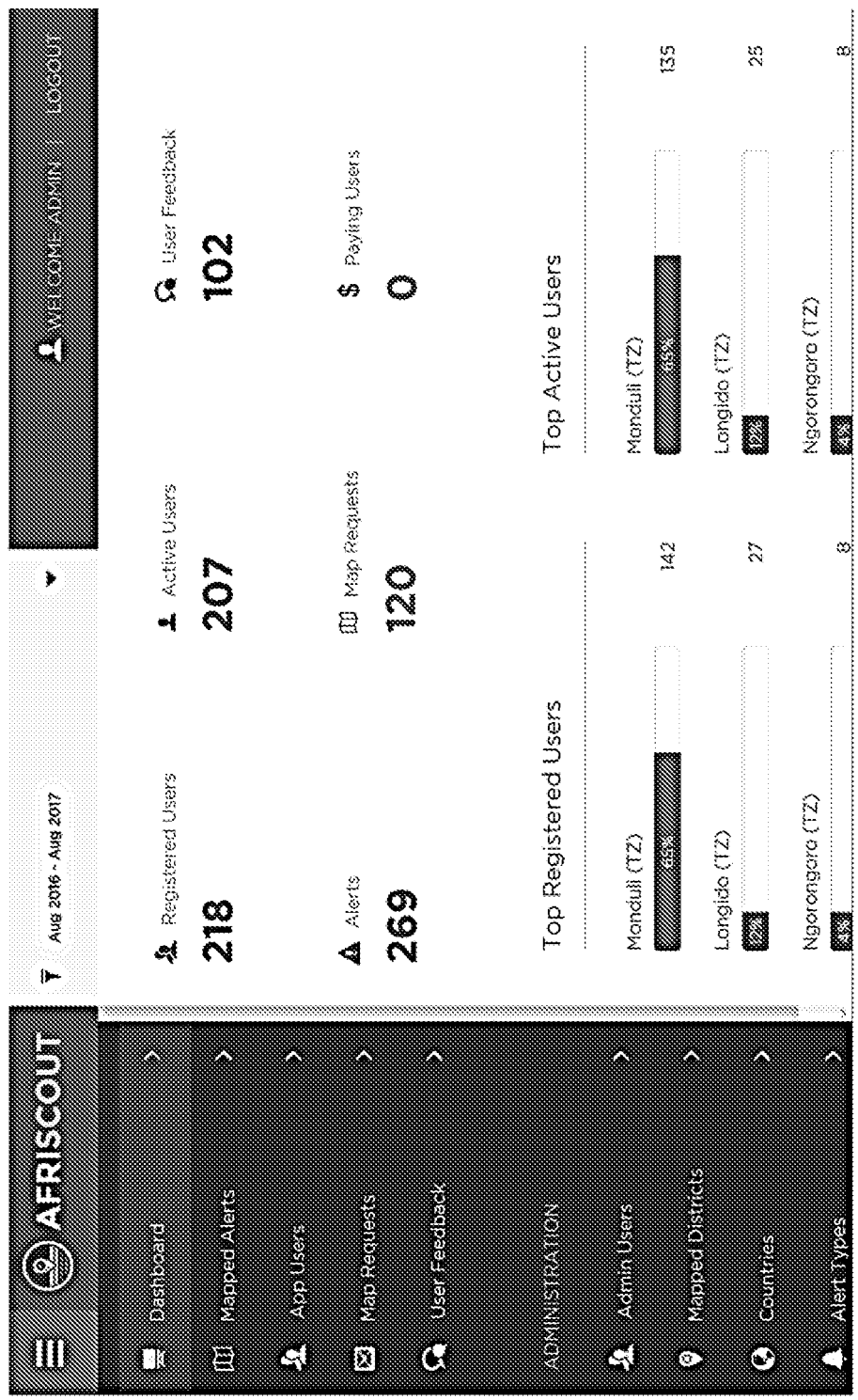
FIG. 25 shows a non-limiting exemplary embodiment of the systems, methods, and media disclosed herein, in this case, a user interface of an administrative dashboard that allows a user to review and assess registrations and subscriptions.
Figure 27:
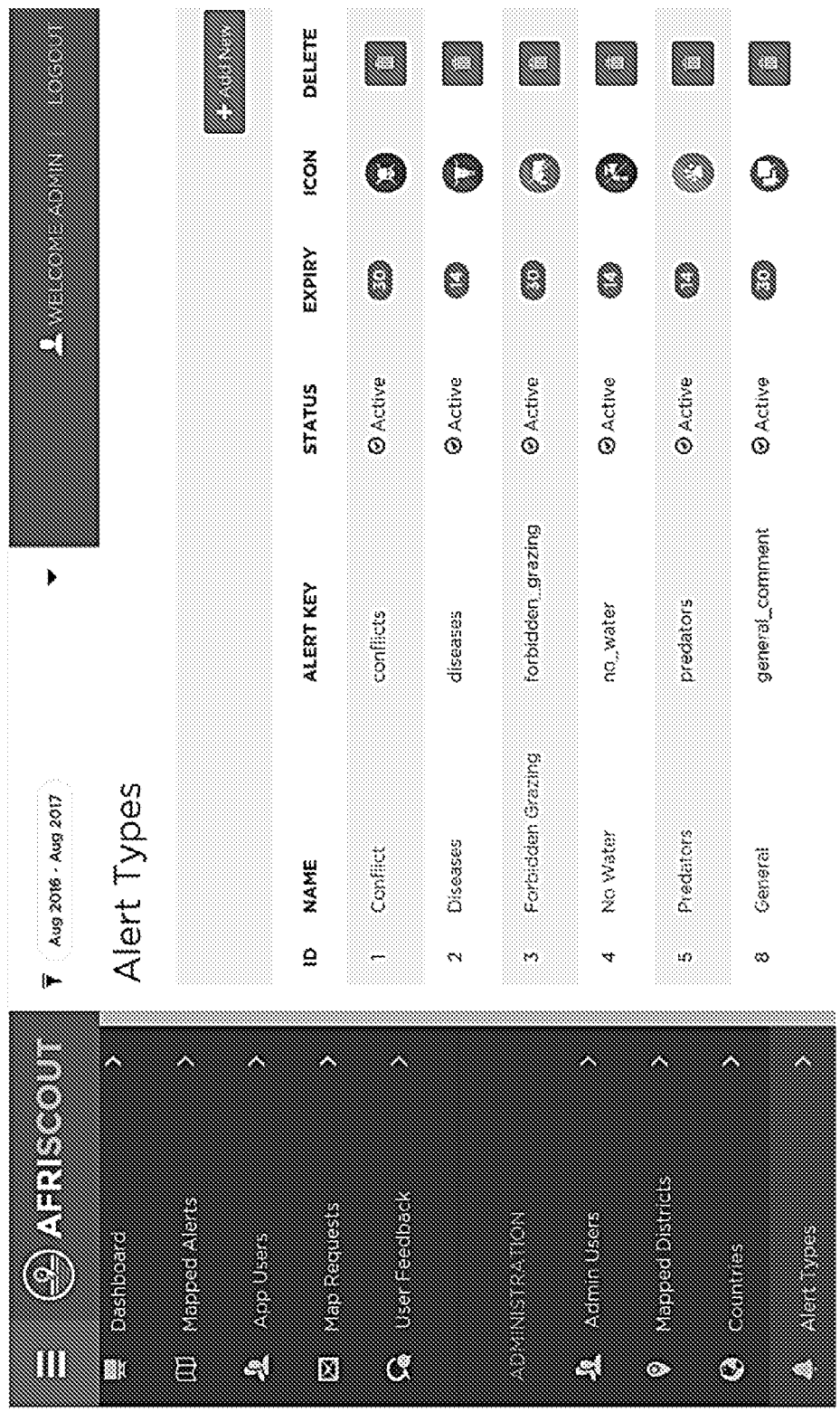
FIG. 27 shows a non-limiting exemplary embodiment of the systems, methods, and media disclosed herein, in this case, a user interface of an administrative dashboard that allows a user to review and manage posted alerts in the application for topographical feature identification and assessment.
Figure 28:
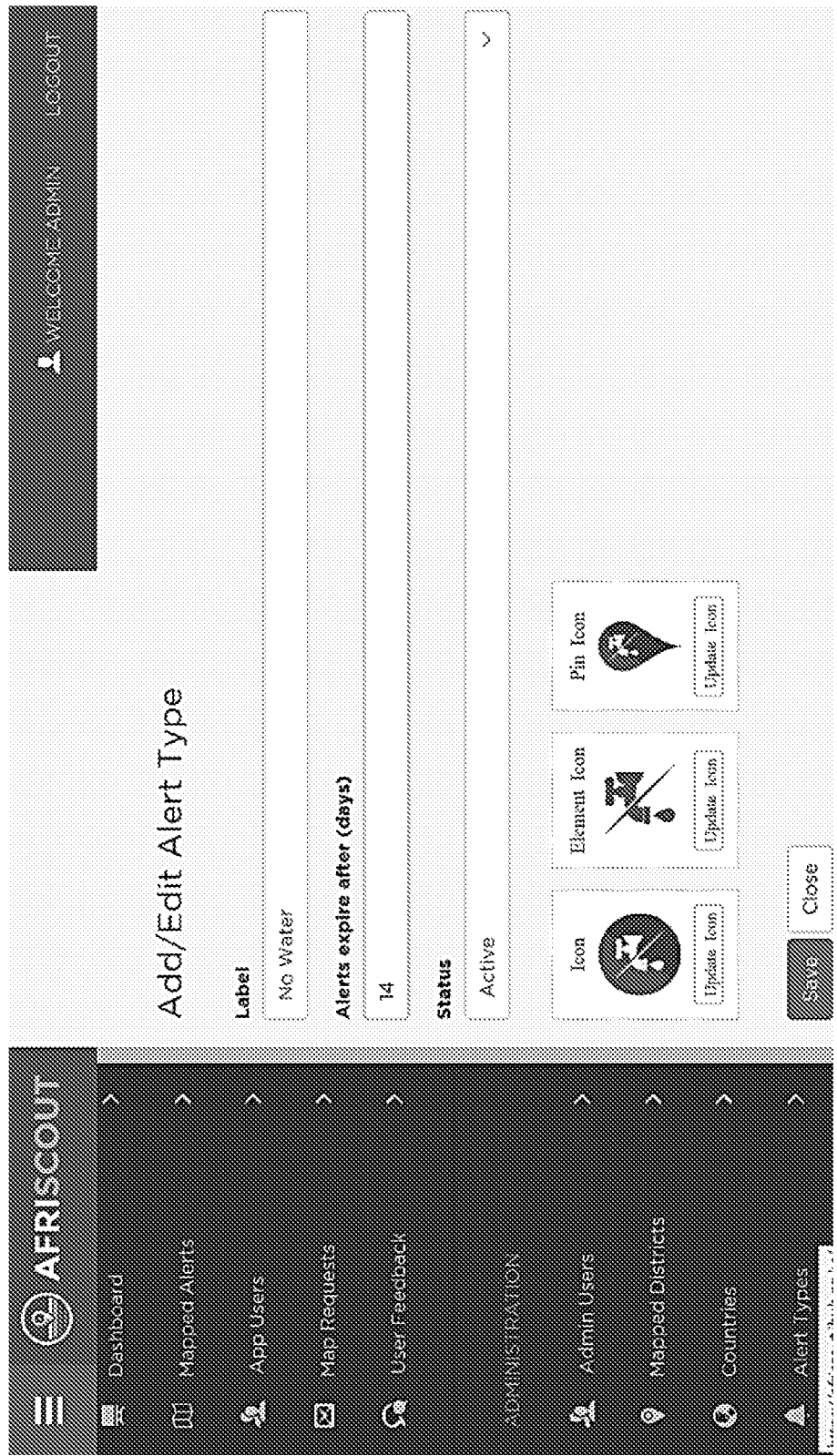
FIG. 28 shows a non-limiting exemplary embodiment of the systems, methods, and media disclosed herein, in this case, a user interface of an administrative dashboard that allows a user to review and manage alert type and detail information of each type of alert in the application for topographical feature identification and assessment.
Figure 30:
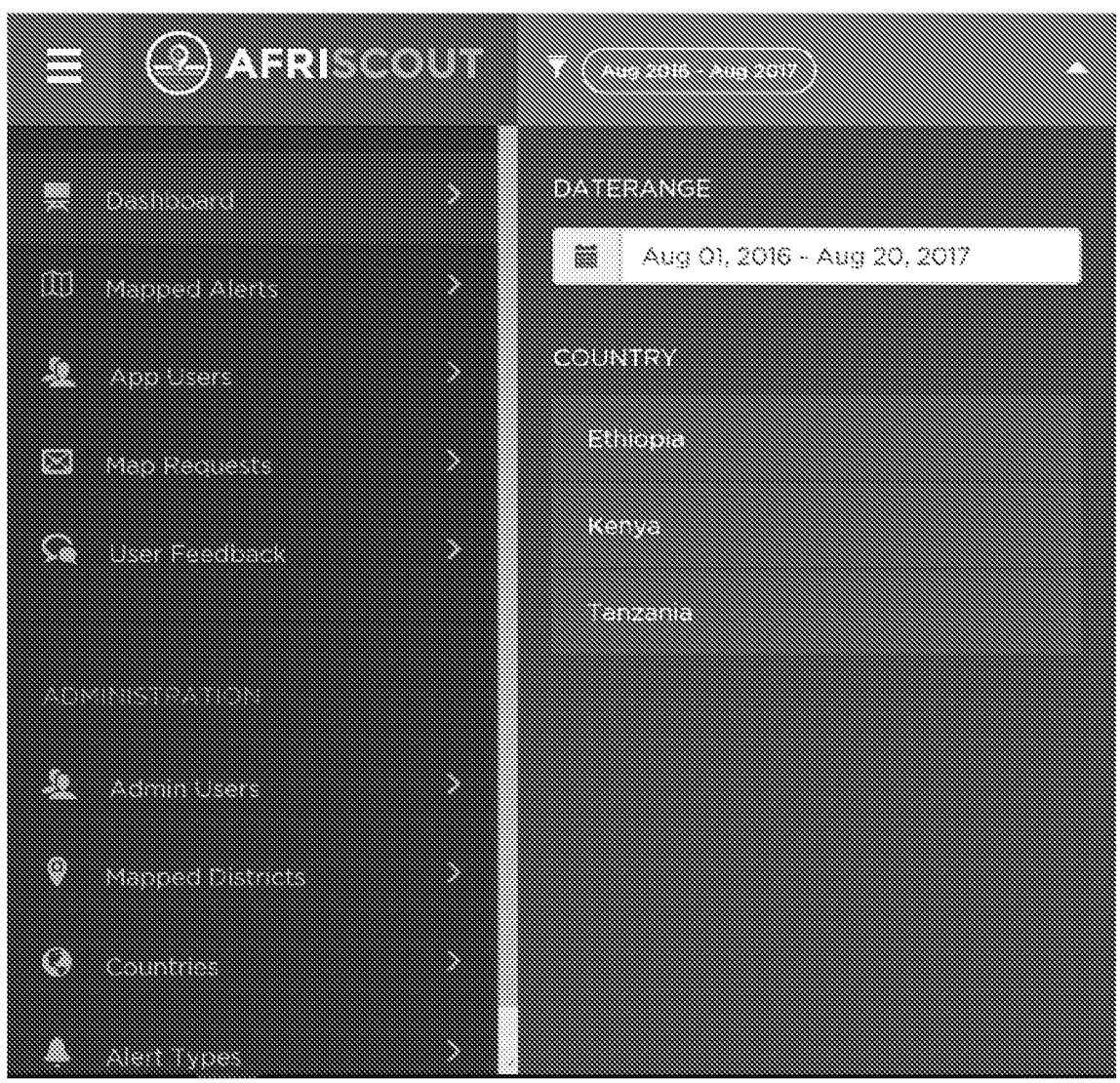
FIG. 30 shows a non-limiting exemplary embodiment of the systems, methods, and media disclosed herein, in this case, a user interface of an administrative dashboard that allows a user to review and manage usage of the application for topographical feature identification and assessment based on selected dates and selected countries.
Figure 31:
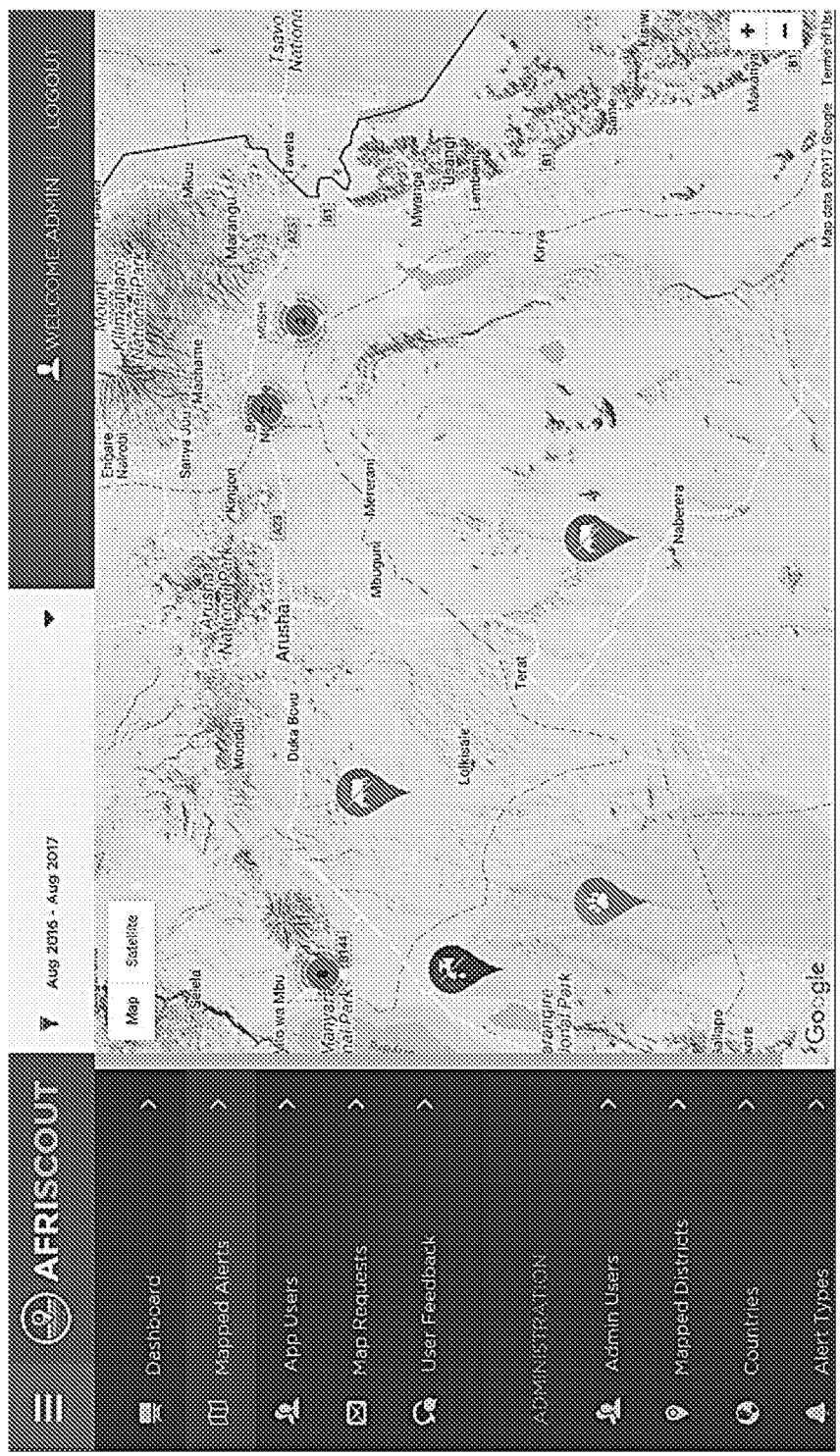
FIG. 31 shows a non-limiting exemplary embodiment of the systems, methods, and media disclosed herein, in this case, a user interface of an administrative dashboard that allows a user to review and manage usage of the application for topographical feature identification and assessment based on selected dates and selected countries.

In some embodiments, the platforms, systems, media, and methods described herein include a user interface that allow a user to review and manage usage of the application for topographical feature identification and assessment herein. Referring to FIG. 25, in a particular embodiment, the user may view statistics on registered users, active users, user comments/feedbacks, alerts, maps requests, and other information, optionally in a selected time period and within specific districts or countries. The selection of dates and countries is shown in FIG. 30. After clicking on a country, a user can also narrow in to a particular mapped area. Further, the user may optionally click on a category shown in the menu on the left of the user interface to view specific information in that category. In the same embodiment, the user may view geographical distribution of information in certain categories. For example, the user may view the geographical distribution of active users, such as the countries or regions of the active users. Referring to FIG. 26, in a particular embodiment, the user, e.g., an administrator may view and manage statistics on mapped districts and countries by clicking on the "mapped districts" button from the dashboard, the administrative user may also activate or deactivate mapped areas from view in the mobile application. Mapped districts feature does NOT enable the user to view and manage "stats". Referring to FIG. 27, in a particular embodiment, the user may view and manage posted alerts optionally by clicking a link from the main dashboard interface. In this embodiment, each posted alert with alert name, type, current status, expiry, alert icon can be viewed, edited (FIG. 28), or deleted. Referring to FIG. 28, in a particular embodiment, the user may edit an existing alert type from the dashboard. In some embodiments, new alert types can be added for the users to select from. In this embodiment, the alert type of "no water" is selected, and changes can be made to the name of its label, time period that the alert is in effect, status of the alert (if an alert is active it is an option on the alert menu for mobile users to select. If it is inactive, it is hidden), and corresponding icon of the alert. In some cases, the administrator may review and manage posted alerts with the alerts georeferenced in a map, optionally in a topographical viewing mode, as shown in FIG. 31, or in a vegetation density viewing mode. Additionally, the user may delete or edit information of a posted alert in FIG. 31. Referring to FIG. 31, in a particular embodiment, the administrator, or a user may view and manage posted alerts. In this embodiment, the alert name, alert key, alert status, expiry, and icon may be viewed and the alert are optionally shown in a list. The administrator may delete or edit information of existing alert and add new alerts. In some embodiments, a posted alert may be commented by a large number of users but may only be deleted/modified by specified users such as the posting user or administrator. Such modification may include but is not limited to its name, icon, expiry, location, or other information.

Referring to FIG. 32, in a particular embodiment, the administrator, or a user may view and manage map requests from individual users. Such users may be new users or existing users. The map request may be for a vegetation density map, a surface water map, or their combination for a region/district/country that is not currently offered in the application disclosed herein. Optionally, the user may view detailed information of the map request, such as the date, the contact information of the map requester.

Referring to FIG. 33, in a particular embodiment, an administrator or a user may review or manage comments or feedbacks submitted by the user. An administrator can mark feedbacks as resolved or unresolved. Optionally, such comments include detailed comments or feedback, user information, location of user, and time of submission.

Figure 34C:
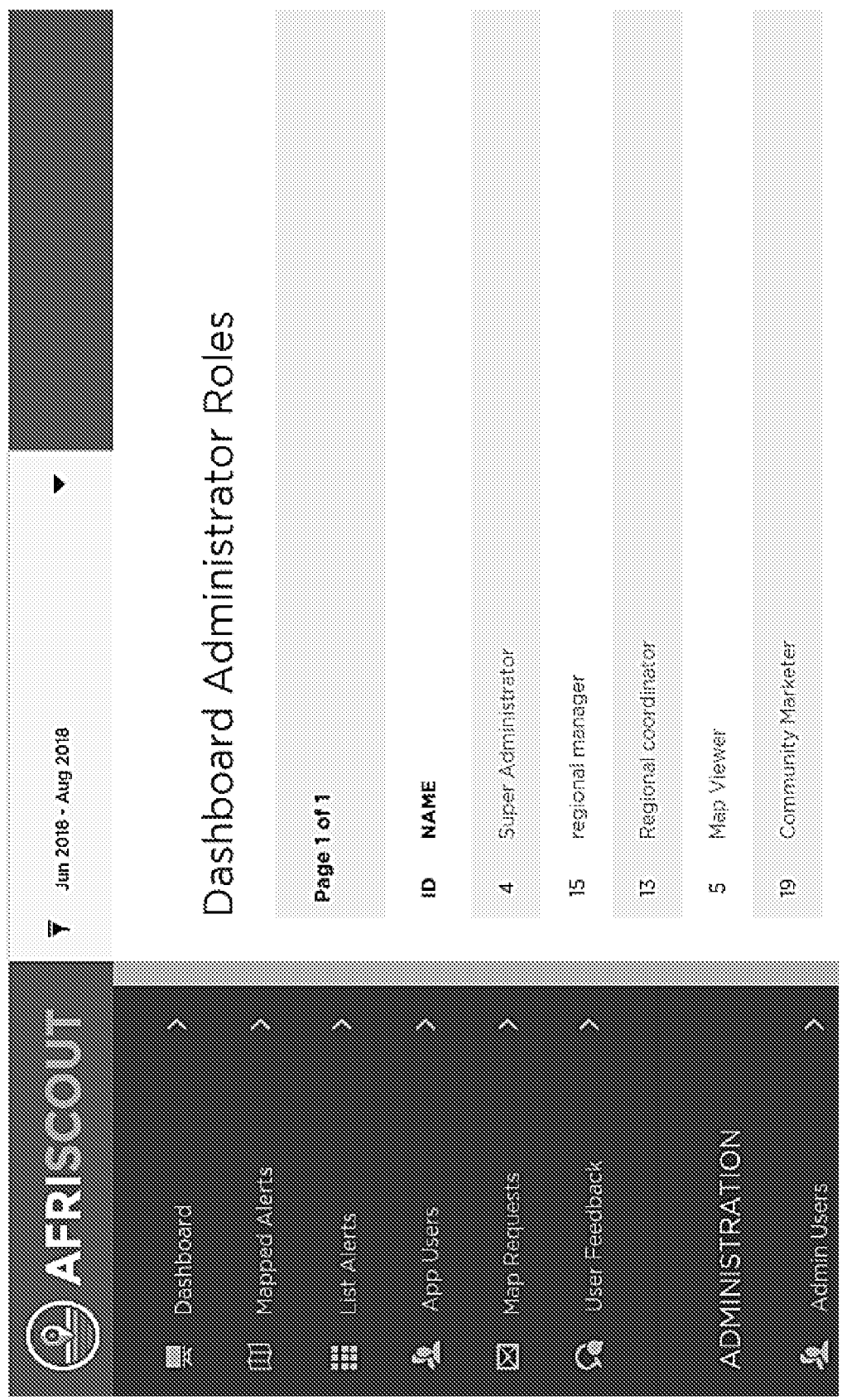
Figure 34D:
Figure 34H:
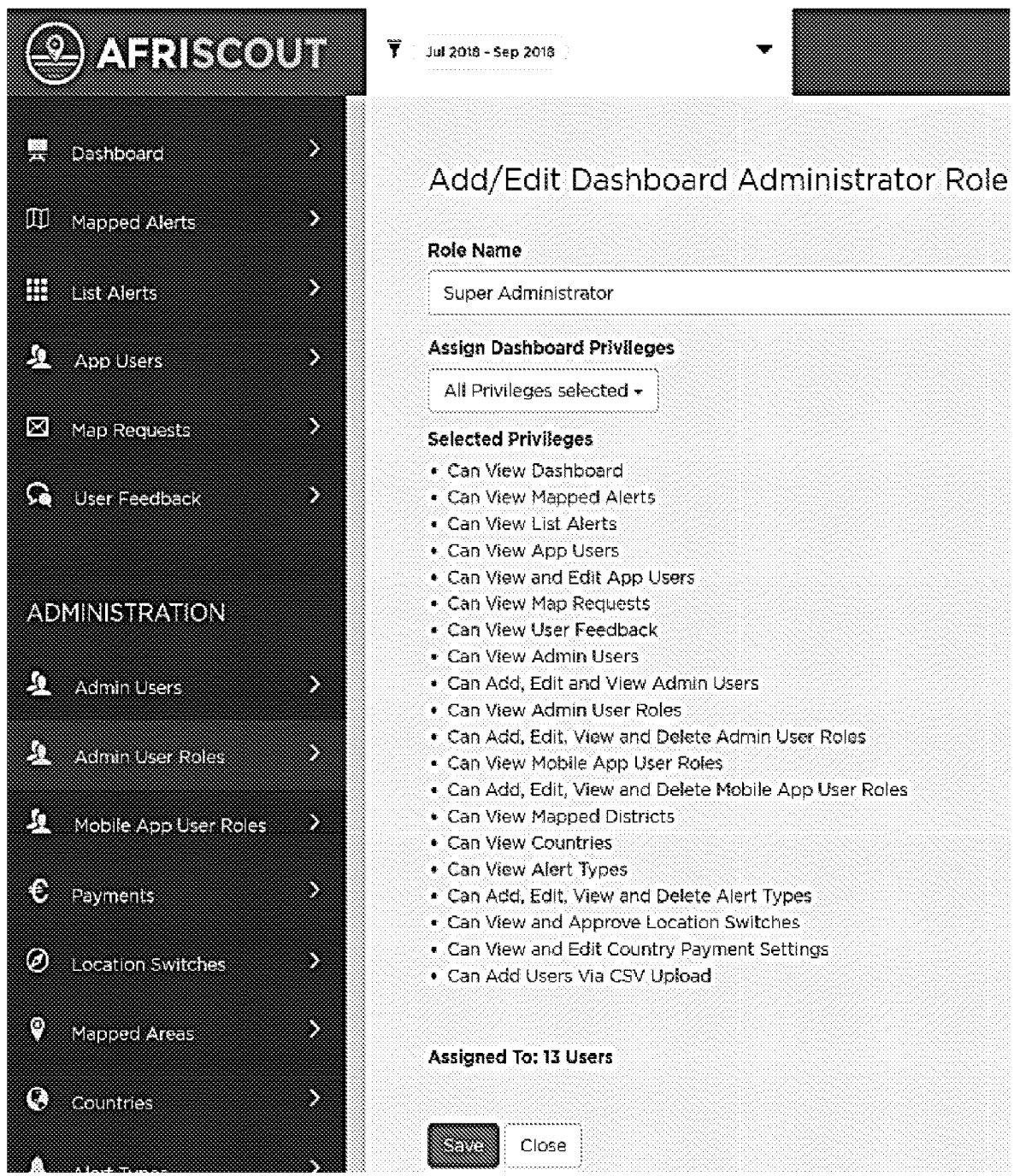

Referring to FIGS. 34A-34H, in a particular embodiment, the dashboard includes user interfaces that allow an administrator or a user to review, manage, or otherwise edit a list of alerts (FIG. 34A), mobile application users (FIG. 34B), administrative personnel (FIG. 34C), subscribers (FIG. 34D), requests for location switch (FIG. 34E), mapped areas (FIG. 34F), or mapped countries (FIG. 34G). In some embodiments, the functionality that allows dashboard users to create roles, e.g., regional manager, community marketer, super administrator, etc, that grant certain users different access to functionalities of the application, exemplary functionalities as shown in FIG. 34H.

In some embodiments, the dashboard is accessible to a user, e.g., an administrator, in a mobile application and/or a web application.

Digital Processing Device

In some embodiments, the platforms, systems, media, and methods described herein include a digital processing device, or use of the same. In some embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In some embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon-Fire®, and Samsung® HomeSync®. Those of skill in the art will also recognize that suitable video game console operating systems include, by way of non-limiting examples, Sony® PS3®, Sony® PS4®, Microsoft® Xbox360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a liquid crystal display (LCD). In some embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In some embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In some embodiments, the input device is a Kinect, Leap Motion, or the like. In still further embodiments, the input device is a combination of devices such as those disclosed herein.

Figure 7:
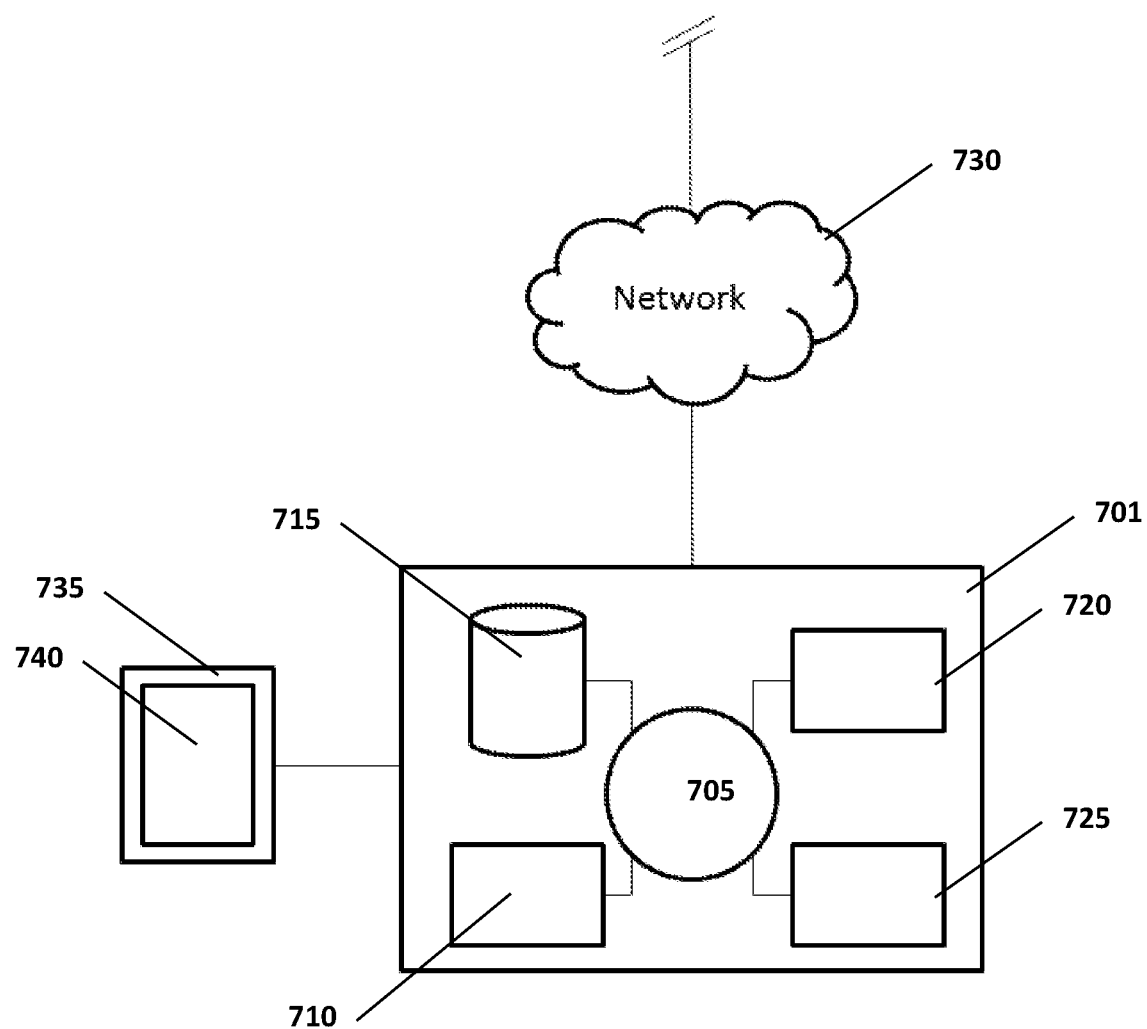
FIG. 7 shows a non-limiting schematic diagram of a digital processing device; in this case, a device with one or more CPUs, a memory, a communication interface, and a display.

Referring to FIG. 7, in a particular embodiment, an exemplary digital processing device 701 is programmed or otherwise configured to generate a combined map containing critical information for making migration decisions. The device 701 can regulate various aspects of satellite data communication, processing/analysis, and storage, digital map communication, processing/analysis, and storage, generation of normalized index array, generation of a custom map or a combined map of the present disclosure. In this embodiment, the digital processing device 701 includes a central processing unit (CPU, also "processor" and "computer processor" herein) 705, which can be a single core or multi core processor, or a plurality of processors for parallel processing. The digital processing device 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The digital processing device 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the device 701, can implement a peer-to-peer network, which may enable devices coupled to the device 701 to behave as a client or a server.

Continuing to refer to FIG. 7, the CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and write back. The CPU 705 can be part of a circuit, such as an integrated circuit. One or more other components of the device 701 can be included in the circuit. In some cases, the circuit is an application specific integrated circuit (ASIC) or a field programmable gate array (FPGA).

Continuing to refer to FIG. 7, the storage unit 715 can store files, such as drivers, libraries and saved programs. The storage unit 715 can store user data, e.g., user preferences and user programs. The digital processing device 701 in some cases can include one or more additional data storage units that are external, such as located on a remote server that is in communication through an intranet or the Internet.

Continuing to refer to FIG. 7, the digital processing device 701 can communicate with one or more remote computer systems through the network 730. For instance, the device 701 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In some embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In some embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft Silverlight®, Java™, and Unity®.

Figure 8:
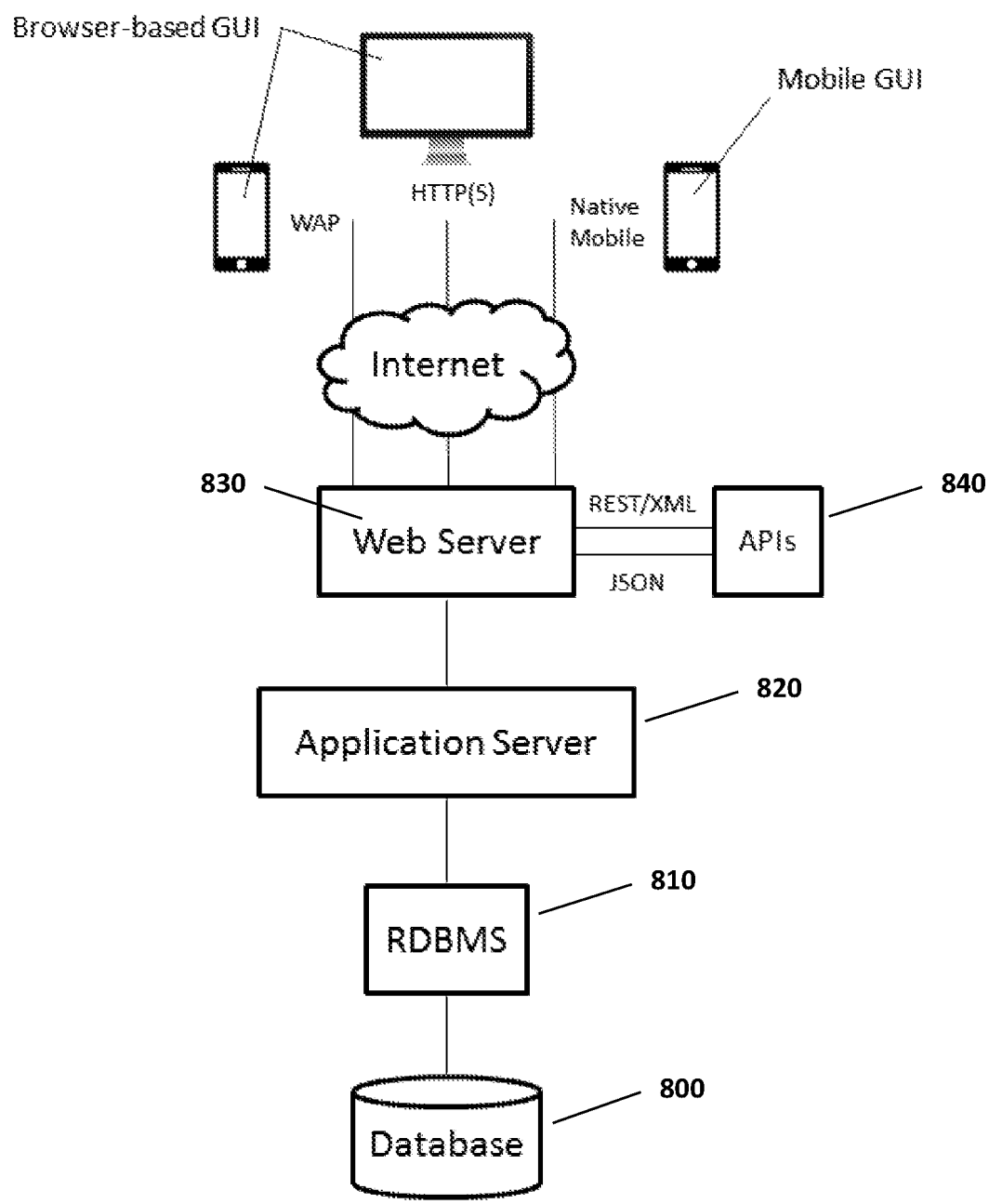
FIG. 8 shows a non-limiting schematic diagram of a web/mobile application provision system; in this case, a system providing browser-based and/or native mobile user interfaces.

Referring to FIG. 8, in a particular embodiment, an application provision system comprises one or more databases 800 accessed by a relational database management system (RDBMS) 810. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 820 (such as Java servers, .NET servers, PHP servers, and the like) and one or more web servers 88 (such as Apache, IIS, GWS and the like). The web server(s) optionally expose one or more web services via app application programming interfaces (APIs) 840. Via a network, such as the Internet, the system provides browser-based and/or mobile native user interfaces.

Figure 9:
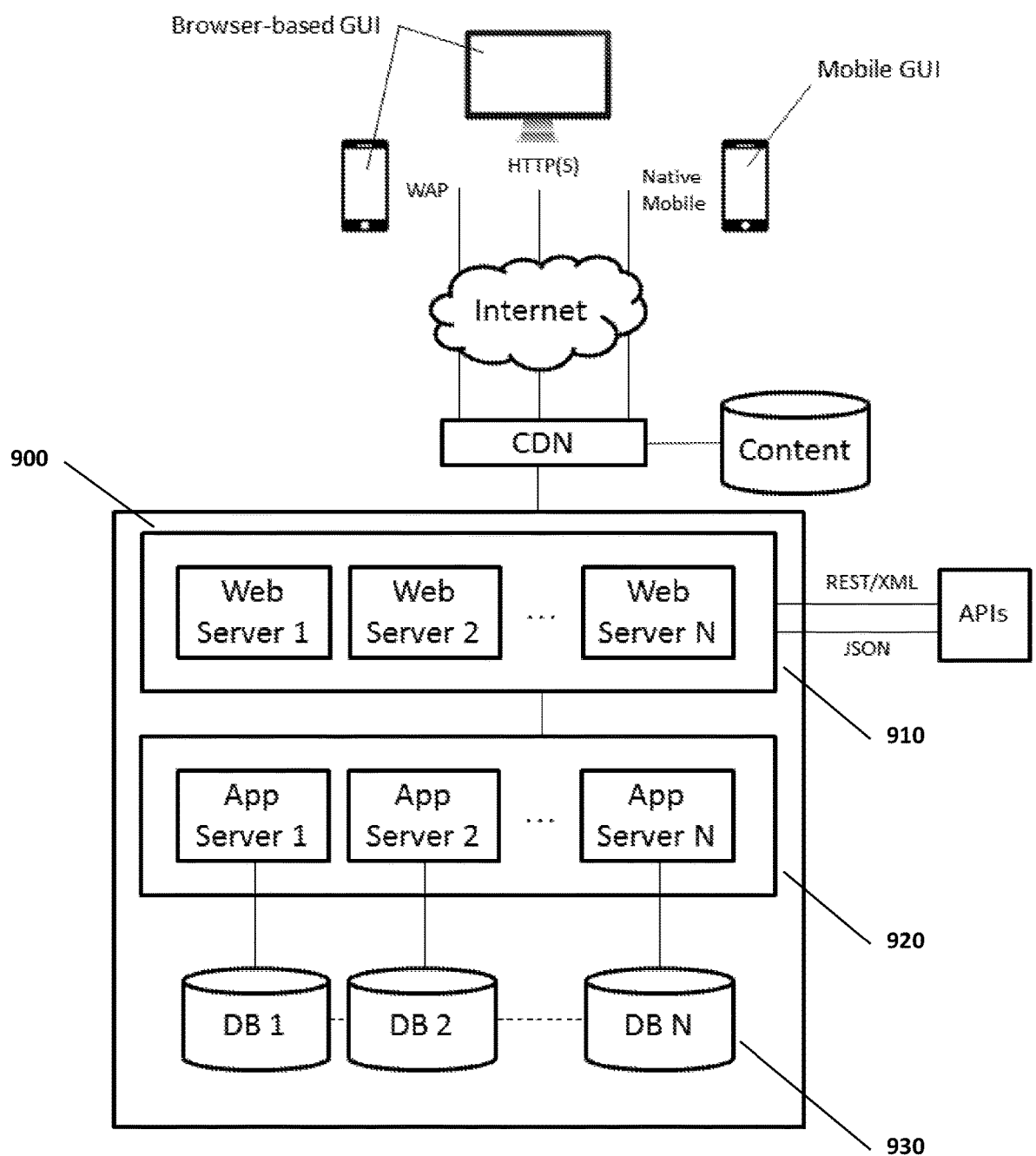
FIG. 9 shows a non-limiting schematic diagram of a cloud-based web/mobile application provision system; in this case, a system comprising an elastically load balanced, auto-scaling web server and application server resources as well synchronously replicated databases.

Referring to FIG. 9, in a particular embodiment, an application provision system alternatively has a distributed, cloud-based architecture 900 and comprises elastically load balanced, auto-scaling web server resources 910 and application server resources 920 as well synchronously replicated databases 930.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS Browser, Mozilla® Firefox® for mobile, Microsoft® Internet Explorer® Mobile, Amazon Kindle Basic Web, Nokia Browser, Opera Software Opera Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In some embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of satellite data, NDVI, digitized maps, digital maps, custom maps, combined maps, vegetation density maps, surface water maps, alerts, historical maps, or any other data related to the systems, methods, and media herein. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In some embodiments, a database is web-based. In still further embodiments, a database is cloud computing-based. In other embodiments, a database is based on one or more local computer storage devices.

Example 1

A first set of 100 satellite images from Meteosat satellites for a pre-determined area in Africa is obtained with low spatial resolution of 3 km by 3 km during a 10 day period. A second set of 5 satellite images from SENTINEL satellite(s) is obtained with high spatial resolution of 10 m by 10 m during the same time period. Both sets of images contain water and vegetation information using different bands of the satellites. Both set of images are processed to select cloud-free pixels. The selected cloud-free pixels from both set of images are used to generate an index array indicative of the vegetation density with a high resolution of 10 m by 10 m. For each pixel of the array, fusion of information from data collected using different satellite(s) is performed. The magnitude from the first set of images is selected. If there is more than one cloud-free pixel during the day time, the average is taken to obtain such magnitude. The spatial distribution of the magnitude is obtained from the second set of images. In this particular example, the spatial distribution is derived using a thresholding algorithm: any pixel that is above the threshold has vegetation while pixels below the threshold do not. The magnitude can then be averaged among all the vegetation pixels to generate the final magnitude for each pixel. And this process can be repeated for each pixel of the index array. Afterwards, the index array can be used to generate custom maps indicative of high resolution vegetation density distribution. Similarly, surface water distribution can be determined. The two custom maps, one for water, and the other for vegetation can then be combined for generation of a composite custom map. A digital map having one mask for a traditional gazing area is compared with the composite custom map to generate the combined map indicative of vegetation and water information within the gazing area. Such combined map is processed and stored for rendering to a user's mobile device within a mobile application disclosed herein. A pastoralist using the mobile application conveniently zooms in to the gazing area to check vegetation distribution as well as small surface water areas in order to make migration decisions for his herds. In this case, surface water is not detectable or observable with the 3 km by 3 km resolution provided by Meteosat satellite near or in the gazing area. But with the high resolution combined map disclosed herein, the pastoralist detects several small water ponds near the gazing area portrayed through the improved digital image and measures the size of the water ponds to make a migration decision.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented method for generating, on a graphical user interface (GUI), a combined map for identifying and assessing topographical features using satellite data, the method comprising:
   a. receiving, by the computer a first set of satellite data from first one or more satellites, the first set of satellite data indicative of a first topographical feature and a second topographical feature of the land for a time period at a first resolution;
   b. receiving a second set of satellite data from the first one or more satellites or second one or more satellites, the second set of satellite data indicative of the first topographical feature and the second topographical feature of the land for the time period at a second resolution higher than the first resolution;
   c. generating a normalized index array of the first topographic feature for the time period at the second resolution by fusing the first set of satellite data and the second set of satellite data;
   d. generating a first custom map at the second resolution, the first custom map indicative of density of the first topographical feature of the land using the normalized index array;

e. generating a second custom map at the second resolution, the second custom map indicative of distribution, permanence, or both of the second topographical feature of the land for the time period;
f. comparing the first and second custom maps with one or more of digital masks to generate a combined map at the second resolution, the combined map indicative of the density of the first topographical feature and distribution, permanence, or both of the second topographical feature within the one or more areas of the land for the time period; and
g. rendering the combined map on the GUI.

2. The method of claim 1, wherein the first topographical feature is during 1) a wet season, 2) a dry season, 3) an extreme dry season, 4) a severe drought season, or a combination thereof.

3. The method of claim 1, wherein the first one or more satellites include one or more of a geostationary satellite.

4. The method of claim 1, wherein the one or more areas are drawn via interaction with one of the digital maps using an input device.

5. The method of claim 1, wherein the first set of satellite data comprises a satellite image taken with visible light, infrared (IR) light, near-infrared (NIR) light, short-wave infrared (SWIR) light, or a combination thereof; more than one satellite image of an identical region at different time points; more than one satellite image at least one taken during day time; a composite image generated from a plurality of satellite images taken at different time points; a cloud-free image generated from a plurality of satellite images taken at different time points; or a combination thereof.

6. The method of claim 1 further comprises performing, by the computer, atmospheric correction on the first set of satellite data, the second set of satellite data, or both.

7. The method of claim 1, wherein the normalized index array is two dimensional and includes multiple values ranging between −1 and 1.

8. The method of claim 1, wherein the second set of satellite data comprises a satellite image taken with visible light, infrared (IR) light, near-infrared (NIR) light, short-wave infrared (SWIR) light, or a combination thereof; more than one satellite image of an identical region at different time points; more than one satellite image at least one taken during day time; a composite image generated from a plurality of satellite images taken at different time points; a cloud-free image generated from a plurality of satellite images taken at different time points; or a combination thereof.

9. The method of claim 1, wherein the first set of satellite data is further indicative of a second topographical feature of the land for the time period at the first resolution, and the second set of satellite data is further indicative of the second topographical feature of the land for the time period at the second resolution.

10. The method of claim 1, wherein the second custom map is obtained by averaging data from the second set of satellite data, the first set of satellite data, or both.

11. The method of claim 1 providing an alert on the combined map, the first custom map, the second custom map, or a combination thereof.

12. The method of claim 11, wherein the alert is crowd-sourced.

13. The method of claim 11, wherein the alert comprises a geolocation and a time.

14. The method of claim 1 providing a geolocation of a user and measuring a distance to the one or more areas.

15. The method of claim 1 further allowing a user to interact with the first custom map, the second custom map, the combined map, or a combination thereof.

16. The method of claim 15, wherein allowing the user to interact with the first custom map, the second custom map, the combined map, or a combination thereof comprises allowing the user to
   a. zoom in or zoom out;
   b. switch among more than one viewing mode, wherein the more than one viewing mode includes a terrain viewing mode; and
   c. view one or more historical combined maps, said historical combined maps generated prior to the combined map in time.

17. The method of claim 16 wherein allowing the user to switch among more than one viewing mode comprises switching between viewing the combined map and viewing a terrain map of a same region to assess migration route.

* * * * *